United States Patent
Wang

(10) Patent No.: US 12,261,807 B2
(45) Date of Patent: Mar. 25, 2025

(54) MESSAGE DISPLAY METHOD AND ELECTRONIC DEVICE

(71) Applicant: HUAWEI TECHNOLOGIES CO., LTD., Shenzhen (CN)

(72) Inventor: Long Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/247,029

(22) PCT Filed: Sep. 22, 2021

(86) PCT No.: PCT/CN2021/119555
§ 371 (c)(1),
(2) Date: Mar. 28, 2023

(87) PCT Pub. No.: WO2022/068642
PCT Pub. Date: Apr. 7, 2022

(65) Prior Publication Data
US 2023/0412535 A1     Dec. 21, 2023

(30) Foreign Application Priority Data

Sep. 29, 2020   (CN) .................. 202011051557.X

(51) Int. Cl.
*H04L 51/04*       (2022.01)
*G06F 3/04817*     (2022.01)
(Continued)

(52) U.S. Cl.
CPC .......... *H04L 51/04* (2013.01); *G06F 3/04817* (2013.01); *G06F 3/0488* (2013.01); *H04L 51/10* (2013.01)

(58) Field of Classification Search
CPC ....... G06F 2203/04806; G06F 3/04817; G06F 3/0482; G06F 3/04842; G06F 3/04845;
(Continued)

(56) References Cited

U.S. PATENT DOCUMENTS 10,025,475 B1 *   7/2018   Cohen .................. G06F 40/166
10,564,807 B2 *   2/2020   Yang .................... G06F 3/04842
(Continued)

FOREIGN PATENT DOCUMENTS

CN     109874038 A     6/2019
CN     110234081 A     9/2019
JP     2019175450 A    10/2019

OTHER PUBLICATIONS

"2 ways to stop GIF anime images, load them, and play them with a click," Web, URL:http:/webtukuru.com/web/gif-anime-control/, Total 3 pages (Apr. 14, 2016).
(Continued)

*Primary Examiner* — Greg C Bengzon
(74) *Attorney, Agent, or Firm* — Leydig, Voit & Mayer, Ltd.

(57) ABSTRACT

A message display method and an electronic device are provided. The method specifically includes: The electronic device displays a first user chat interface of an instant messaging application, where the first user chat interface includes a first video message, the first video message includes a first region and a second region, the first video message is associated with a first video, the first video includes first audio and at least one frame of first image, the first region corresponds to the first audio, and the second region corresponds to the at least one frame of first image. The electronic device plays the first video in a first manner in response to an operation performed by a user on the first region. The electronic device plays the first video in a second
(Continued)

manner in response to an operation performed by the user on the second region.

26 Claims, 41 Drawing Sheets

(51) Int. Cl.
*G06F 3/0488* (2022.01)
*H04L 51/10* (2022.01)
(58) Field of Classification Search
CPC .............. G06F 3/04847; G06F 3/0488; G06F 3/04883; G06F 3/04886; G06F 3/165; H04L 51/04; H04L 51/10; H04M 1/72433; H04M 1/72439; H04N 21/4788; H04W 4/12
See application file for complete search history.

(56) References Cited

U.S. PATENT DOCUMENTS

| | | | | |
|---|---|---|---|---|
| 10,742,573 | B2* | 8/2020 | Jeong | H04M 1/72436 |
| 2014/0168344 | A1* | 6/2014 | Shoemake | H04N 7/147 |
| | | | | 348/14.01 |
| 2014/0229866 | A1* | 8/2014 | Gottlieb | H04N 7/15 |
| | | | | 709/204 |
| 2015/0172599 | A1* | 6/2015 | Caldwell | H04N 7/157 |
| | | | | 348/14.03 |
| 2016/0094501 | A1* | 3/2016 | Lee | H04L 51/52 |
| | | | | 709/206 |
| 2016/0301643 | A1* | 10/2016 | Parashar | H04L 51/214 |
| 2017/0039867 | A1* | 2/2017 | Fieldman | G09B 7/00 |
| 2017/0220212 | A1 | 8/2017 | Yang et al. | |
| 2017/0288887 | A1* | 10/2017 | Wang | H04W 4/14 |
| 2018/0227341 | A1* | 8/2018 | Rizzi | H04L 65/4015 |
| 2018/0367484 | A1 | 12/2018 | Rodriguez et al. | |
| 2019/0124400 | A1* | 4/2019 | Wang | H04N 21/2187 |
| 2021/0397390 | A1* | 12/2021 | Li | G06F 3/1292 |
| 2022/0279063 | A1* | 9/2022 | Coffman | G06F 3/0482 |

OTHER PUBLICATIONS

"How to mute WeChat video? WeChat chat video and friends circle video mute method," https://www.xitmi.com/2452.html, total 8 pages (Sep. 30, 2018). With an English Translation.
IN/202347025915, Office Action, Aug. 13, 2024.
CN/2020110571557.X, Office Action, Aug. 29, 2024.

* cited by examiner

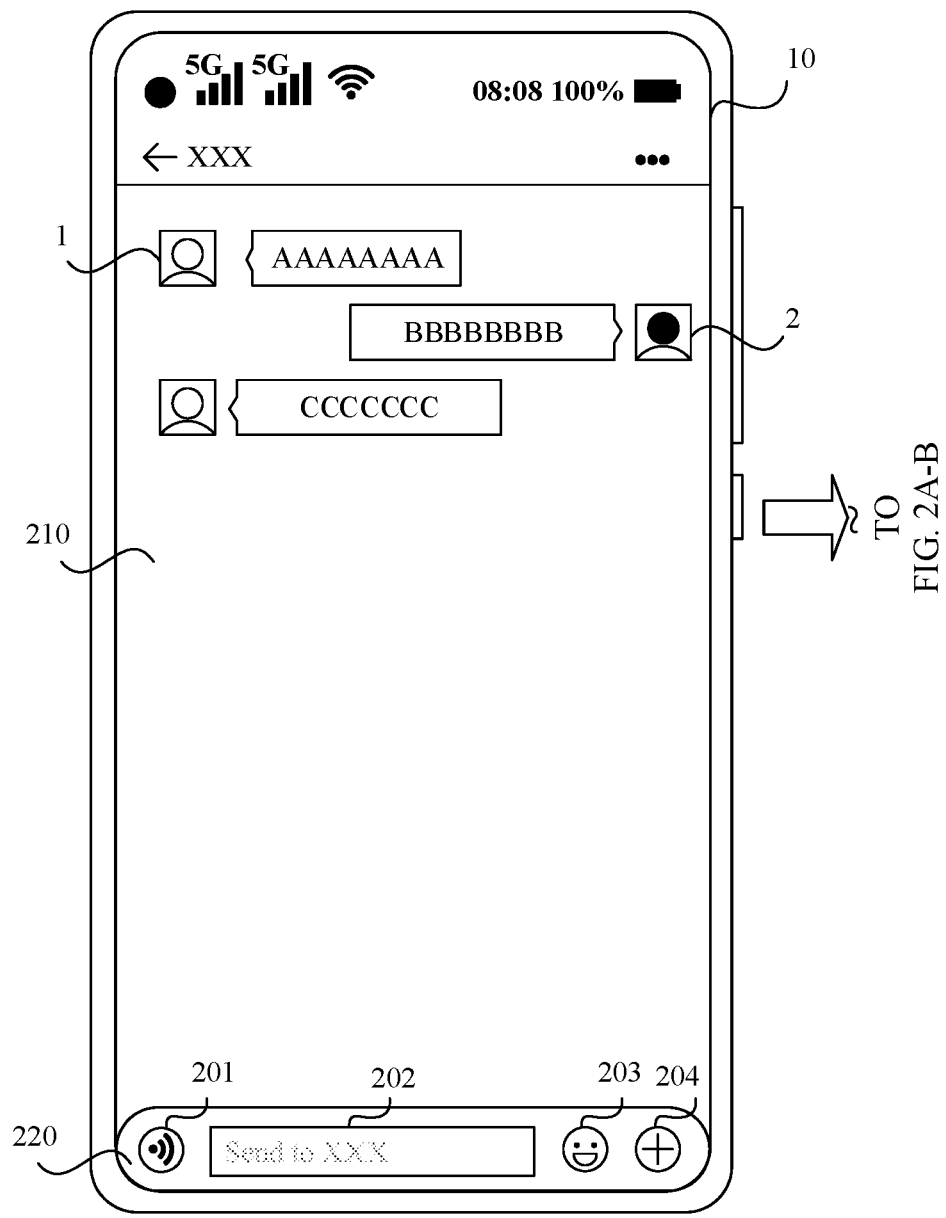
FIG. 2A-A

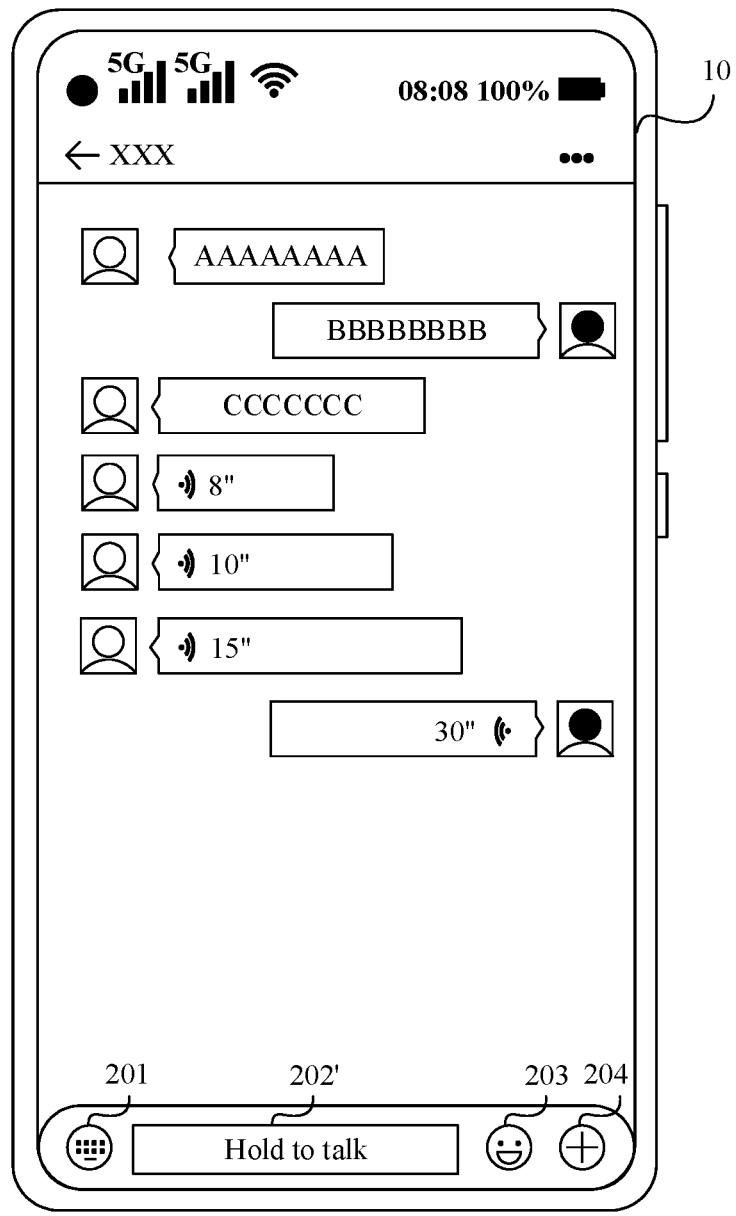
FIG. 2A-B

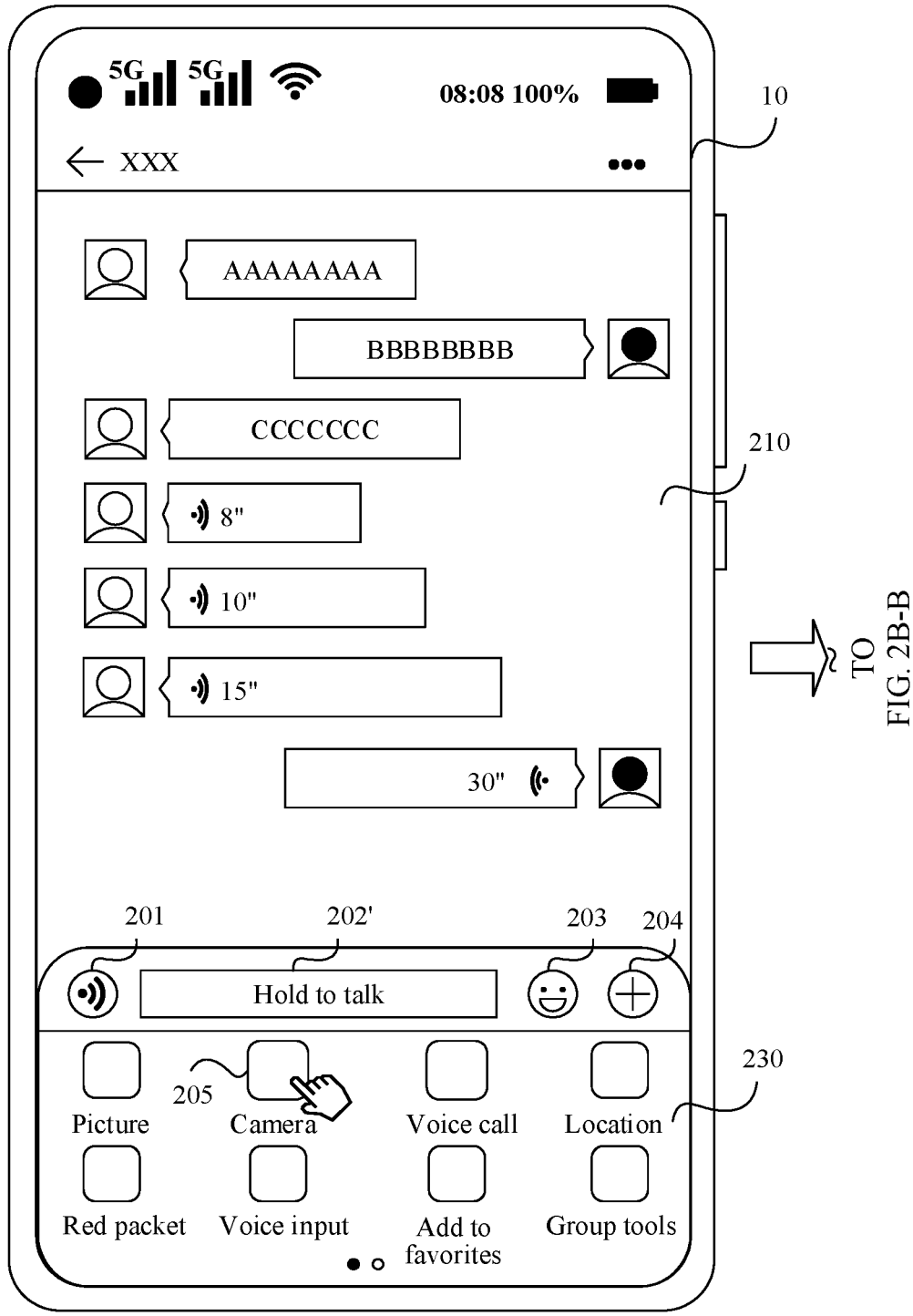
FIG. 2B-A

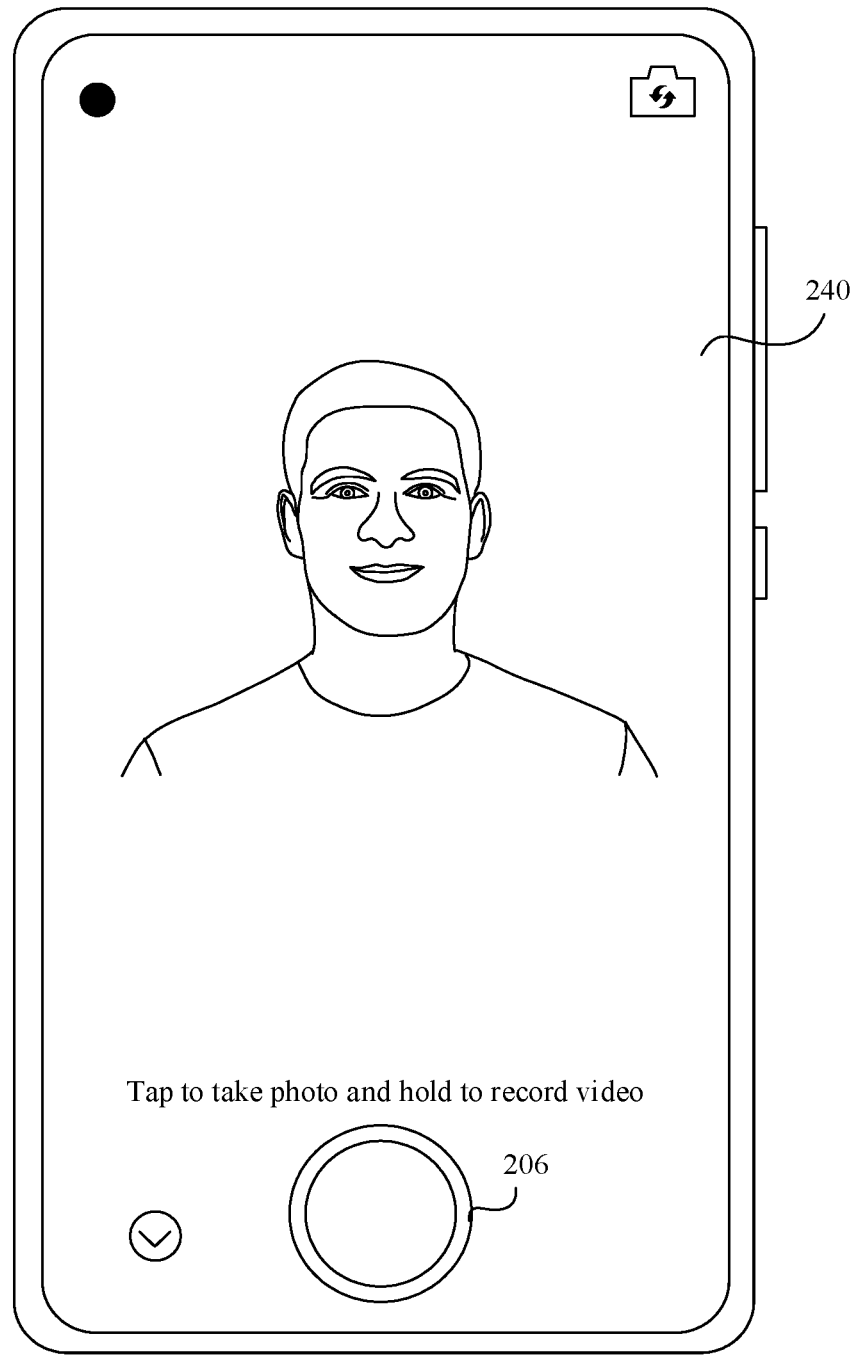
FIG. 2B-B

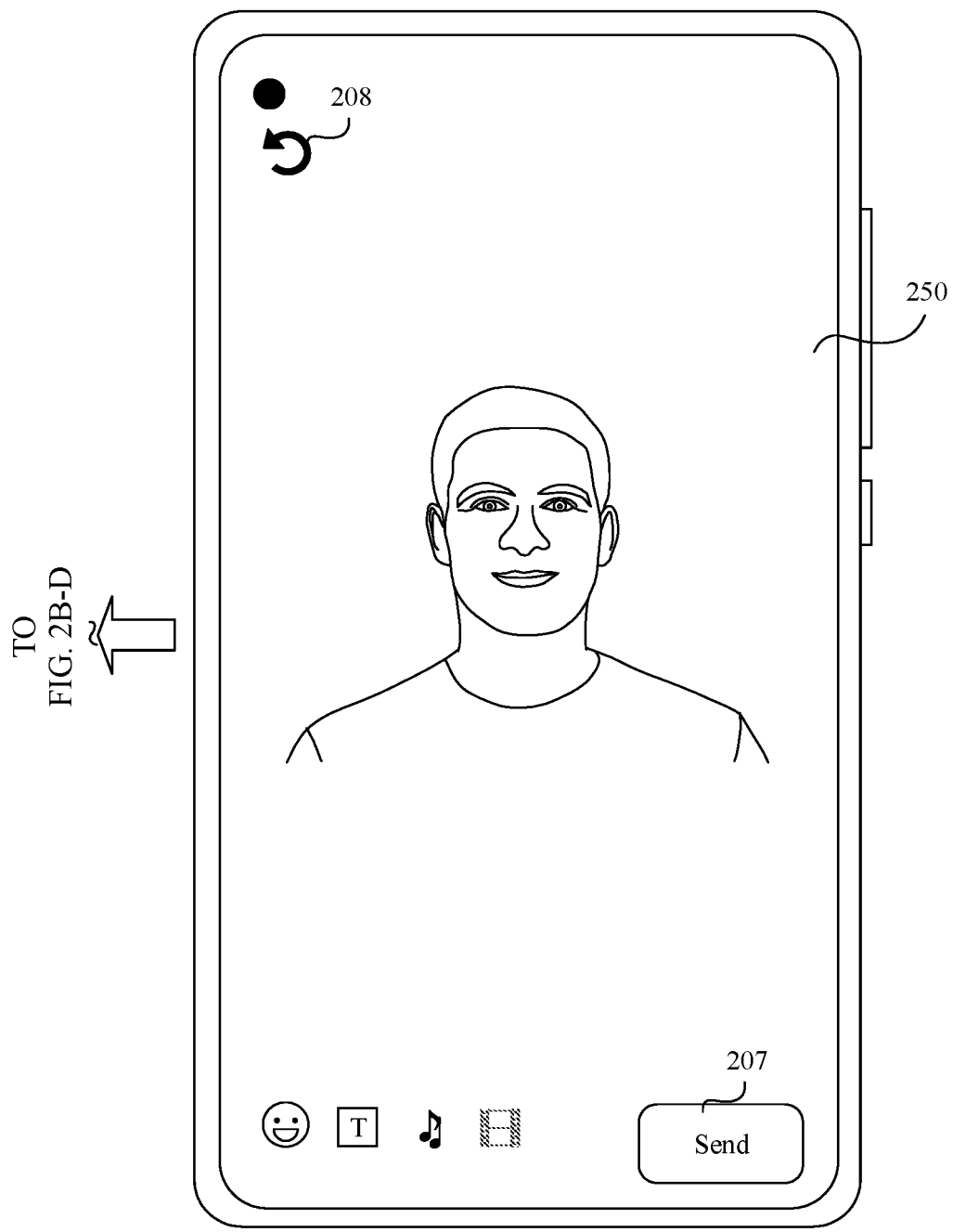
FIG. 2B-C

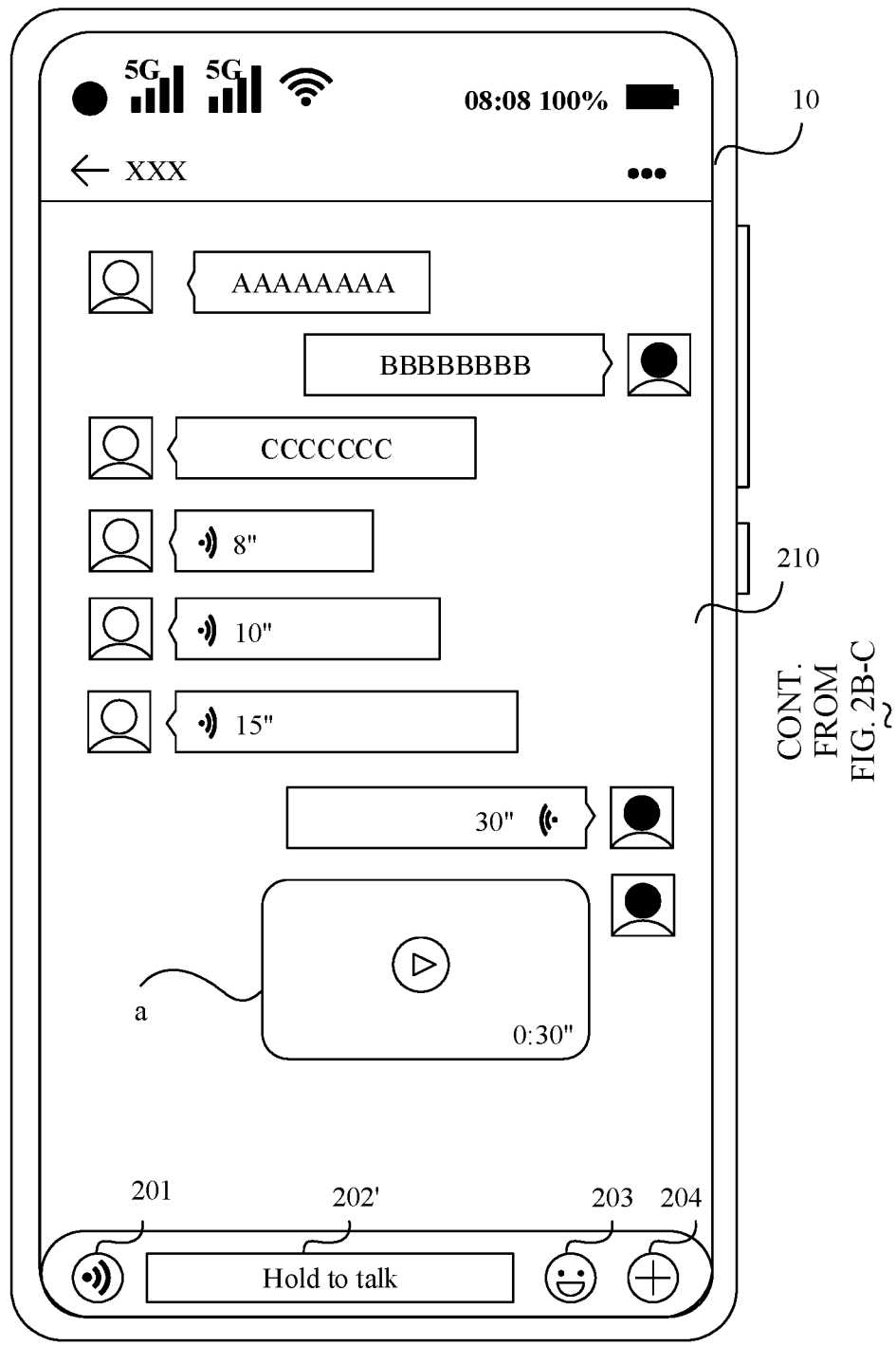
FIG. 2B-D

MESSAGE DISPLAY METHOD AND ELECTRONIC DEVICE

CROSS-REFERENCE TO RELATED APPLICATIONS

This application is a National Stage of International Application No. PCT/CN2021/119555, filed on Sep. 22, 2021, which claims priority to Chinese Patent 202011051557.X, filed on Sep. 29, 2020. The disclosures of the aforementioned applications are hereby incorporated by reference in their entireties.

TECHNICAL FIELD

This application relates to the field of terminal technologies, and in particular, to a message display method and an electronic device.

BACKGROUND

Instant messaging is an internet-based communication manner, and allows two or more persons to transfer messages such as text, voices, videos, and pictures through the internet. This enriches people's communication manners and provides great convenience for people's life and work. An instant messaging application is a tool for implementing instant messaging, for example, WeChat®, QQ®, DingTalk®, or MeeTime®, and may be installed on an electronic device (e.g., a mobile phone or a tablet computer) to provide a communication service for a user. However, in a conventional technology, some functions of the instant messaging application need to be further improved, to be convenient for the user to use.

SUMMARY

This application provides a message display method and an electronic device, so that a user can choose, based on a requirement of the user, to perform an operation on a region of a video message, and the electronic device can play, in a video playing manner corresponding to the region, a video associated with the video message. This helps improve flexibility of playing the video associated with the video message.

According to a first aspect, an embodiment of this application provides a message display method. The method is applied to an electronic device. An instant messaging application is installed on the electronic device. The method specifically includes:

The electronic device displays a first user chat interface of the instant messaging application, where the first user chat interface includes a first video message, the first video message includes a first region and a second region, the first video message is associated with a first video, the first video includes first audio and at least one frame of first image, the first region corresponds to the first audio, and the second region corresponds to the at least one frame of first image;

the electronic device plays the first video in a first manner in response to an operation performed by a user on the first region; and the electronic device plays the first video in a second manner in response to an operation performed by the user on the second region.

In this embodiment of this application, the first video message includes the first region and the second region, so that the electronic device can play the first video in the first manner in response to the operation performed by the user on the first region, and play the first video in the second manner in response to the operation performed by the user on the second region. This helps improve flexibility of playing the first video.

It should be noted that the first video associated with the first video message may be sent by the electronic device in response to an operation of the user, or may be received by the electronic device. This is not limited.

In a possible design, the second region may correspond to the at least one frame of image in the following manner:

The second region is used for displaying a thumbnail of a target image, and the target image is an image associated with the first video. This helps provide a vivid presentation on the second region for the user.

For example, the image associated with the first video is one of the at least one frame of first image. For another example, the image associated with the first video is a predefined image, and the predefined image is different from the at least one frame of first image.

In a possible design, that the electronic device plays the first video in a first manner in response to an operation performed by a user on the first region may be implemented in the following manner:

The electronic device plays the first audio but skips playing the at least one frame of first image in response to the operation performed by the user on the first region.

That the electronic device plays the first video in a second manner in response to an operation performed by the user on the second region may be implemented in the following manner:

The electronic device plays the at least one frame of first image and plays the first audio in response to the operation performed by the user on the second region.

According to the foregoing technical solution, the user can play only audio in the first video but not play at least one frame of image based on a requirement of the user.

In a possible design, the electronic device may play the at least one frame of first image in the following manner:

The electronic device plays the at least one frame of first image in a small window, or the electronic device plays the at least one frame of first image in full screen mode.

In a possible design, that the electronic device plays the first video in a first manner in response to an operation performed by a user on the first region may be implemented in the following manner:

In response to the operation performed by the user on the first region, the electronic device plays the first audio, and plays the at least one frame of first image in a small window.

That the electronic device plays the first video in a second manner in response to an operation performed by the user on the second region may be implemented in the following manner:

In response to the operation performed by the user on the second region, the electronic device plays the first audio, and plays the at least one frame of first image in full screen mode.

In a possible design, the electronic device plays the first video in full screen mode in response to tapping the small window by the user. In this way, it is convenient for the user to switch to full-screen playing when the at least one frame of first image is played in the small window.

In a possible design, that the electronic device plays the first video in a first manner in response to an operation performed by a user on the first region may be implemented in the following manner:

The electronic device plays the first audio but skips playing the at least one frame of first image in response to the operation performed by the user on the first region.

That the electronic device plays the first video in a second manner in response to an operation performed by the user on the second region may be implemented in the following manner:

The electronic device plays the at least one frame of first image but skips playing the first audio in response to the operation performed by the user on the second region.

In a possible design, that the electronic device plays the at least one frame of first image but skips playing the first audio in response to the operation performed by the user on the second region may be implemented in the following manner:

In response to the operation performed by the user on the second region, the electronic device plays the at least one frame of first image, and converts the first audio into text for display when the at least one frame of first image is displayed. In this way, when the user does not play the audio, understanding is not affected when the at least one frame of image is viewed.

For example, when the at least one frame of first image is played, the text into which the first audio is converted may be displayed in a subtitle form.

In a possible design, the first user chat interface further includes a second video message, the second video message is associated with a second video, the second video message includes a third region and a fourth region, the second video includes second audio and at least one frame of second image, the third region corresponds to the second audio, the fourth region corresponds to the at least one frame of second image, both the first video message and the second video message are in an unread state, and the second video message follows the first video message; and in response to the operation performed by the user on the first region, the electronic device automatically plays the second audio after the first audio is completely played. This helps reduce an operation of the user.

It should be noted that the first video message and the second video message each are displayed in two regions, that is, a display style of the first video message is the same as a display style of the second video message.

In a possible design, the first user chat interface further includes a first voice message, the first voice message follows the first video message, and both the first voice message and the first video message are in an unread state; and in response to the operation performed by the user on the first region, after the first audio is completely played, the electronic device automatically plays a voice associated with the first voice message. This helps reduce an operation of the user.

In a possible design, the first user chat interface further includes a second voice message and a third video message, the third video message is associated with a third video, the third video includes third audio and at least one frame of third image, the third video message includes a fifth region and a sixth region, the fifth region corresponds to the third audio, the sixth region corresponds to the at least one frame of third image, the second voice message is followed by the third video message, and both the second voice message and the third video message are in an unread state; and in response to an operation performed by the user on the second voice message, the electronic device plays a voice associated with the second voice message, and automatically plays the third audio after the voice associated with the second voice message is completely played. This helps reduce an operation of the user.

In a possible design, the electronic device receives a first operation in the first user chat interface; and in response to the first operation, the electronic device performs photographing by using a camera, and displays a photographing interface, where the photographing interface is used for displaying an image captured by the camera. According to the foregoing technical solution, the user can perform video recording or image shooting by performing only one operation. This simplifies a manner of triggering the electronic device to perform photographing by using the camera.

In a possible design, the first operation is sliding upward by the user in the first user chat interface.

In a possible design, the electronic device receives a second operation in the first user chat interface; and in response to the second operation, the electronic device collects a voice by using a microphone. In this way, it is convenient for the user to collect the voice.

In a possible design, the first user chat interface further includes a first control, a seventh region, and an eighth region, the first control is used for message input, and the seventh region and the eighth region do not overlap; and the first operation is holding the first control and sliding to the seventh region by the user; and the second operation is holding the first control and sliding to the eighth region by the user. This helps the user implement audio and video mixing.

In a possible design, the seventh region is further used for displaying the image captured by the camera. In this way, it is convenient for the user to preview the image.

In a possible design, the electronic device displays a combination and forwarding box, where the combination and forwarding box is used for forwarding N messages in a second user chat interface, the combination and forwarding box includes M profile photos, the M profile photos are used for indicating a user group or a user to which the N messages are to be forwarded, and each of the M profile photos includes one delete icon; and in response to tapping a delete icon on a first profile photo in the M profile photos by the user, the electronic device deletes the first profile photo in the combination and forwarding box, where M and N are positive integers. In this way, it is convenient for the user to delete the user group or the user to which the N messages are to be forwarded.

In a possible design, the electronic device displays a combination and forwarding box, where the combination and forwarding box is used for forwarding N messages in a second user chat interface, and the combination and forwarding box includes a second control and/or a third control;

in response to an operation on the second control, the electronic device displays a chat selection interface, where the chat selection interface is used for selecting a user group or a user to which messages are to be combined and forwarded; and in response to an operation on the third control, the electronic device displays a user chat interface used for the user to select a message, where N is a positive integer. In this way, it is convenient for the user to add or delete a message, a user group, or a user during combination and forwarding.

In a possible design, the electronic device displays a combination and forwarding box, where the combination and forwarding box is used for forwarding N messages in a second user chat interface, the combination and forwarding box includes message quantity prompt information, the message quantity prompt information is used for indicating a quantity of messages to be forwarded by the user, and N is a positive integer. In this way, it is convenient for the user to view the quantity of messages to be forwarded.

In a possible design, the electronic device displays a combination and forwarding box, where the combination and forwarding box includes K messages, the K messages include N to-be-forwarded messages in a second user chat interface, K is greater than or equal to N, and K and N are positive integers; and in response to an operation performed by the user on a second message in the N messages, the electronic device opens a file associated with the second message, where the file associated with the second message is one of a voice, a video, an audio and video, a document, a picture, a location, and a link. In this way, the user can preview, in the combination and forwarding box, a file associated with a message.

In a possible design, the K messages in the combination and forwarding box each are displayed in a bubble form. In this way, it is convenient for the user to view the K messages.

In a possible design, each of the N messages corresponds to one selection control, and the selection control corresponding to each of the N messages is in a selected state; and in response to an operation performed by the user on a selection control corresponding to a third message in the N messages, the electronic device switches the selection control corresponding to the third message from the selected state to an unselected state, where the electronic device skips forwarding the third message when the selection control corresponding to the third message is in the unselected state. In this way, it is convenient for the user to add or delete a message during combination and forwarding.

It should be noted that, in some embodiments, when K is greater than N, selection controls corresponding to messages in the K messages other than the N messages are in an unselected state. In response to an operation performed by the user on a selection control corresponding to a fourth message in the other messages, the electronic device switches the selection control corresponding to the fourth message from the unselected state to a selected state. The electronic device forwards the fourth message when the selection control corresponding to the fourth message is in the selected state.

In a possible design, the electronic device displays a third user chat interface, where the third user chat interface includes a fifth message, the fifth message is associated with a combined and forwarded chat history, and the combined and forwarded chat history includes the N messages; and in response to an operation performed by the user on the fifth message, the electronic device displays a detailed interface of the chat history, where the detailed interface of the chat history includes the N messages, and the N messages are displayed in a bubble form. In this way, the chat history of the user can be restored for viewing.

According to a second aspect, an embodiment of this application provides an electronic device. The electronic device includes modules/units that perform the method in any one of the first aspect or the possible designs of the first aspect. These modules/units may be implemented by hardware, or may be implemented by hardware executing corresponding software.

According to a third aspect, an embodiment of this application provides a chip. The chip is coupled to a memory in an electronic device, and is configured to invoke a computer program stored in the memory and perform the technical solution in any one of the first aspect of embodiments of this application and the possible designs of the first aspect of embodiments of this application. "Coupling" in embodiments of this application indicates that two components are directly or indirectly combined with each other.

According to a fourth aspect, an embodiment of this application provides a computer-readable storage medium. The computer-readable storage medium includes a computer program, and when the computer program is run on an electronic device, the electronic device is enabled to perform the technical solution in any one of the first aspect and the possible designs of the first aspect.

According to a fifth aspect, an embodiment of this application provides a computer program. The computer program includes instructions, and when the instructions are run on a computer, the computer is enabled to perform the technical solution in any one of the first aspect and the possible designs of the first aspect.

According to a sixth aspect, an embodiment of this application provides a graphical user interface on an electronic device. The electronic device has a display, one or more memories, and one or more processors. The one or more processors are configured to execute one or more computer programs stored in the one or more memories. The graphical user interface includes a graphical user interface displayed when the electronic device performs the technical solution in any one of the first aspect and the possible designs of the first aspect.

For beneficial effects of the second aspect to the sixth aspect, refer to beneficial effects of the first aspect. Details are not described again.

BRIEF DESCRIPTION OF DRAWINGS

FIG. 2A-A and FIG. 2A-B are a schematic diagram of a user interface according to an embodiment of this application;

FIG. 2B-A to FIG. 2B-D are a schematic diagram of another user interface according to an embodiment of this application;

DESCRIPTION OF EMBODIMENTS

Figure 1:
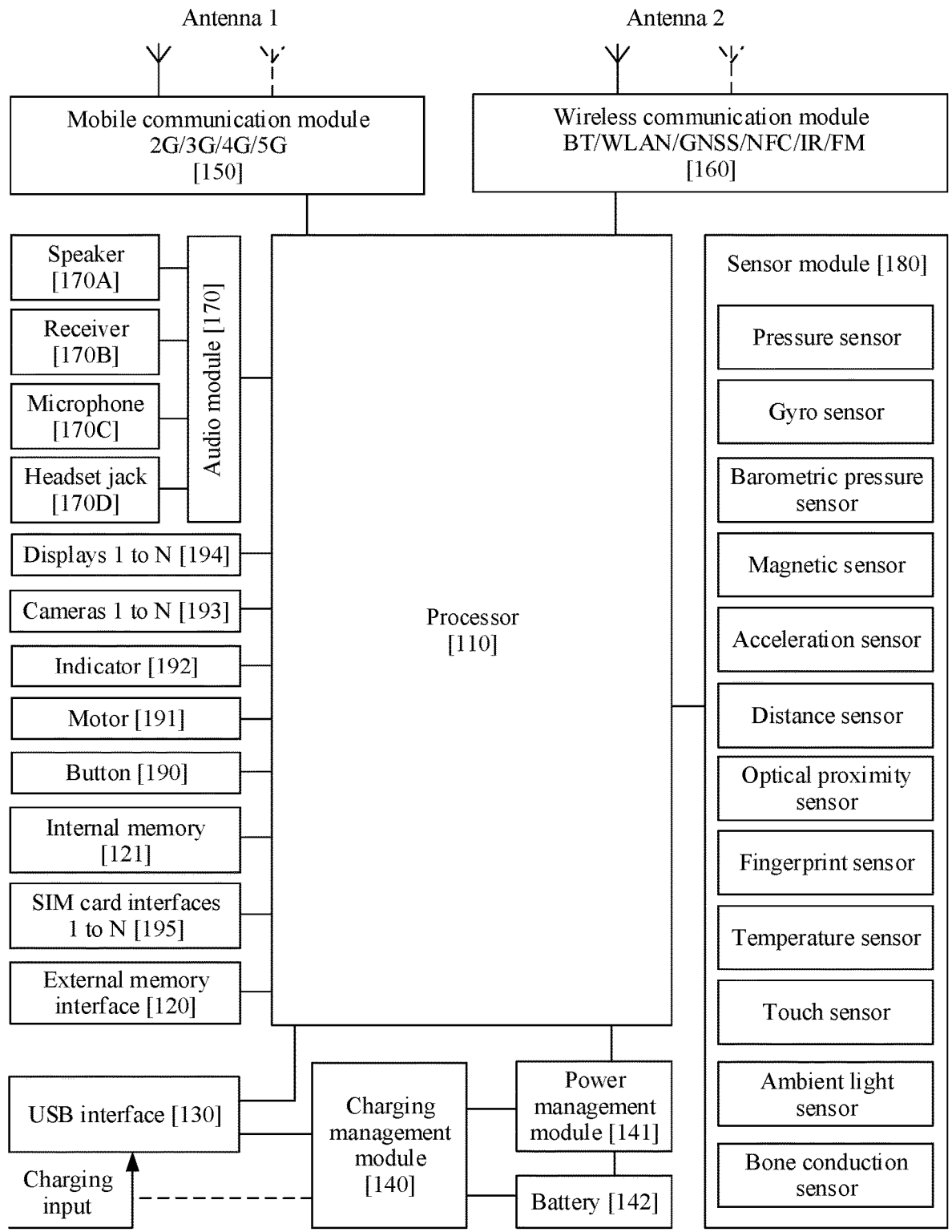
FIG. 1 is a schematic diagram of a hardware structure of an electronic device according to an embodiment of this application.

First, some terms used in embodiments of this application are described, to help understanding of a person skilled in the art.

Instant messaging application: The instant messaging application in embodiments of this application is a tool for implementing instant messaging, and allows two or more persons to transfer messages such as text, voices, videos, documents, and pictures through the internet. This provides great convenience for people to communicate with each other. For example, the instant messaging application in embodiments of this application may be WeChat, MeeTime, or QQ. Specifically, the instant messaging application may be installed on an electronic device to provide a service for a user. In response to an operation of opening the instant messaging application by the user, the electronic device may display a user chat interface. For example, the user chat interface may be a group chat interface (that is, a chat interface including at least three users, for example, a chat interface including a user A, a user B, and a user C), or may be a separate chat interface (that is, a chat interface including two users, for example, a chat interface including a user A and a user B). The user can view a message sent by the user or another user in the user chat interface, such as a voice, a video, and text.

Video: The video in embodiments of this application includes audio and a plurality of frames of images. That the electronic device plays, for a video message in the user chat interface, a video associated with the video message may be understood as follows: For the video, the electronic device plays a plurality of frames of images when playing audio. That the electronic device plays, for a video message in the user chat interface, audio in a video associated with the video message may be understood as follows: For the video, the electronic device plays only the audio, but does not play a plurality of frames of images. That the electronic device plays, for a video message in the user chat interface, a plurality of frames of images in a video associated with the video message may be understood as follows: For the video, the electronic device plays only the plurality of frames of images, but does not play audio.

Usually, the instant messaging application displays a video message in a first style in the chat interface. In this case, in response to an operation performed by the user on the video message displayed in the first style, the electronic device can play only a video associated with the video message, but cannot independently play audio or a plurality of frames of images in the video associated with the video message.

In view of this, an embodiment of this application provides a message display method, so that an electronic device can display a video message in a second style in a user chat interface of an instant messaging application. When the video message is displayed in the second style, the video message includes a first region and a second region. A video playing manner corresponding to the first region is a first manner, and a video playing manner corresponding to the second region is a second manner. The first region and the second region are different regions, the first manner is different from the second manner, and the video message is associated with a video. In this way, a user can select, for the video message based on a requirement of the user, a corresponding region to perform an operation, to play, in a video playing manner corresponding to the region, the video associated with the video message. This improves video playing flexibility. For example, if the first manner is playing audio in the video, the user performs an operation on the first region, so that the electronic device can play the audio in the video associated with the video message. For another example, if the second manner is playing at least one frame of image in the video, the user performs an operation on the second region, so that the electronic device can play the at least one frame of image in the video associated with the video message.

It should be understood that "at least one" in embodiments of this application means one or more. "A plurality of" means two or more than two. "And/or" describes an association relationship between associated objects, and indicates that three relationships may exist. For example, A and/or B may indicate the following three cases: Only A exists, both A and B exist, and only B exists. A and B may be singular or plural. The character "/" usually indicates an "or" relationship between the associated objects. At least one of the following (items) pieces or a similar expression thereof indicates any combination of these items, including a single item (piece) or any combination of a plurality of items (pieces). For example, at least one item (piece) of a, b, or c may indicate seven cases: a, b, c, a and b, a and c, b and c, or a, b, and c. Each of a, b, and c may be an element, or may be a set including one or more elements.

In this application, "for example", "in some embodiments", "in some other embodiments", and the like are used for representing giving an example, an illustration, or a description. Any embodiment or design scheme described as an "example" in this application should not be explained as being more preferred or having more advantages than another embodiment or design scheme. Exactly, the word such as example is used for presenting a concept in a specific manner.

It should be noted that in embodiments of this application, words such as "first" and "second" are merely used for distinguishing and description, but should not be understood as indicating or implying relative importance, or should not be understood as indicating or implying a sequence.

An electronic device in embodiments of this application supports installation of an instant messaging application. The instant messaging application may be installed before delivery of the electronic device, or may be installed by a user based on a requirement of the user. This is not limited. For example, the electronic device in embodiments of this application may be a portable terminal, for example, a mobile phone, a tablet computer, a notebook computer, or a wearable electronic device (e.g., a smartwatch). For example, the portable terminal is equipped with an operating system, including but not limited to IOSC), Android®, Windows®, or another operating system. In addition, the electronic device in embodiments of this application may not be a portable terminal, for example, may be a desktop computer having a touch-sensitive surface.

For example, FIG. 1 is a schematic diagram of a structure of an electronic device according to an embodiment of this application. Specifically, as shown in the figure, the electronic device includes a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

The processor 110 may include one or more processing units. For example, the processor 110 may include an application processor (AP), a modem, a graphics processing unit (GPU), an image signal processor (ISP), a controller, a video codec, a digital signal processor (DSP), a baseband processor, and/or a neural-network processing unit (NPU). Different processing units may be independent components, or two or more different processing units may be integrated into one component.

A memory may be further disposed in the processor 110, and is configured to store a computer program and/or data. In some embodiments, the memory in the processor 110 is a cache. The memory may store a computer program and/or data that has been used or cyclically used by the processor 110. If the processor 110 needs to use the computer program and/or the data again, the processor 110 may directly invoke the computer program and/or the data from the memory. This avoids repeated access, reduces waiting time of the processor 110, and improves system efficiency.

In some embodiments, the processor 110 may include one or more interfaces. For example, the processor 110 includes the universal serial bus (USB) interface 130 and the subscriber identity module (SIM) interface 195. For another example, the processor 110 may further include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), and/or a general-purpose input/output (GPIO) interface.

It may be understood that an interface connection relationship between the modules illustrated in this embodiment of this application is merely an example for description, and does not constitute a limitation on the structure of the electronic device. In some other embodiments of this application, the electronic device may alternatively use an interface connection manner different from that in the foregoing embodiment, or use a combination of a plurality of interface connection manners.

The USB interface 130 is an interface that conforms to a USB standard specification, and may be specifically a mini USB interface, a micro USB interface, a USB type-C interface, or the like. The USB interface 130 may be configured to connect to a charger to charge the electronic device, or may be configured to transmit data between the electronic device and a peripheral device, or may be configured to connect to a headset, to play audio by using the headset. The interface may alternatively be configured to connect to another electronic device such as an AR device.

The SIM card interface 195 is configured to connect to a SIM card. The SIM card may be inserted into the SIM card interface 195 or removed from the SIM card interface 195, to implement contact with or separation from the electronic device. The electronic device may support two or N SIM card interfaces, where N is a positive integer greater than 2. The SIM card interface 195 may support a nano-SIM card, a micro-SIM card, a SIM card, and the like. A plurality of cards may be simultaneously inserted into a same SIM card interface 195. The plurality of cards may have a same type or different types. The SIM card interface 195 is also compatible with different types of SIM cards. The SIM card interface 195 is also compatible with an external memory card. The electronic device interacts with a network through the SIM card, to implement functions such as calls and data communication. In some embodiments, the electronic device uses an eSIM, that is, an embedded SIM card. The eSIM card may be embedded into the electronic device, and cannot be separated from the electronic device.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device may be implemented through the antenna 1, the antenna 2, the mobile communication module 150, the wireless communication module 160, the modem, the baseband processor, and the like.

The antenna 1 and the antenna 2 are configured to transmit and receive an electromagnetic wave signal. Each antenna in the electronic device may be configured to cover one or more communication frequency bands. Different antennas may alternatively be multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that is applied to the electronic device and that includes a standard such as 2G/3G/4G/5G. The mobile communication module 150 may include at least one filter, a switch, a power amplifier, a low noise amplifier (LNA), and the like.

The wireless communication module 160 may provide a wireless communication solution that is applied to the electronic device and that includes a wireless local area network (WLAN) (e.g., a Wi-Fi network), Bluetooth (BT), a global navigation satellite system (GNSS), frequency modulation (FM), a near field communication (NFC) technology, an infrared (IR) technology, or the like.

In some embodiments, the antenna 1 and the mobile communication module 150 in the electronic device are coupled, and the antenna 2 and the wireless communication module 160 in the electronic device are coupled, so that the electronic device can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device may implement a display function by using the GPU, the display 194, the application processor, and the like. The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like. The ISP is configured to process data fed back by the camera 193. For example, during photographing, a shutter is opened, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device may include one or N cameras 193, where N is a positive integer greater than 1.

The external memory interface 120 may be configured to connect to the external memory card, for example, a micro SD card, to extend a storage capability of the electronic device. The external memory card communicates with the processor 110 through the external memory interface 120, to implement a data storage function. For example, files such as audio and videos are stored in the external memory card.

The internal memory 121 includes a running memory (memory) and a built-in memory. The running memory may be configured to store a computer program and/or data, and the like. The processor 110 performs various function applications and data processing of the electronic device by running the computer program stored in the running memory. For example, the running memory may include a high-speed random access memory. The built-in memory may also be referred to as a built-in external memory or the like, and may be configured to store a computer program and/or data. For example, the built-in memory may store an operating system and an application program. The electronic device usually loads the computer program and/or the data in the built-in memory to the running memory, so that the processor 110 runs the corresponding computer program and/or data, to implement a corresponding function. In addition, the internal memory 121 may include a nonvolatile memory, for example, at least one magnetic disk storage device, a flash memory device, or a universal flash storage (UFS).

The electronic device may implement an audio function such as music playing and recording by using the audio module 170, the speaker 170A, the receiver 170B, the microphone 170C, the headset jack 170D, the application processor, and the like.

The button 190 includes a power button, a volume button, and the like. The button 190 may be a mechanical button, or may be a touch-sensitive button. The electronic device may receive a button input, and generate a button signal input related to a user setting and function control of the electronic device.

The motor 191 may generate a vibration alert. The motor 191 may be used for a vibration alert for an incoming call, and may also be used for touch vibration feedback. For example, touch operations performed on different applications (e.g., photographing and audio playing) may correspond to different vibration feedback effects. For touch operations on different regions of the display 194, the motor 191 may also correspondingly generate different vibration feedback effects. Different application scenarios (e.g., a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

It may be understood that the structure shown in this embodiment of this application does not constitute a specific limitation on the electronic device. In some other embodiments of this application, the electronic device may include more or fewer components than those shown in the figure, or some components may be combined, or some components may be split, or a different component arrangement may be used. The components shown in the figure may be implemented by hardware, software, or a combination of software and hardware.

The method in embodiments of this application is described in detail by using a mobile phone having a hardware structure of the electronic device shown in FIG. 1 as an example.

In response to an operation of opening an instant messaging application by a user, the electronic device may display a user chat interface of the instant messaging application. For example, the operation of opening the instant messaging application by the user may be an operation of tapping an icon of the instant messaging application by the user, or may be a voice instruction for opening the instant messaging application, or may be a shortcut gesture operation. This is not limited. For example, as shown in FIG. 2A-A, an interface 10 is a schematic diagram of the user chat interface of the instant messaging application. As shown in the figure, the interface 10 includes a region 210 and a region 220. The region 210 is used for displaying a chat history of the user. The region 220 is a control display region. For example, as shown in FIG. 2A-A, the region 210 includes a chat history between a user 1 and a user 2, and the region 220 includes a control 201, a control 202, a control 203, and a control 204. In response to tapping the control 201 by the user, the electronic device switches the control 202 to a control 202', so that the user can send a voice by performing an operation on the control 202'; and the electronic device presents, in the user chat interface, a voice message associated with the voice, for example, as shown in FIG. 2A-B. The user taps the voice message in the user chat interface, so that the electronic device can play, for the user, the voice associated with the voice message. In addition, when the region 210 includes the control 202', in response to an operation of tapping the control 201 by the user, the electronic device may switch the control 202' to the control 202, so that the user can perform an operation on the control 202 to send text; and the electronic device presents the text in the user chat interface. The control 203 is configured to input a sticker. The control 201 is configured to implement more functions, for example, photographing, a voice call, and a video call. This is not limited.

For example, as shown in FIG. 2B-A, the user taps the control 204, so that the electronic device displays a region 230. The region 230 includes one or more controls, for example, a control 205. The user taps the control 205, so that the electronic device displays a photographing interface. For example, as shown in FIG. 2B-B, the photographing interface may include a photographing preview region 240 and a control 206. The user may lightly tap the control 206 to take a photo, or hold the control 206 to record a video. For example, in response to releasing the control 206 by the user, the electronic device displays a photographing completion interface. For example, as shown in FIG. 2B-C, the photographing completion interface may include a photographing preview region 250 and a control 207. The user may preview a shot image or a recorded video in the photographing preview region 250. For example, in response to tapping a control 208 by the user, the electronic device may exit a photographing display interface, delete the recorded video or the shot image, and display the user chat interface. For example, the user chat interface may be as shown in FIG. 2A-B. For another example, when shot content is a video a, in response to tapping the control 207 by the user, the electronic device sends the video a, and displays a video message a in a first style in the interface 10, where the video message a is associated with the video a, for example, as shown in FIG. 2B-D. In response to an operation of tapping the video message a displayed in the first style in the interface 10, the electronic device plays the video a in full screen mode. Specifically, that the electronic device plays the video a in full screen mode may be understood as follows: The electronic device displays and sequentially plays a plurality of frames of images in the video a in full screen mode, and plays audio in the video a. Therefore, when a video message is displayed in the first style in the user chat interface, in response to an operation performed by the user on the video message, the electronic device can play only a video, but cannot independently play audio or a plurality of frames of images in the video.

Figure 3A:
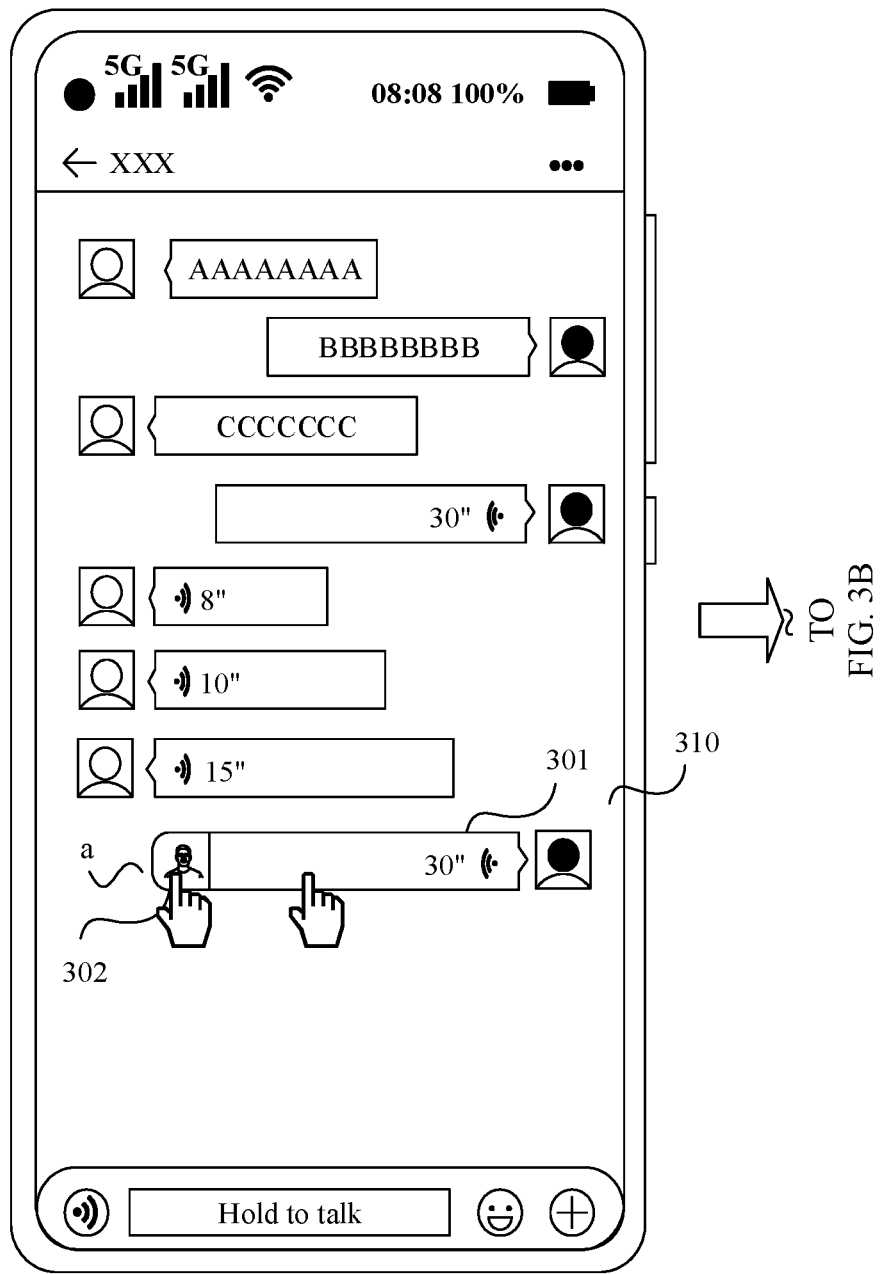
FIG. 3A to FIG. 3C are a schematic diagram of another user interface according to an embodiment of this application.

In some embodiments, the photographing completion interface as shown in FIG. 2B-C is used as an example. When the electronic device displays the photographing completion interface, in response to tapping the control 207 by the user, the electronic device sends the video a, and displays the user chat interface. For example, as shown in FIG. 3A, the user chat interface may include a region 310. The region 310 is used for displaying a chat history of the user. For example, as shown in FIG. 3A, the region 310 includes the video message a, and the video message a is displayed in a second style. The region 310 includes a region 301 and a region 302. A playing manner corresponding to the region 301 is a first manner, a playing manner corresponding to the region 302 is a second manner, and the video message a is associated with the video a. For example, in the first manner, audio in the video is mainly played; and in the second manner, an image in the video is mainly played. The region 301 corresponds to the audio, and the region 302 corresponds to the image. For example, the region 301 is used for displaying a graph related to the audio, and may be associated with the audio in the video a; and the region 302 is associated with the image in the video a. For example, the region 302 is used for displaying a thumbnail of a first image. The thumbnail of the first image may be a thumbnail of a partial region of the first image, or may be a thumbnail of an entire region of the first image. Specifically, the first image may be determined based on a predefined location in the video a. For example, the first image may be a first frame of image in the video a, or may be a last frame of image in the video a, or a frame of image in the middle of the video a. This is not limited. Alternatively, the first image may be determined by the electronic device based on an algorithm or a policy. For example, the first image is a frame of image that meets a preset condition and that is selected by the electronic device from the video a. For example, the preset condition may be that an image is relatively clear or an expression of a character is natural. Alternatively, in some other embodiments, the first image may be an image specified by the user, and is irrelevant to an image in the video a, for example, a profile photo of the user or a wallpaper. This is not limited.

When the video message a is displayed in the second style in the user chat interface, the electronic device may determine, based on whether the user performs an operation on the region 301 or the region 302, a manner of playing the video a, to be specific, determine whether to play the video a, play the audio in the video a, or play at least one frame of image in the video a. This helps improve flexibility of playing the video a. In addition, in comparison with displaying the video message a in the first style, displaying the video message a in the second style is similar to a manner of displaying a voice message. This helps reduce an area occupied by the video message a in the user chat interface. The following uses a manner 1, a manner 2, and a manner 3 as examples for description.

Manner 1

In response to tapping the region 301 by the user, the electronic device plays the audio in the video a. In this case, the electronic device does not display the at least one frame of image in the video a. In response to tapping the region 302 by the user, the electronic device plays the video a. It should be noted that the video a may be played in a small window, or may be played in full screen mode.

For example, duration of the audio in the video a is 30 seconds. In some other embodiments of this application, when the electronic device plays the audio in the video a in response to tapping the region 301 by the user, the audio in the video a has been played for a period of time, but the audio in the video a has not been completely played, for example, the audio in the video a has been played up to 15 seconds, in response to tapping the region 302 by the user, the electronic device may play the video in full screen mode starting from the $16^{th}$ second. To be specific, the electronic device sequentially plays, starting from an image located at the $16^{th}$ second, a plurality frames of images in the video a in full screen mode, and continues to play the audio in the video a.

Alternatively, in some embodiments, in response to tapping the region 302 by the user, the electronic device plays the video a. If the video a has been played for a period of time, but the video a has not been completely played, and the user taps a control 304 shown in FIG. 3C, in response to tapping the control 304 by the user, the electronic device stops playing the video a, and may continue to play the audio in the video a until the audio in the video a is completely played. Alternatively, in response to tapping the control 304 by the user, the electronic device stops playing the video a, and does not continue to play the audio in the video a.

Manner 2

Figure 3B:
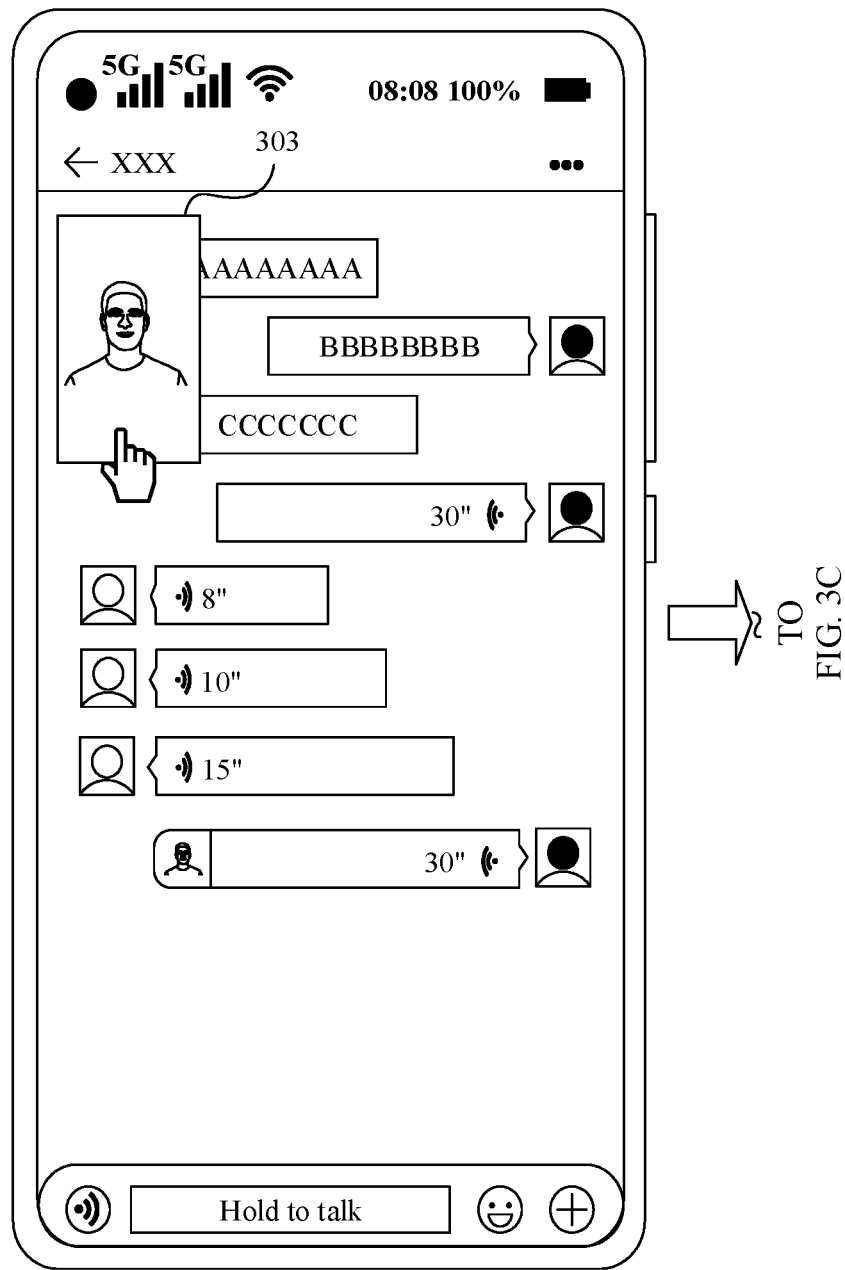
Figure 3C:
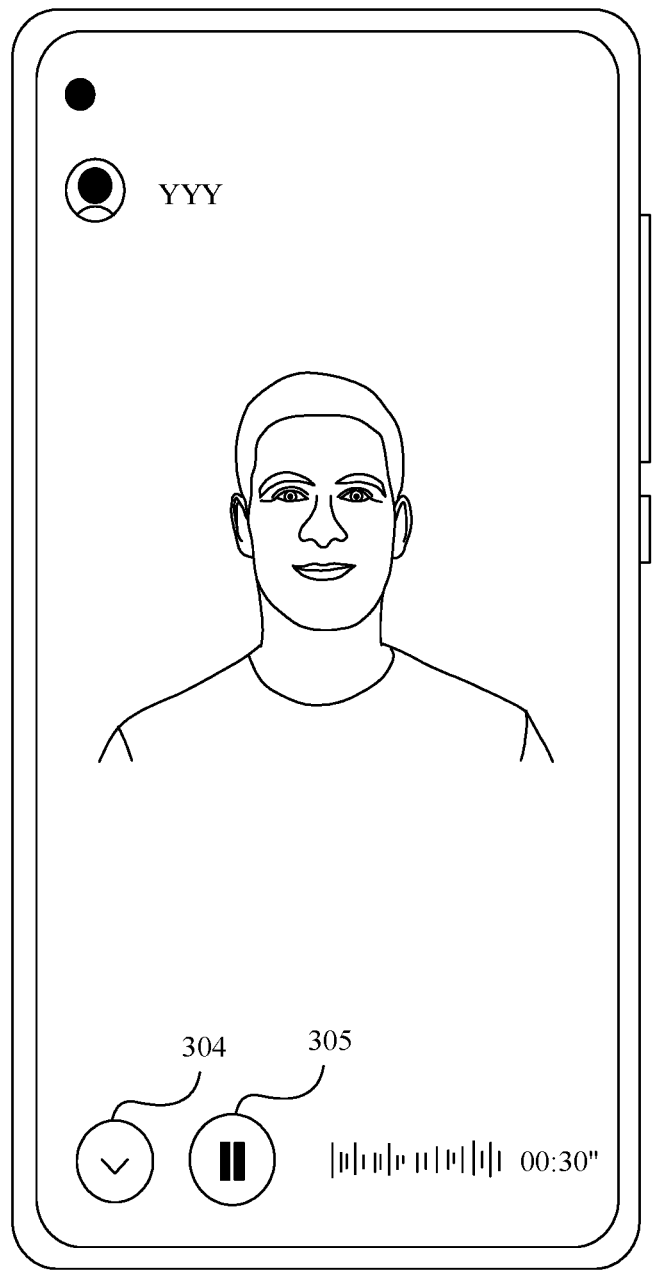

In response to tapping the region 301 by the user, the electronic device plays the audio in the video a, and plays the at least one frame of image in the video a in a small window 303 shown in FIG. 3B. In response to tapping the region 302 by the user, the electronic device plays the video a in full screen mode. To be specific, the electronic device sequentially performs full-screen display starting from the first frame of image in the video a, and simultaneously plays, starting from the $1^{st}$ second, the audio in the video a.

It should be noted that, in some embodiments, when the electronic device plays a plurality of frames of images in the video a in the small window 303, the user may move a display location of the small window 303 based on a requirement of the user. Alternatively, a display location of the small window 303 may be fixed and unmovable. This is not limited in embodiments of this application.

In some other embodiments, for example, duration of the audio in the video a is 30 seconds. In response to tapping the region 301 by the user, the electronic device plays the audio in the video a, and plays a plurality of frames of images in the video in the small window 303. When the video a has been played for a period of time, but the video a has not been completely played, for example, the video a has been played up to 15 seconds, in response to tapping the small window 303 by the user, the electronic device may play the video in full screen mode starting from the $16^{th}$ second. To be specific, the electronic device sequentially plays, starting from an image located at the $16^{th}$ second, a plurality frames of images in the video a in full screen mode, and continues to play the audio in the video a until the audio in the video a is completely played.

Manner 3

Figure 4:
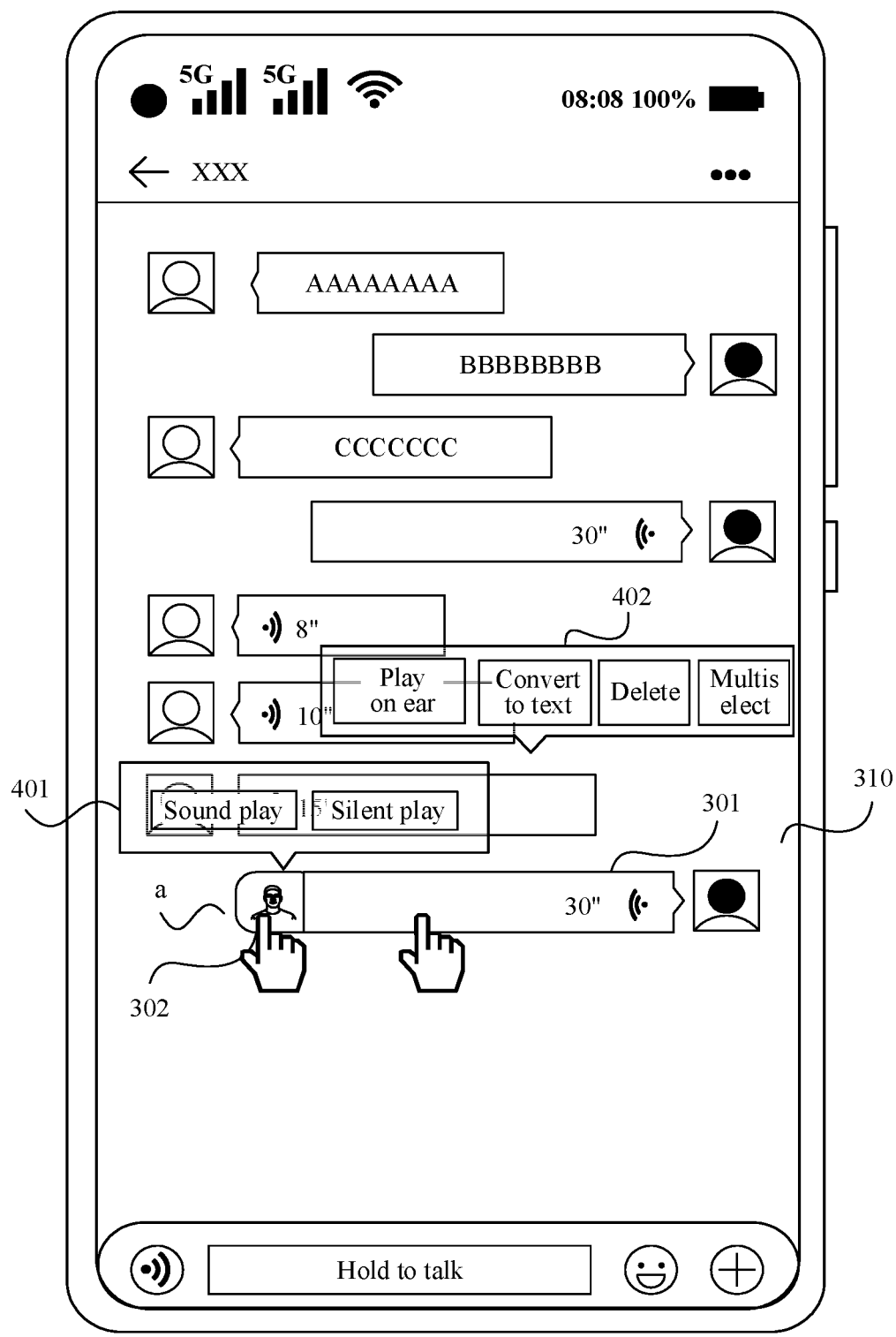
FIG. 4 is a schematic diagram of another user interface according to an embodiment of this application.

In response to touching and holding the region 301 by the user, the electronic device displays a toolbar 402. As shown in FIG. 4, the toolbar 402 includes options such as Play on ear, Convert to text, Delete, and Multiselect. In response to selecting the Play on ear option by the user, the electronic device plays the audio in the video a by using earpieces. Alternatively, in some embodiments, when the electronic device approaches a human ear, in response to tapping the region 301 by the user, the electronic device plays the audio in the video a by using earpieces. In some other embodiments, when the electronic device is far away from the human ear, in response to tapping the region 302 by the user, the electronic device plays the audio in the video a by using a speaker.

In response to touching and holding the region 302 by the user, the electronic device displays a toolbar 401. As shown in FIG. 4, the toolbar 401 includes options such as Sound play and Silent play. In response to selecting the Sound play option by the user, the electronic device plays the video a. In response to selecting the Silent play option by the user, the electronic device plays the video a in a muted manner. That the electronic device plays the video a in a muted manner may be understood as follows: The electronic device plays only the plurality of frames of images in the video a, but does not play the audio in the video a; or the electronic device plays the plurality of frames of images and the audio in the video a, but volume is set to 0. Further, in some embodiments, the electronic device may convert the audio in the video a into text, and display the text in a subtitle form when playing the plurality of frames of images in the video a. In this way, it is convenient for the user to view the video. For example, when playing the video a in a muted manner, the electronic device converts the audio in the video a into text, and displays the text in a subtitle form when playing the plurality of frames of images in the video a. In this way, the user can view the video in a quiet environment.

It should be noted that the foregoing operation of exiting or pausing full-screen playing of the video a is merely an example for description. This is not limited in embodiments of this application. For example, in embodiments of this application, the operation of exiting full-screen playing of the video a may alternatively be an operation such as sliding downward, sliding leftward, or a voice instruction.

In this embodiment of this application, because the video message is presented to the user in the second style, the user can freely choose, in different scenarios based on a requirement of the user, to play a video, audio in a video, or a plurality of frames of images in a video. This improves flexibility of playing the video. In addition, for a receiving party, in some embodiments, if the user taps only a region associated with the audio in the video in the user chat interface, the electronic device may download only the audio in the video, but not download all images in the video, and only when the user taps a region or a small window associated with the video, the electronic device downloads the images in the video. This helps save user traffic. Certainly, in this embodiment of this application, for the receiving party, the electronic device may alternatively download the audio in the video before the user taps the region associated with the audio in the video or the region associated with the video. In some embodiments, for the receiving party, the electronic device may alternatively download an image in the video before the user taps the region of the audio in the video or the region of the video, to avoid a case in which user experience is affected due to frame freezing during video playing.

Figure 5:
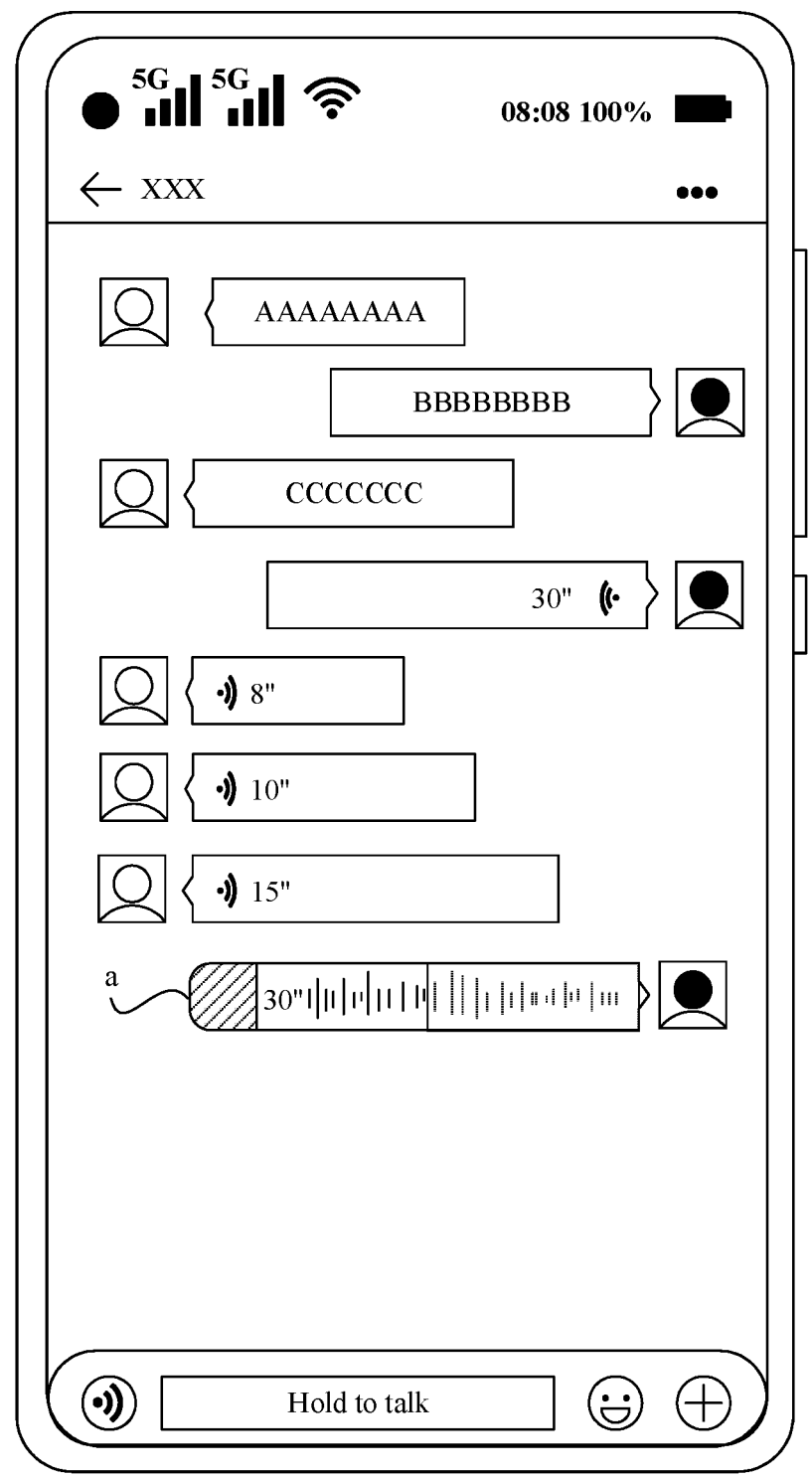
FIG. 5 is a schematic diagram of another user interface according to an embodiment of this application.

In some other embodiments of this application, when playing the audio in the video a, the electronic device may further present a playing progress of the audio to the user. For example, as shown in FIG. 5, it is convenient for the user to view the playing progress of the audio in the video.

Figure 6:
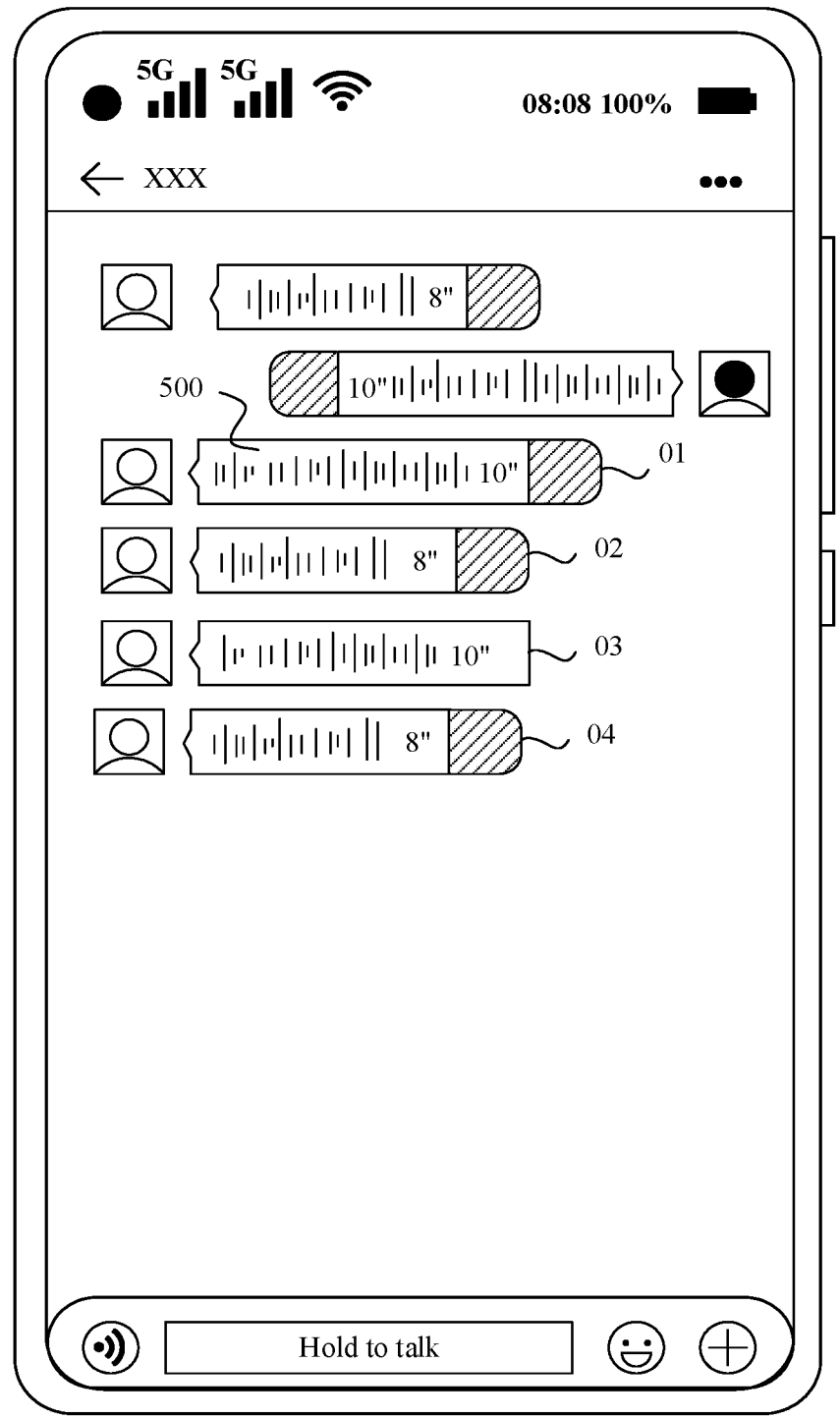
FIG. 6 is a schematic diagram of another user interface according to an embodiment of this application.

Further, in some embodiments, as shown in FIG. 6, when the user chat interface includes a video message 01, a video message 02, a voice message 03, and a video message 04, and the video message 01, the video message 02, the voice message 03, and the video message 04 are in an unread state, in response to tapping a region 500 by the user, the electronic device plays audio in a video associated with the video message 01. After the audio in the video associated with the video message 01 is completely played, the electronic device automatically and sequentially plays audio in a video associated with the video message 02, a voice associated with the voice message 03, and audio in a video associated with the video message 04 until the audio in the video associated with the video message 04 is completely played. In this way, audio in an unread state can be automatically played without an operation of the user. The region 500 is associated with audio in a video 01, and the video 01 is the video associated with the video message 01.

In addition, an embodiment of this application further provides a manner of quickly recording a video or shooting an image. FIG. 7A to FIG. 7D are used as an example. When displaying a user chat interface shown in FIG. 7A, the electronic device displays a photographing interface in response to a first operation performed by the user. For example, the photographing interface may be as shown in FIG. 7C. The user may view, in the photographing interface, an image captured by the camera in real time. For example, the first operation may be sliding upward starting from an upper boundary of a control display region.

Figure 7A:
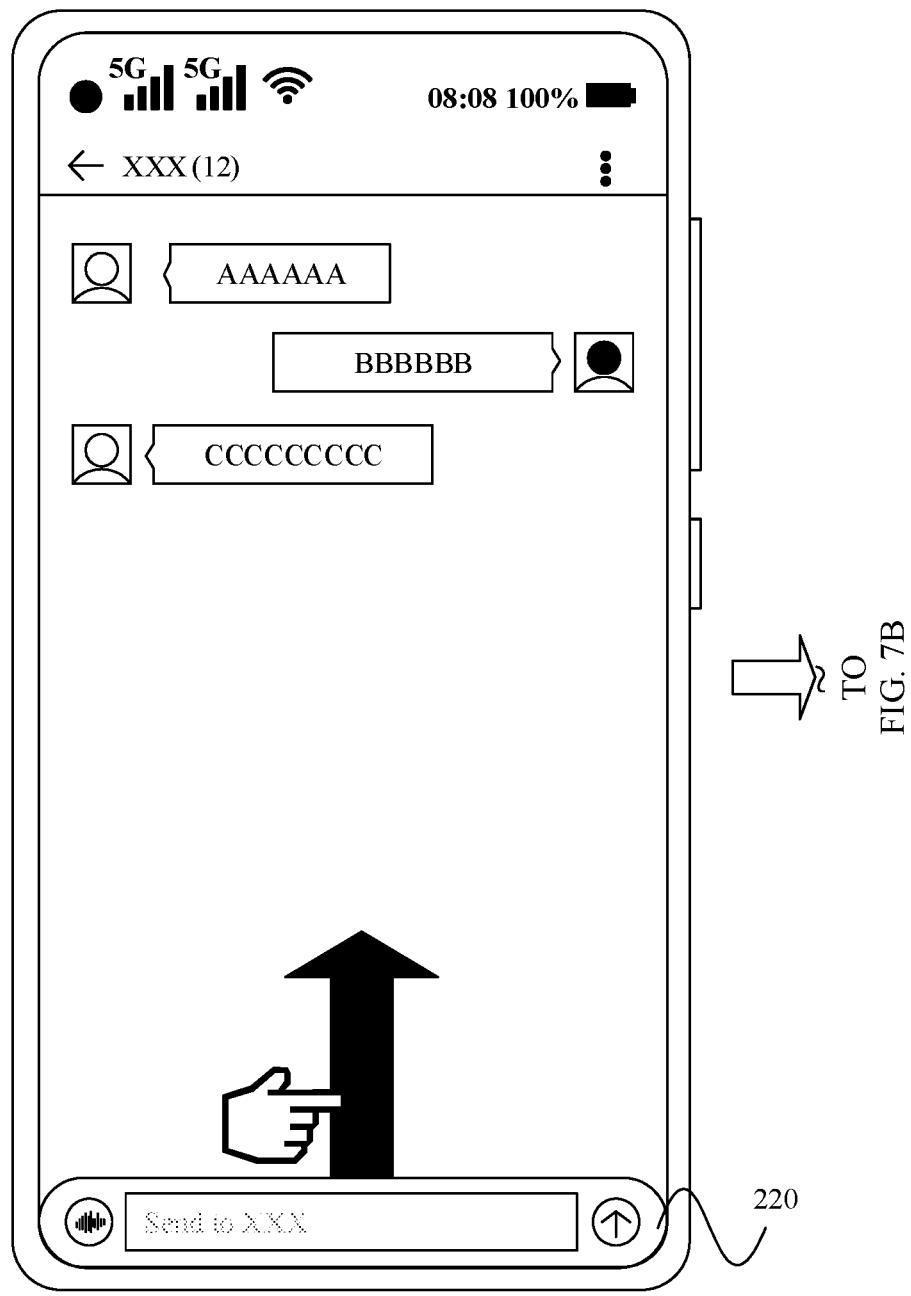
FIG. 7A to FIG. 7D are a schematic diagram of another user interface according to an embodiment of this application.
Figure 7B:
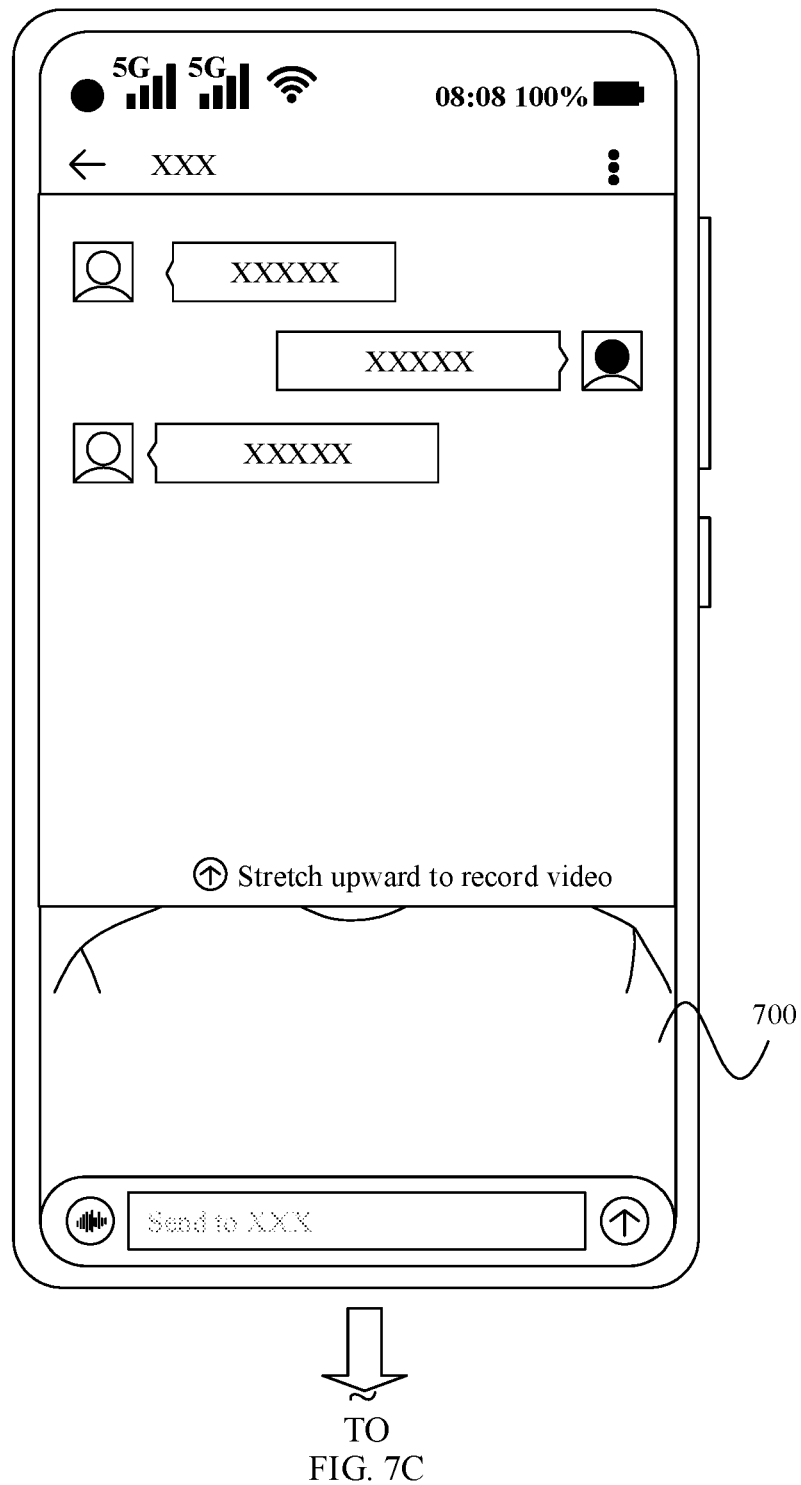
Figure 7C:
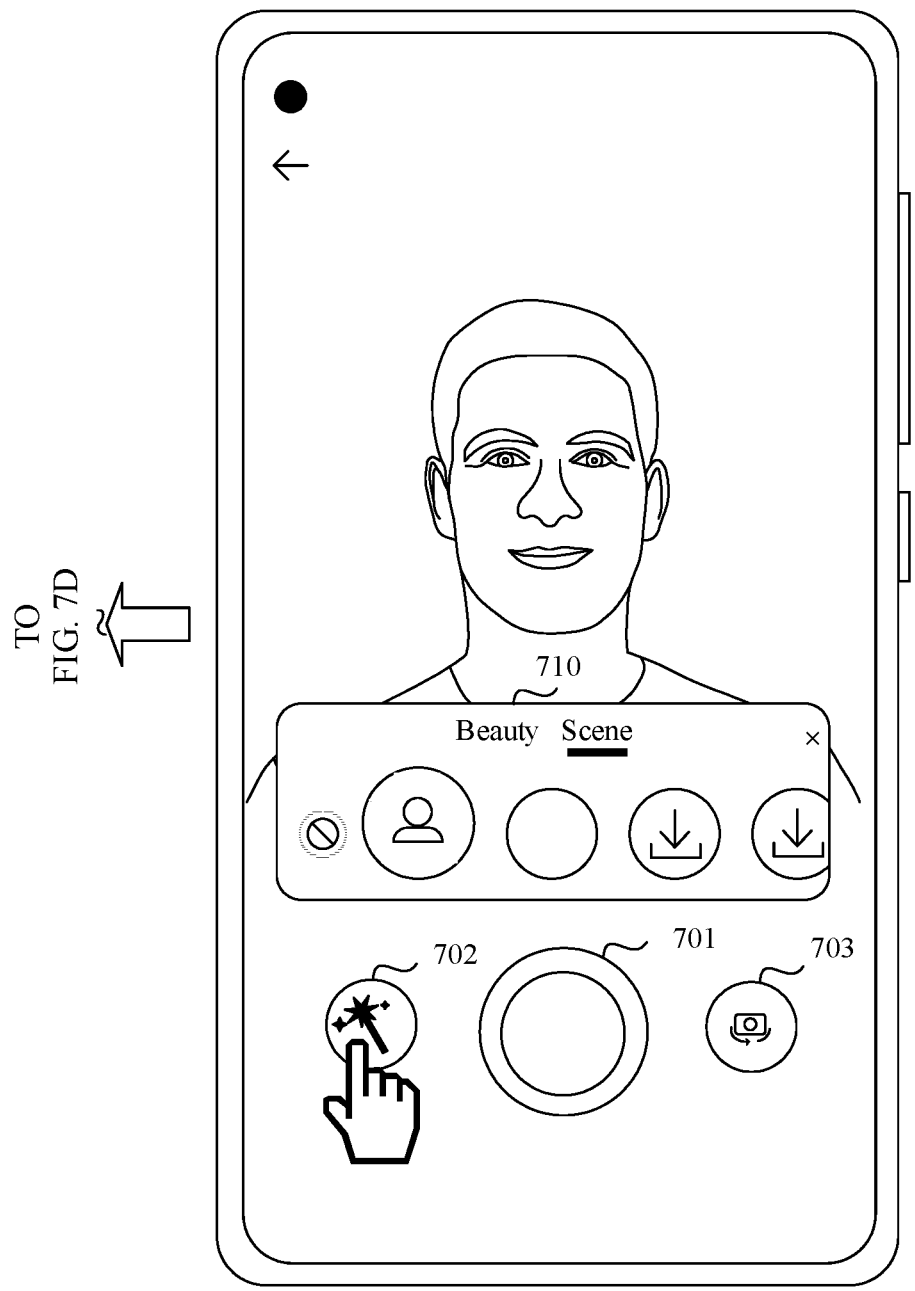

For example, the control display region may be a region 220 shown in FIG. 7A. For example, the first operation is that a finger of the user slides upward starting from the upper boundary of the control display region. As the finger of the user moves, the electronic device may dynamically present a process of stretching the photographing interface to the user. For example, FIG. 7B shows an interface obtained when the electronic device stretches the photographing interface in a process in which the finger of the user moves. A region 700 is used for displaying the image captured by the camera in real time.

Figure 7D:
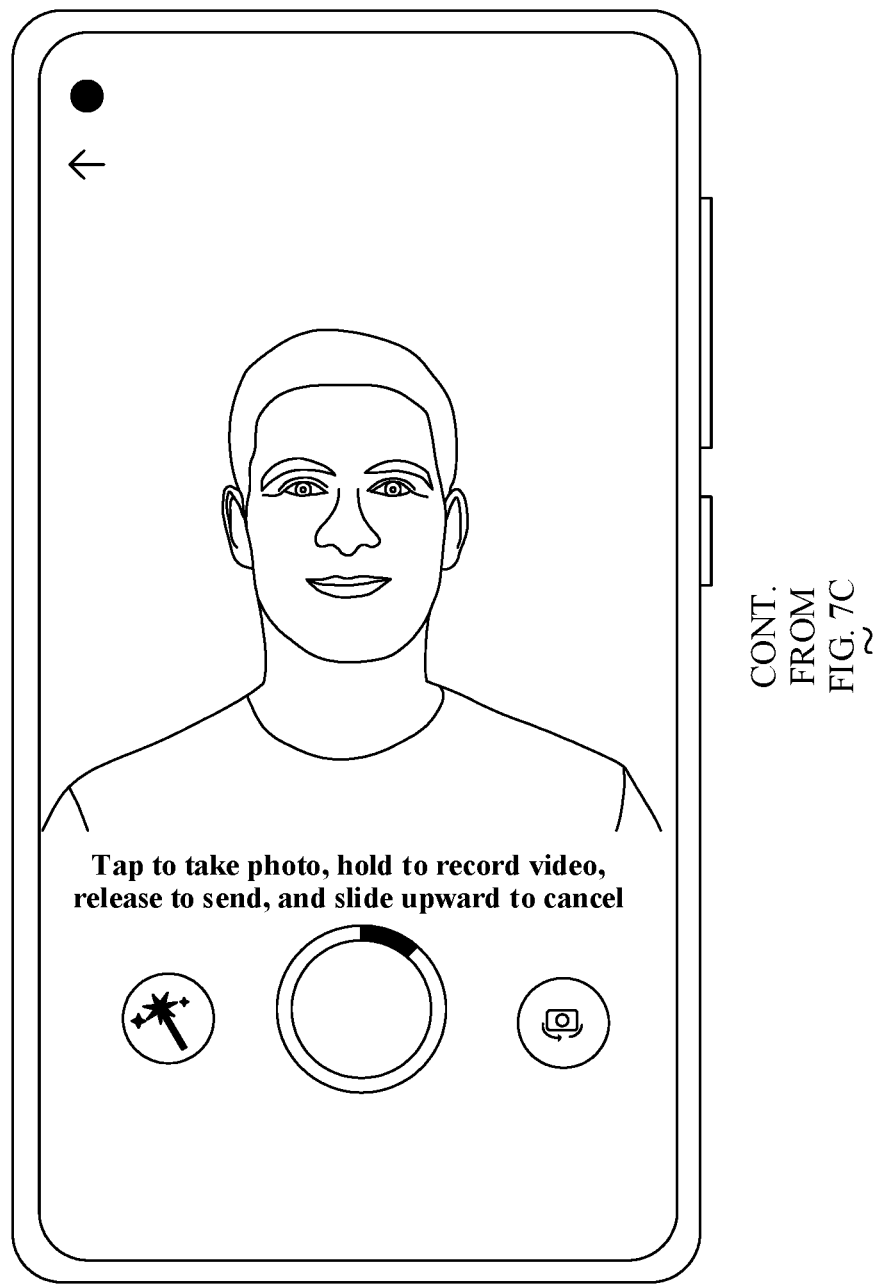

In some embodiments, as shown in FIG. 7C, the photographing interface includes one or more of a control 701, a control 702, and a control 703. For example, as shown in FIG. 7D, the electronic device shoots an image in response to tapping the control 701 by the user; the electronic device records a video in response to holding the control 701 by the user; and the electronic device sends the recorded video or the shot image in response to releasing the control 701 by the user. In a process of holding the control 701 to record the video, if the user slides upward, photographing is canceled, and the user chat interface is displayed. In some embodiments, the control 701 is further configured to display photographing duration. When the photographing duration reaches a threshold, regardless of whether the user releases the control 701, the electronic device sends the recorded video, or the electronic device stops recording the video. When the photographing duration reaches a threshold, if the electronic device stops recording the video, the electronic device sends the recorded video in response to releasing the control 701 by the user. In this case, the duration of the video sent by the electronic device may be the foregoing threshold. It should be noted that the threshold may be specified by the user based on a requirement of the user, or may be preconfigured by a device manufacturer before delivery of the electronic device. For example, the threshold may be 15 seconds, 20 seconds, or 30 seconds. This is not limited.

Figure 8:
FIG. 8 is a schematic diagram of an image shot by an electronic device according to an embodiment of this application.

The control 702 is configured to beautify the shot image or the recorded video. For example, in response to tapping the control 702 by the user, the electronic device displays a video beautification toolbar 710. When the user selects a scene option in the video beautification toolbar 710, the electronic device may display a plurality of optional background options in the video beautification toolbar 710, so that the user can select a corresponding background option based on a requirement of the user, and use a scene indicated by the background option as a background of an image shot by the camera. When the user does not select a background option, an actual photographing scene of the camera is a background of an image shot by the camera. For example, a foreground photographed by the camera is a person. As shown in FIG. 7C, the background may be an actual photographing scene of the camera, or may be a scene indicated by a background option selected by the user based on a requirement of the user. For example, the image shot by the electronic device by using the camera is as shown in FIG. 8. A person shown in FIG. 8 is the foreground, and others are the background. The user may select a background option in the video beautification toolbar 710 based on a requirement of the user, to replace the background photographed by the camera in FIG. 8.

The control 703 is configured for switching between a front-facing camera and a rear-facing camera. For example, when the electronic device currently uses the front-facing camera to perform photographing, in response to tapping the control 703 by the user, the electronic device switches to the rear-facing camera to perform photographing. For another example, when the electronic device currently uses the rear-facing camera to perform photographing, in response to tapping the control 703 by the user, the electronic device switches to the front-facing camera to perform photographing. Alternatively, the electronic device may use the front-facing camera to perform photographing by default. That is, an image presented to the user in the photographing interface is an image captured by the front-facing camera in real time.

Figure 9:
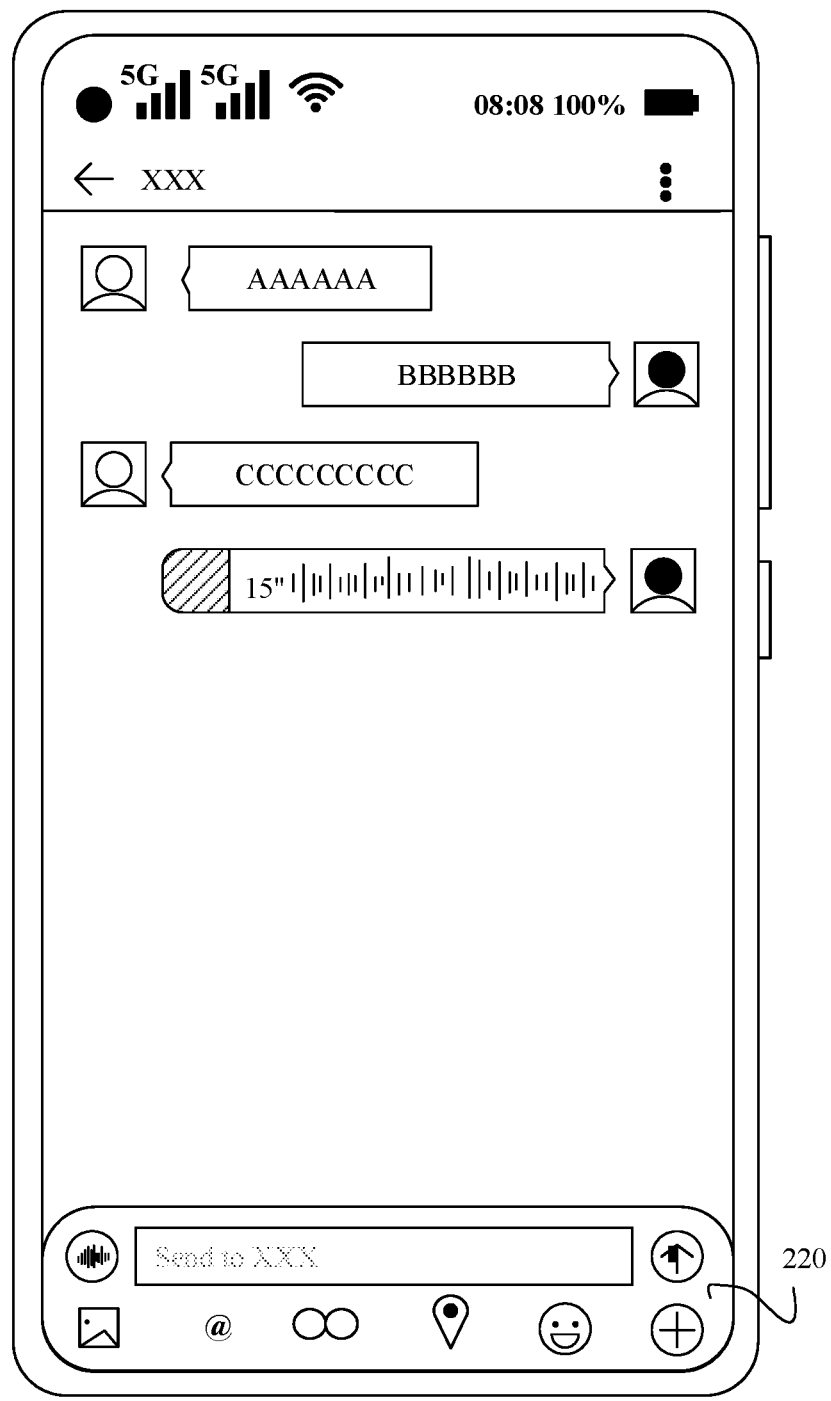
FIG. 9 is a schematic diagram of another user interface according to an embodiment of this application.

In some other embodiments, in response to releasing the control 701 by the user, the electronic device displays the user chat interface. For example, the user chat interface may be as shown in FIG. 9. A video message associated with a video recorded by the camera is displayed in the first style. In addition, for another example, as shown in FIG. 9, the region 220 may further include a plurality of controls, so that the user can not only send a message such as text or a voice message, but also send a location, a picture, or a sticker, to be convenient for the user to use.

An embodiment of this application further provides a manner of quickly recording audio and a video. FIG. 10A to FIG. 10D are used as an example. In some embodiments, when the electronic device displays a user chat interface shown in FIG. 10A, the user may hold a control 1001 to slide upward from a location 1020. As shown in FIG. 10B, if the finger is located in a region 1002 when sliding stops, the electronic device may collect a voice of the user by using a microphone. Similarly, as shown in FIG. 10B, the user may hold the control 1001 to slide upward from a location 1010. If the finger is located in a region 1003 when sliding stops, the electronic device may record a video by using the camera. Optionally, the user may preview, in the region 1002, an image captured by the camera in real time. Optionally, when recording the video by using the camera, the electronic device may enlarge the region 1002, so that the user previews the image captured by the camera in real time. Optionally, after photographing duration reaches a threshold, the electronic device may prompt the user to stop photographing. For the threshold, refer to the related description of the foregoing threshold. Details are not described herein again.

In response to releasing the finger by the user, the electronic device sends the collected voice or video, and displays a user chat interface including the voice message or the video message. For example, the video message may be displayed in the first style, or may be displayed in the second style. This is not limited. For the first style and the second style, refer to the foregoing related description. Details are not described herein again.

Optionally, during audio and video recording, the user may move the finger back and forth in the region 1002 and the region 1003, to perform audio and video mixing.

For example, the user holds the control 1001 to slide upward. In response to that the finger is located in the region 1003 when sliding stops, the electronic device collects a voice of the user by using the microphone. When the microphone collects the voice of the user, and the finger of the user slides to the region 1002, as shown in FIG. 10C, the electronic device enlarges the region 1002, and records a video by using the camera. In response to releasing the finger by the user, the electronic device sends the collected audio and video, and displays a user chat interface. The electronic device may separately send the collected video and audio by using a plurality of messages, or may send the collected video and audio by using one message. For example, when the video and the audio are sent by using one message, the message may be referred to as an audio and video message. Specifically, the audio and video message may be displayed in the first style, or may be displayed in the second style. For example, the audio and video recorded by the electronic device is an audio and video a. If the audio and video message is displayed in the first style, the audio and video message may be as shown in FIG.

For example, the voice occupies the first 15 seconds of the audio and video associated with the audio and video message, and the video occupies the last 15 seconds of the audio and video associated with the audio and video message. For example, in response to a playing operation performed by the user on the audio and video message, the electronic device plays the voice in the first 15 seconds, and plays the video in full screen mode in the last 15 seconds. When the voice occupying the first 15 seconds is played, the electronic device may display, in full screen mode, a first frame of image of the video occupying the last 15 seconds, or may display a black screen, a preset background wallpaper, a voice playing interface, or the like. This is not limited. For another example, the audio and video message is displayed in the second style. For example, in response to tapping a first region by the user, the electronic device plays the audio in the audio and video. In response to tapping a second region by the user, for a manner of playing the audio and video by the electronic device, refer to a manner of playing the audio and video when the audio and video message is displayed in the first style. The first region is associated with the audio in the audio and video, and the second region is associated with the audio and video.

It should be noted that, in this embodiment of this application, when the finger of the user stops sliding and a held location on the electronic device is located in the region 1002, a size of the region 1002 may alternatively remain unchanged, that is, the region 1002 is not enlarged. Whether the region 1002 is enlarged is not limited in embodiments of this application.

Certainly, it should be understood that, through the foregoing operation, in some embodiments, the finger of the user may move back and forth in the region 1002 and the region 1003 before the finger is released, to perform audio and video mixing. For example, the electronic device may first perform photographing, and then collect audio. In this way, flexibility of audio and video recording is improved.

It should be noted that the operation shown in FIG. 10A to FIG. 10D is merely an example. For example, the user may alternatively use a stylus to record a voice and/or a video in the foregoing manner. In addition, it should be understood that a start location at which the user holds the control 1001 to start sliding is not limited in embodiments of this application.

Figure 10A:
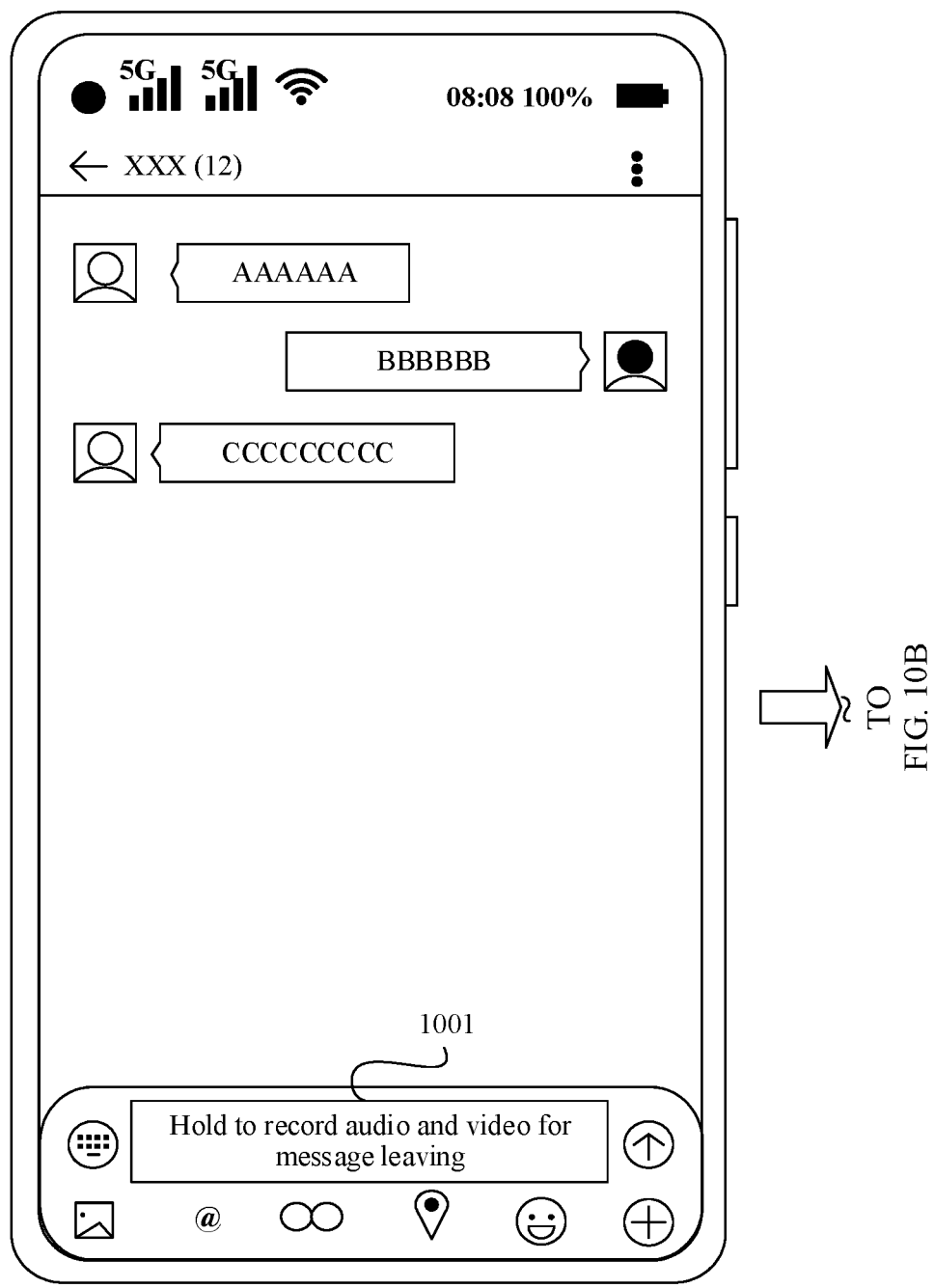
FIG. 10A to FIG. 10D are a schematic diagram of another user interface according to an embodiment of this application.
Figure 10B:
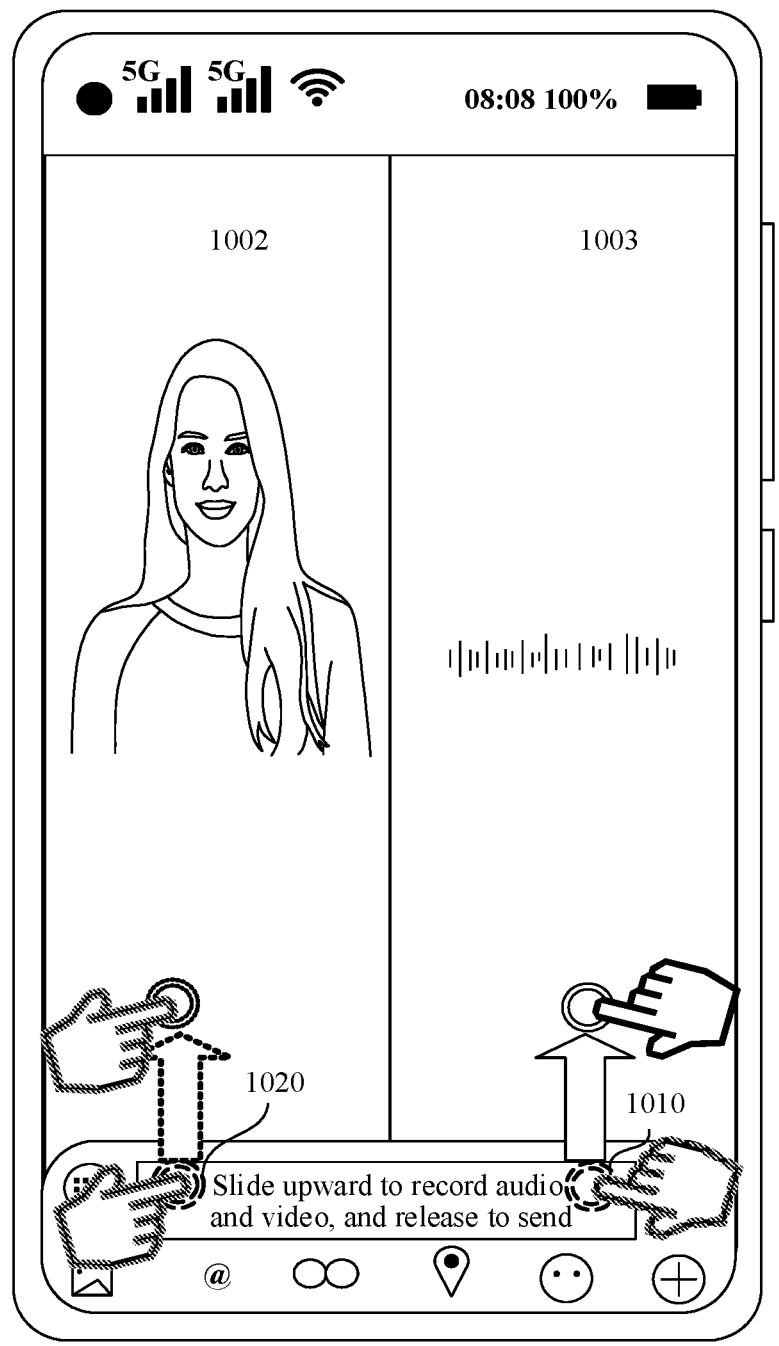
Figure 10C:
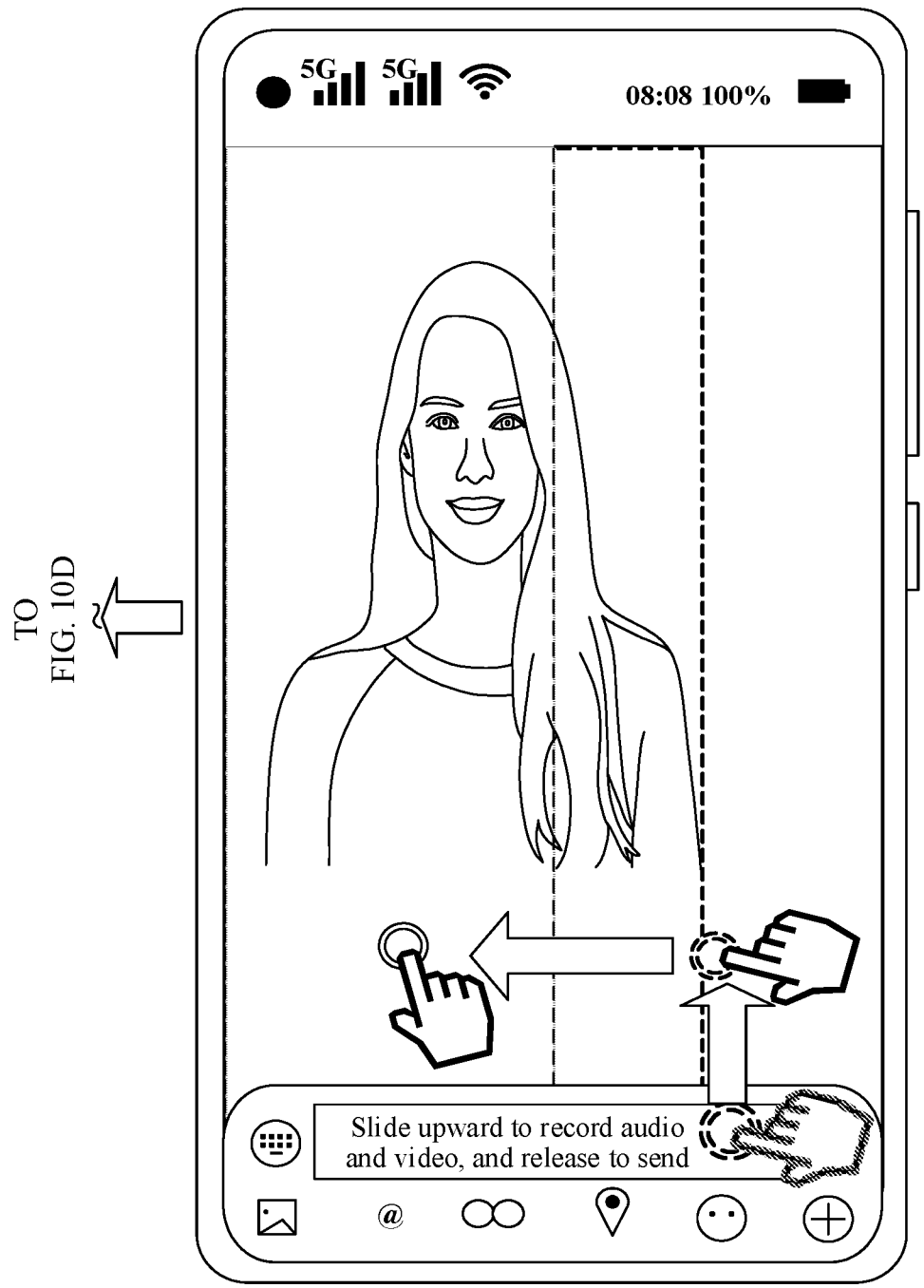
Figure 10D:
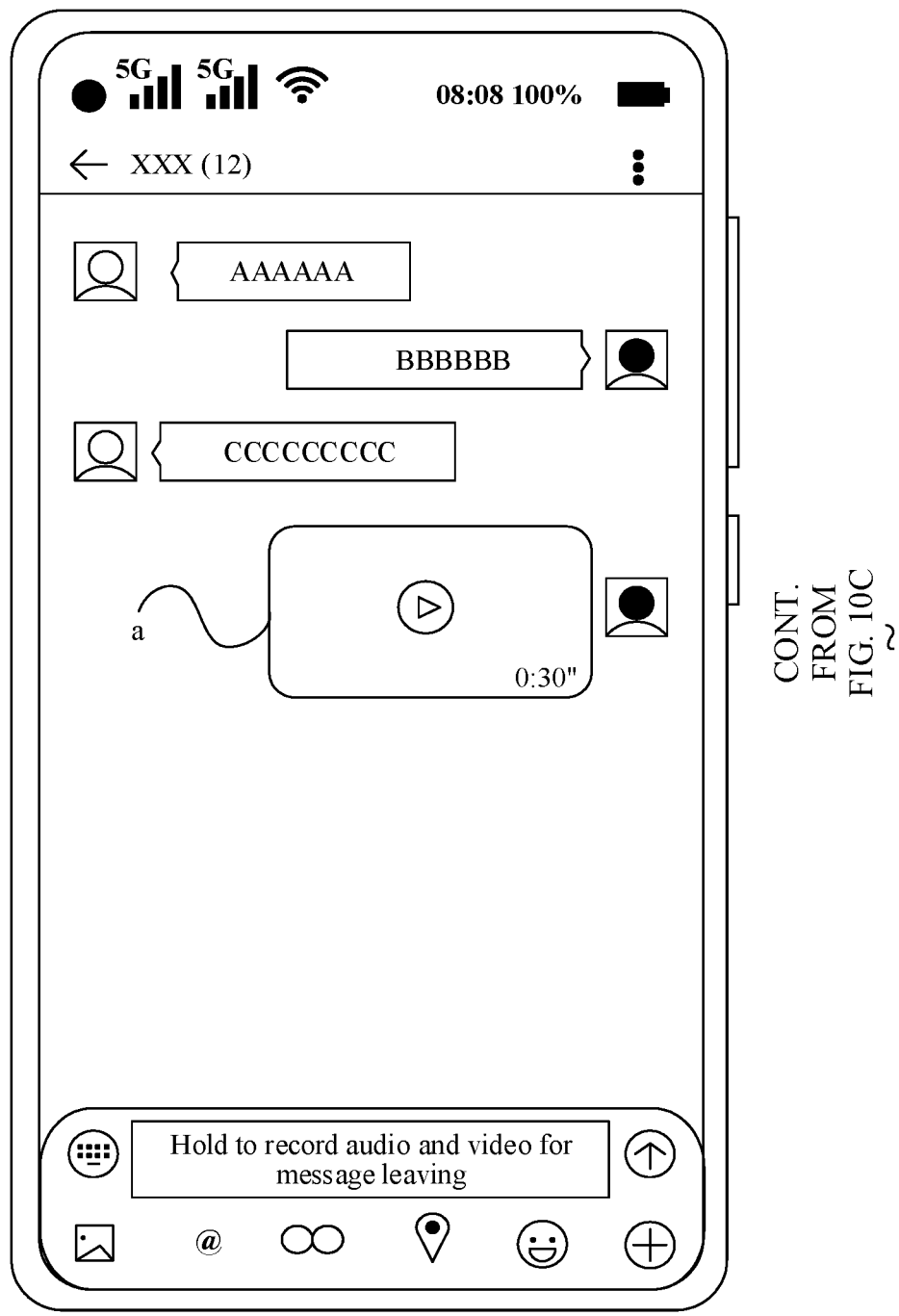
Figure 11:
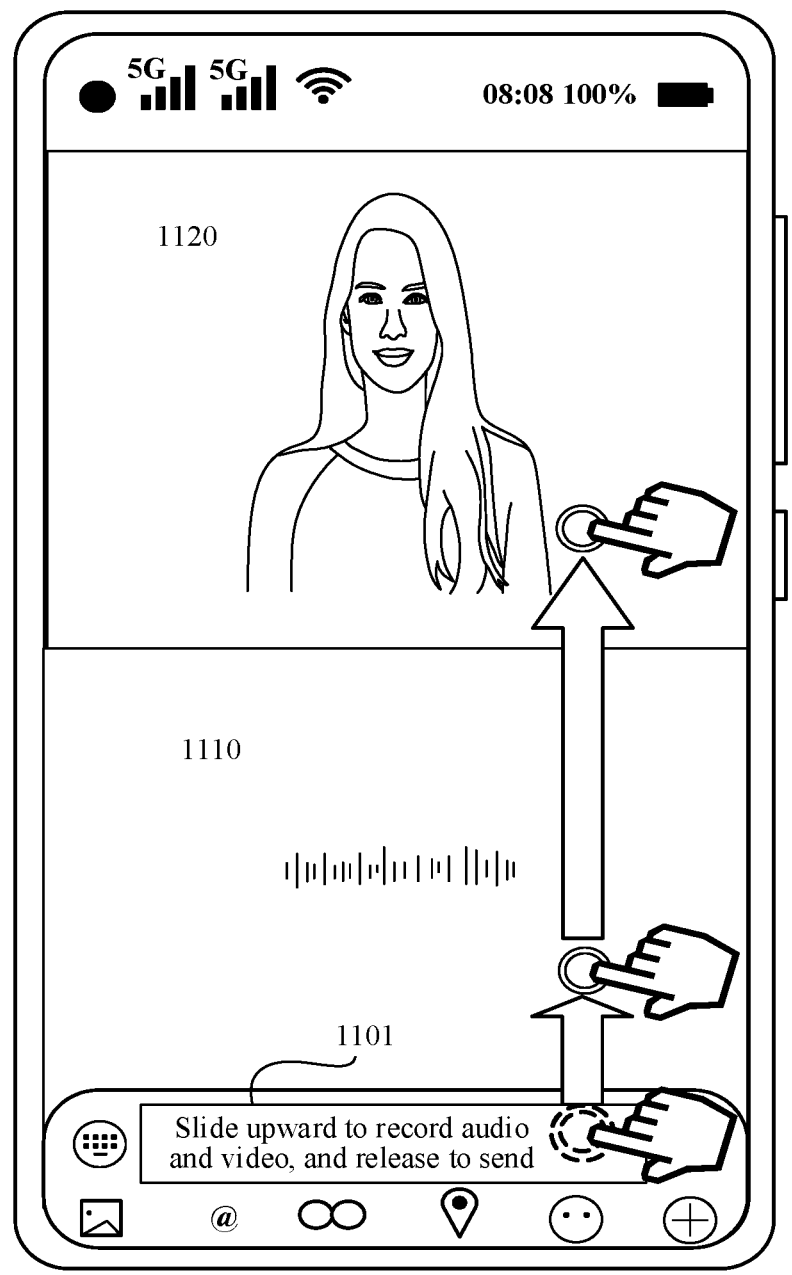
FIG. 11 is a schematic diagram of another user interface according to an embodiment of this application.

In some other embodiments, as shown in FIG. 11, when the electronic device displays the user chat interface shown in FIG. 10A, the finger of the user may hold a control 1101 to slide upward. If the finger is located in a region 1110 when sliding stops, the electronic device collects a voice of the user by using the microphone. If the finger is located in a region 1120 when sliding stops, the electronic device records a video by using the camera. Similarly, during recording, the user may slide upward or downward to perform audio and video mixing. For example, the finger of the user may slide upward from the region 1110 to the region 1120. In response to the operation, the electronic device records the video by using the camera, and displays, in the region 1120, an image captured by the camera in real time. Certainly, when the electronic device records the video, the finger of the user may alternatively slide downward from the region 1120 to the region 1110. In this case, the electronic device stops recording the video, and collects the voice by using the microphone.

Figure 12:
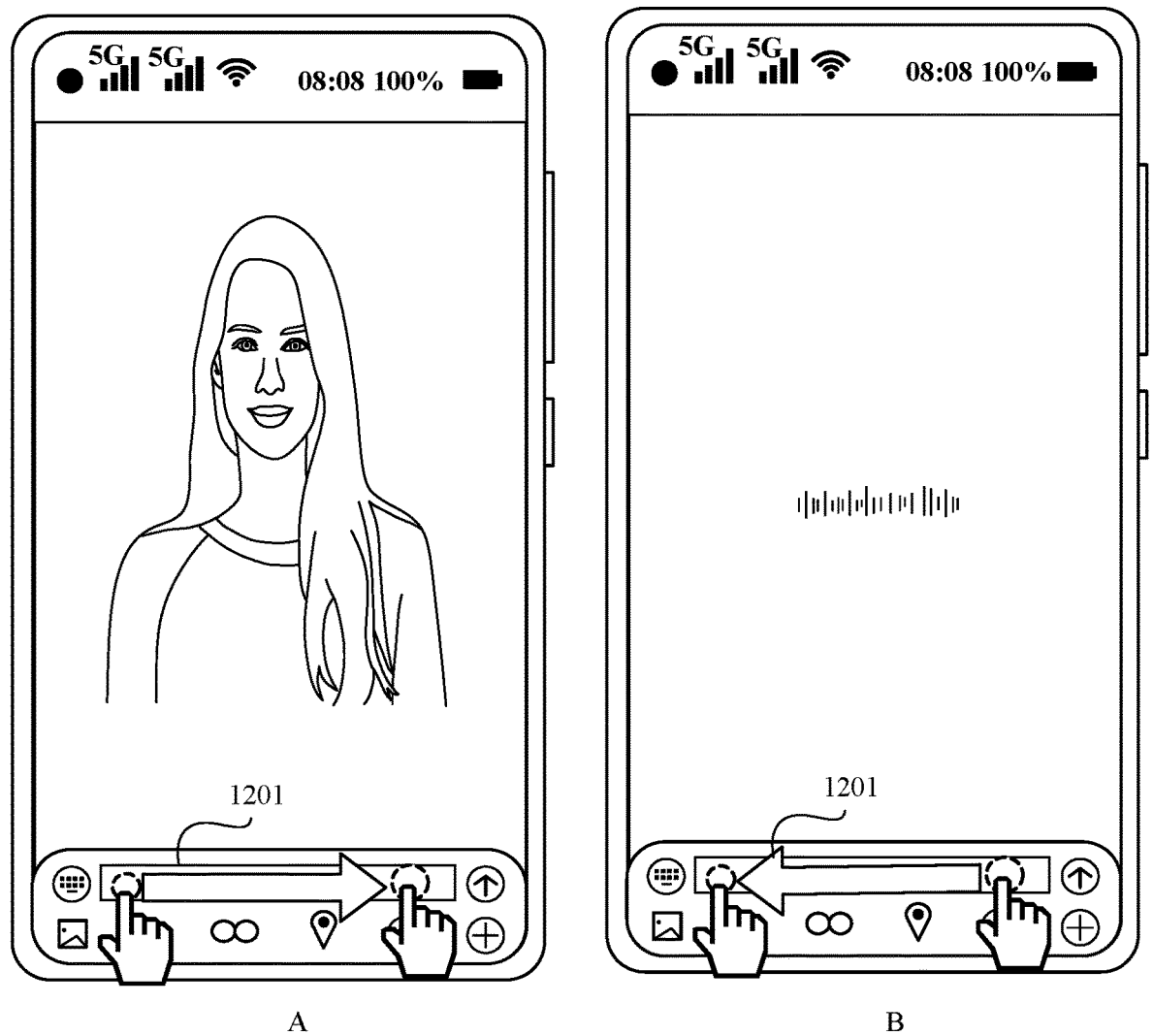
FIG. 12 is a schematic diagram of another user interface according to an embodiment of this application.

Alternatively, in this embodiment of this application, the following manner of quickly recording audio and a video may be used, and FIG. 12 is used as an example. In still some other embodiments, when the electronic device displays the user chat interface shown in FIG. 10A, the electronic device records a video in response to that the finger of the user slides from a left boundary of a control 1201 to a right boundary of the control 1201, as shown in A in FIG. 12; or the electronic device collects a voice in response to that the finger of the user slides from a right boundary of a control 1201 to a left boundary of the control 1201, as shown in B in FIG. 12. When the finger of the user releases the control 1201, the electronic device sends the recorded audio and video. It should be noted that the user may slide leftward or rightward on the control 1201 in a video recording or audio collection process, to implement voice and video mixing. When the user records the video, in a process in which the finger of the user slides from the right boundary of the control 1201 to the left boundary of the control 1201, the electronic device continues to record the video. After the finger of the user slides to the left boundary of the control 1201, the electronic device stops recording the video, and collects the voice. Alternatively, when the user collects the audio, in a process in which the finger of the user slides from the left boundary of the control 1201 to the right boundary of the control 1201, the electronic device continues to record the video. After the finger of the user slides to the right boundary of the control 1201, the electronic device stops collecting the voice, and records the video. It should be noted that, in this case, when the electronic device records the video, the user may preview, in full screen mode, the image collected by the camera in real time.

It should be understood that, when the manner of quickly recording audio and a video shown in FIG. 12 is used, the electronic device may alternatively collect the voice in response to that the finger of the user slides from the left boundary of the control 1201 to the right boundary of the control 1201, and record the video in response to that the finger of the user slides from the right boundary of the control 1201 to the left boundary of the control 1201.

It should be noted that the foregoing manner of quickly recording a voice and/or a video provided in FIG. 11 or FIG. 12 is described by using an example in which the user performs an operation by using the finger. It may be understood that the user may alternatively perform an operation by using the stylus instead of the finger.

Figure 13A:
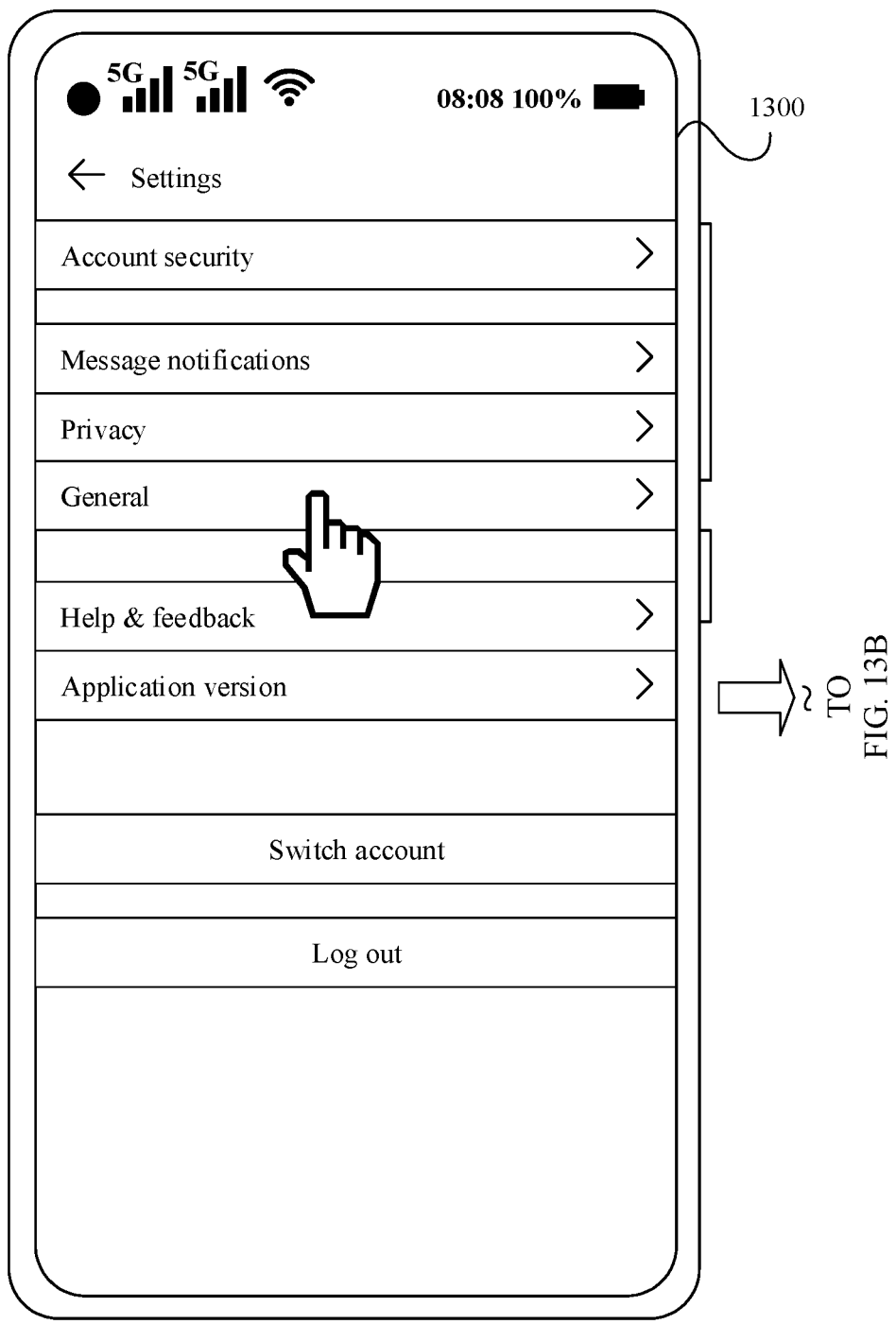
FIG. 13A and FIG. 13B are a schematic diagram of another user interface according to an embodiment of this application.
Figure 13B:
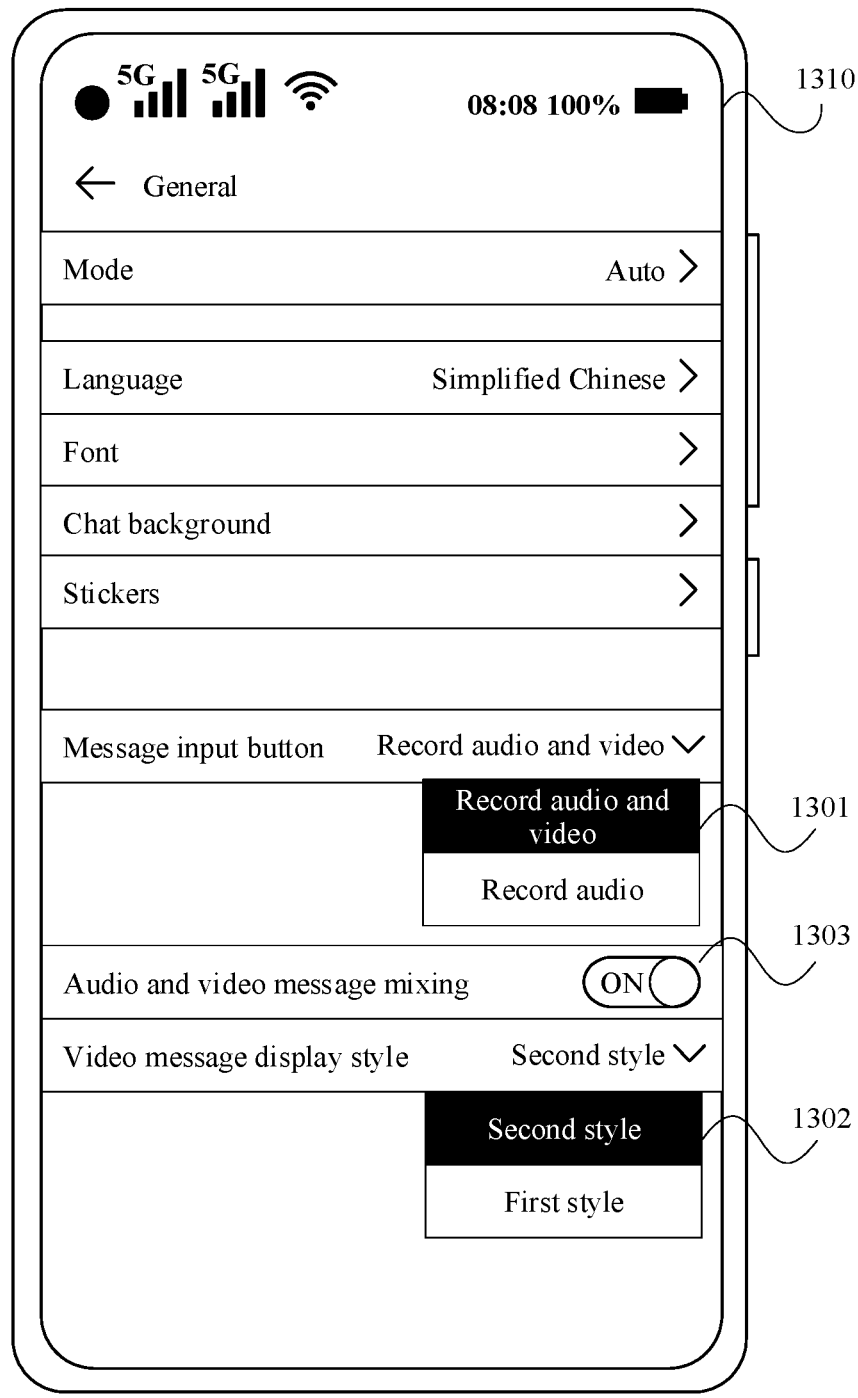

In this embodiment of this application, when the electronic device enables an audio and video message mixing function, the user may perform audio and video mixing in the foregoing operation manner. For example, the user may enable the audio and video message mixing function in a setting interface of the instant messaging application. For example, as shown in FIG. 13A and FIG. 13B, an interface 1310 is a schematic diagram of a setting interface of an application, and includes a plurality of setting controls, for example, General, Switch account, and Log out. When the user taps communication, the electronic device displays the interface 1310. For example, the interface 1310 includes a control 1303 configured to control enabling or disabling of the audio and video message mixing function. When the control 1303 is enabled, the audio and video message mixing function of the electronic device is enabled. When the control 1303 is disabled, the audio and video message mixing function of the electronic device is enabled. That is, when the control 1303 is disabled, the electronic device cannot perform audio and video message mixing. For example, in response to an operation of enabling the control 1303 by the user, the electronic device enables the audio and video mixing function. For another example, in response to an operation of disabling the control 1303 by the user, the electronic device disables the audio and video mixing function.

In some other embodiments, the user interface 1310 may further include a message input button setting control and/or a video message display style setting control. For example, when the user taps the input button setting control, the electronic device may display a button setting list 1301. The button setting list 1301 includes a button function option, for example, Record audio and video, or Record audio. When the user selects Record audio and video, the electronic device may record an audio and video by performing an operation on the control 1001, the control 1101, or the control 1201. When the user selects Record audio, the electronic device may record audio by performing an operation on the control 1001, the control 1101, or the control 1201. For details, refer to an operation manner in which the user records audio by using the control 202 shown in FIG. 1. For another example, when the user taps the video message display style control, the electronic device displays a video message display style list 1302. For example, the video message display style list 1302 includes a first style and a second style. For example, when the user selects the second style, video messages that are associated with sent and received videos and that are in the user chat interface are displayed in the second style, and the user may choose, based on a requirement of the user, to play audio in the video or play the video. For another example, when the user selects the first style, video messages that are associated with sent and received videos and that are in the user chat interface are displayed in the first style, and the user can play only the video, but cannot choose to play audio in the video. In the foregoing manner, the user can set a video message display style, a message input button, and audio and video mixing based on a requirement of the user. This improves interaction between the electronic device and the user.

Figure 14A:
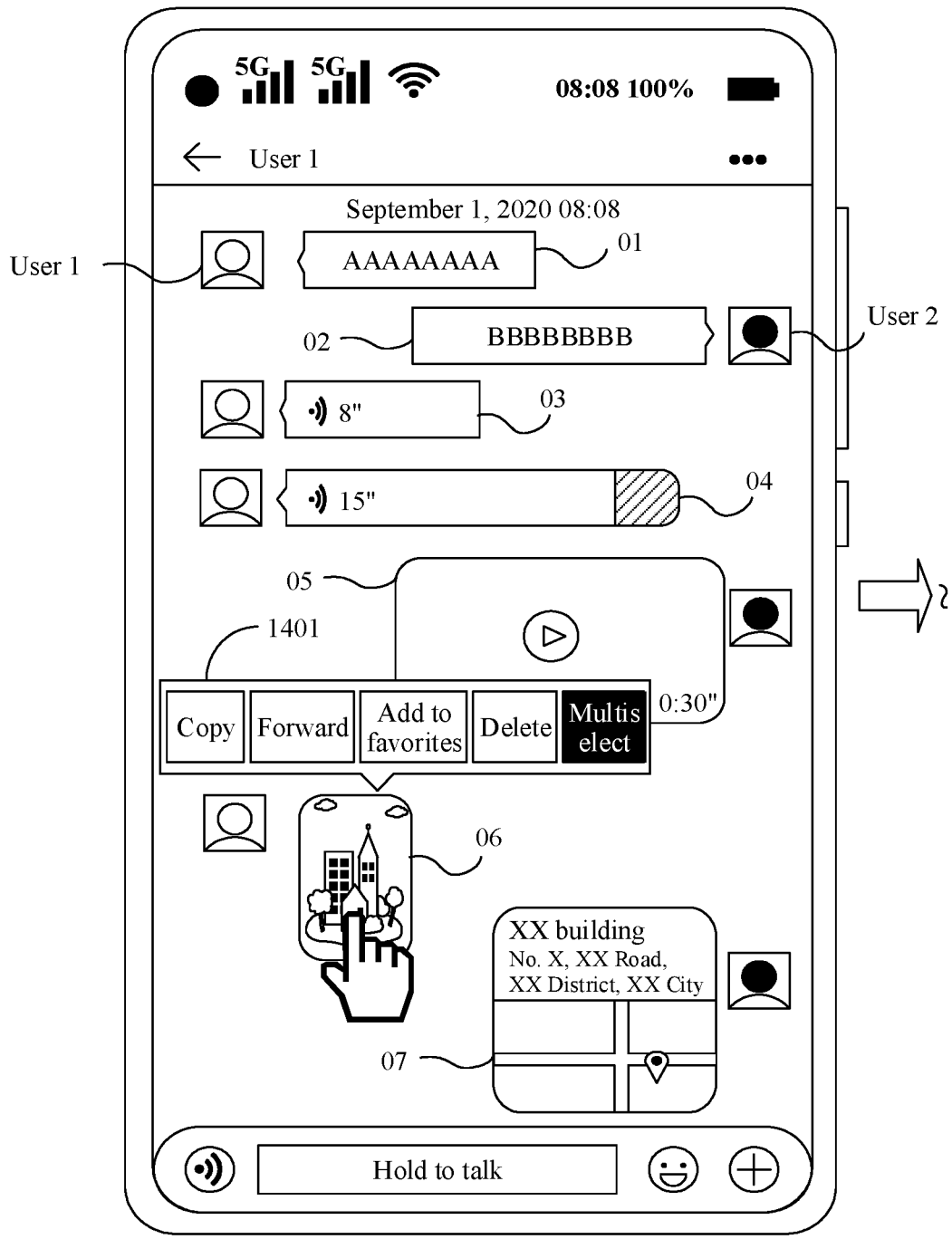
FIG. 14A to FIG. 14G are a schematic diagram of another user interface according to an embodiment of this application.
Figure 14B:
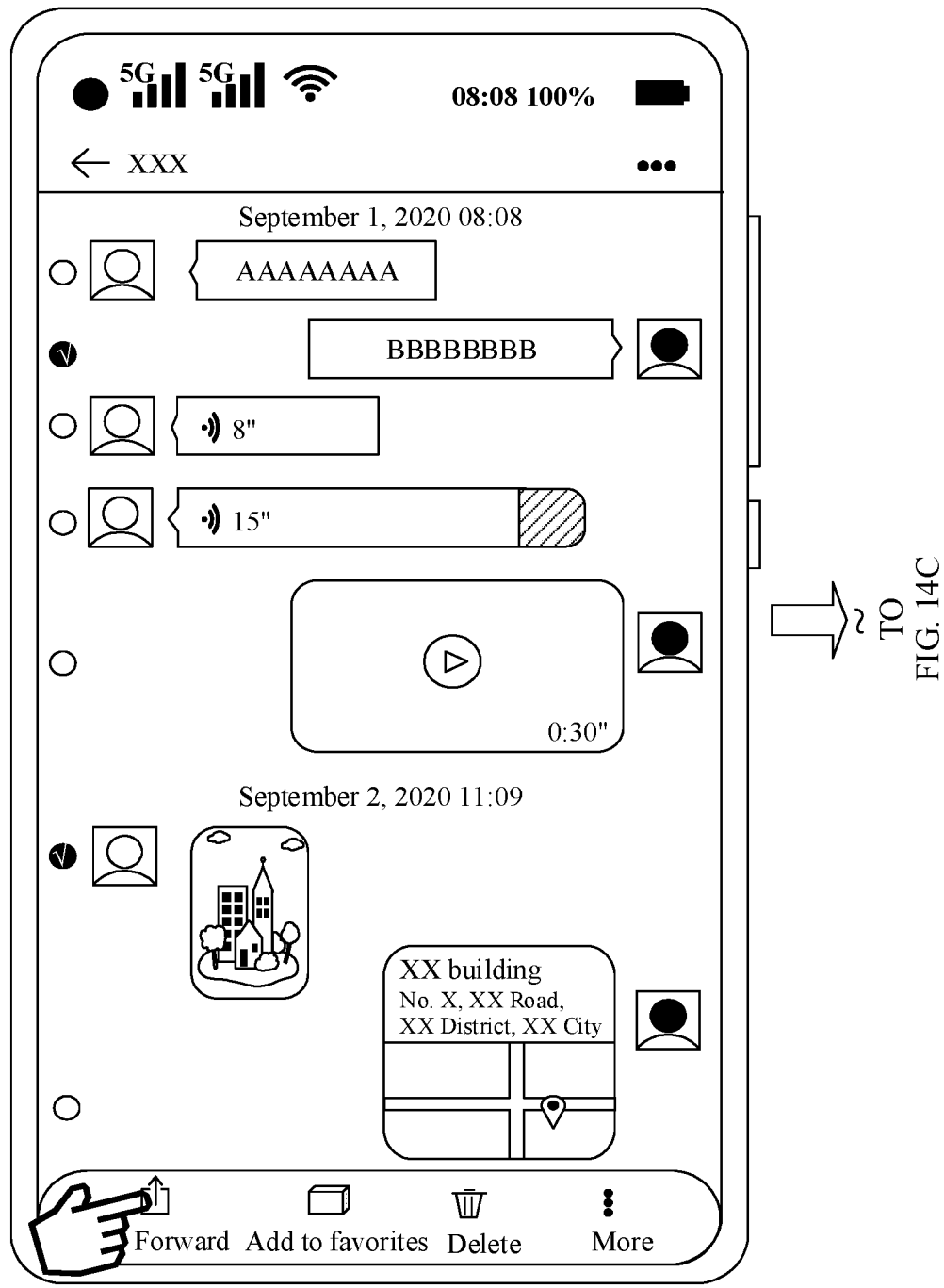
Figure 14C:
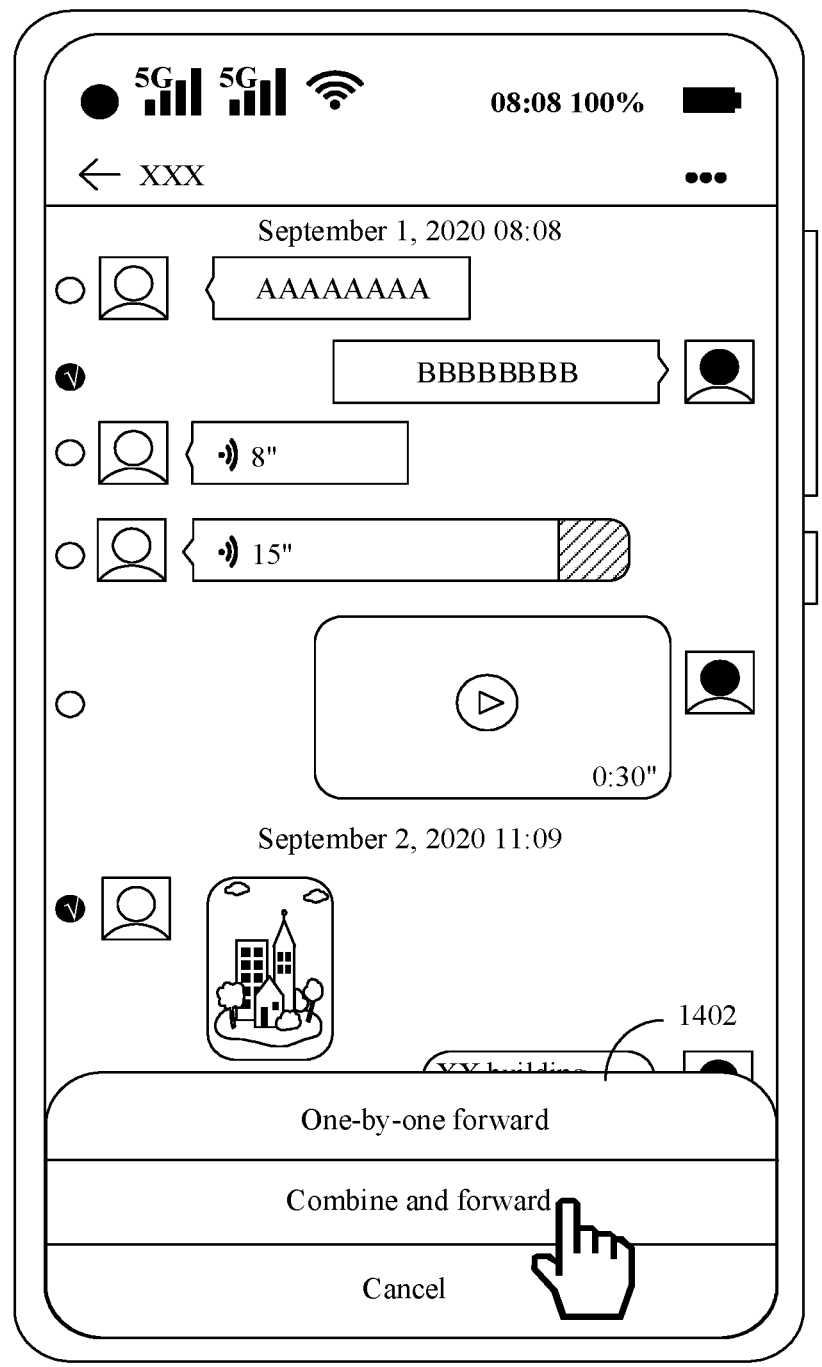
Figure 14D:
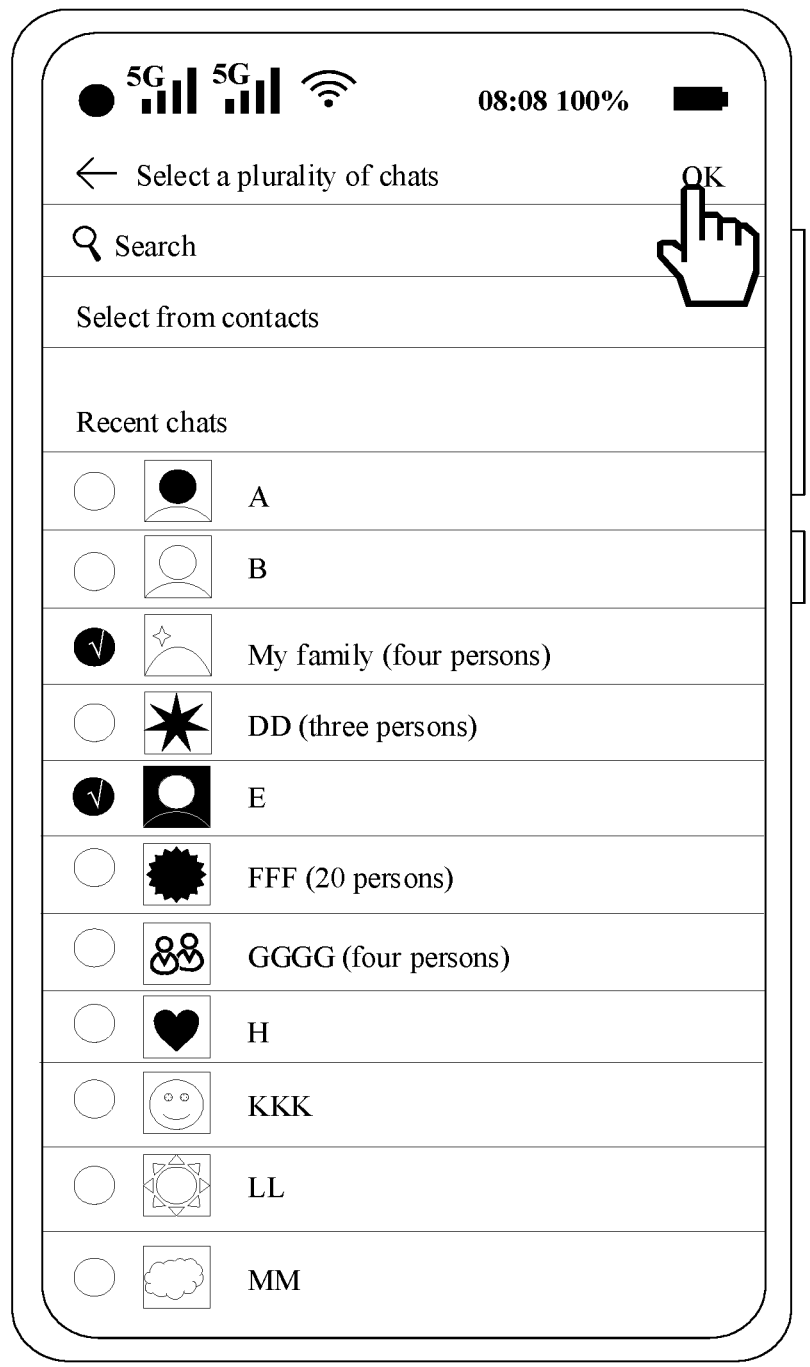
Figure 14E:
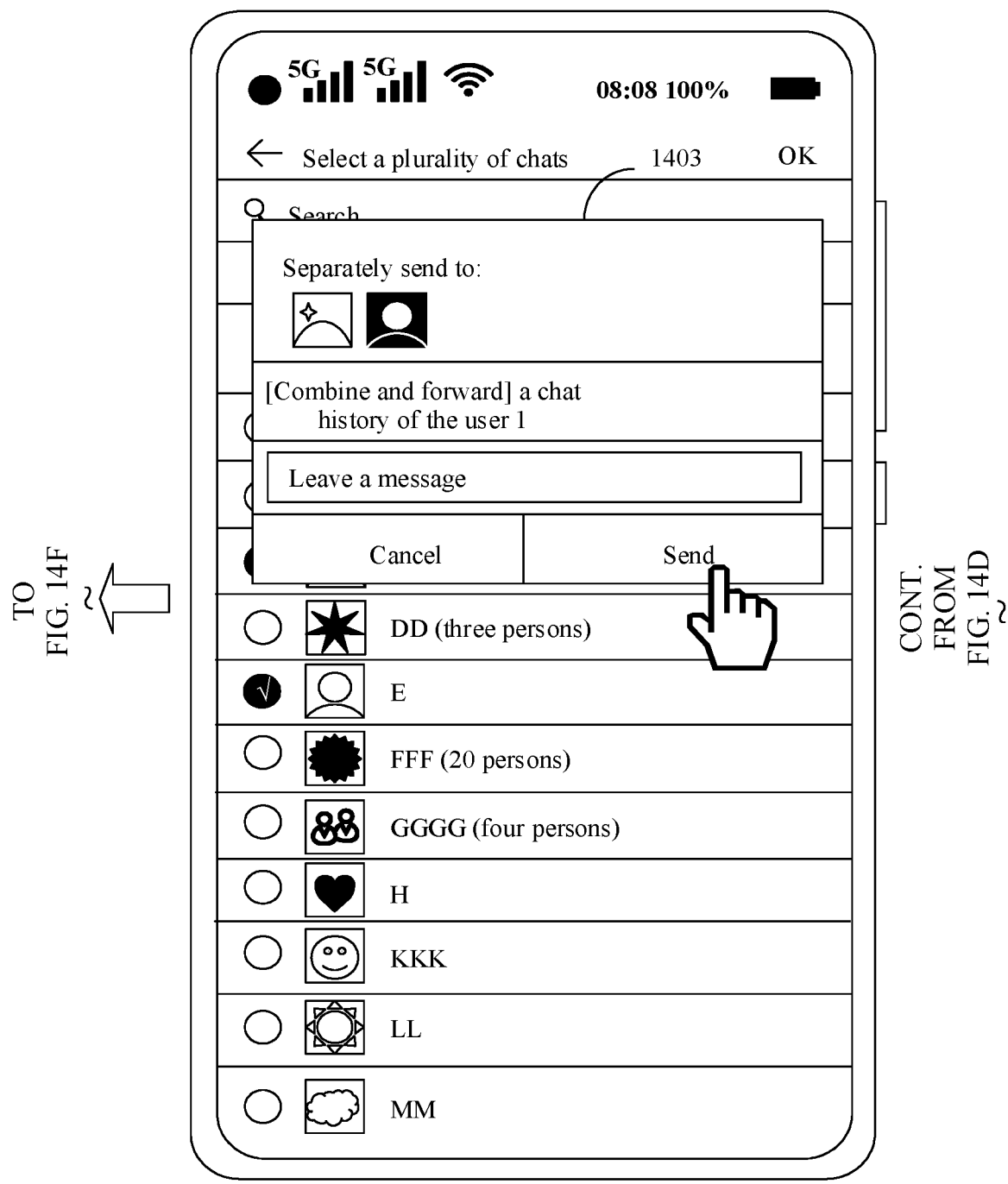
Figure 14F:
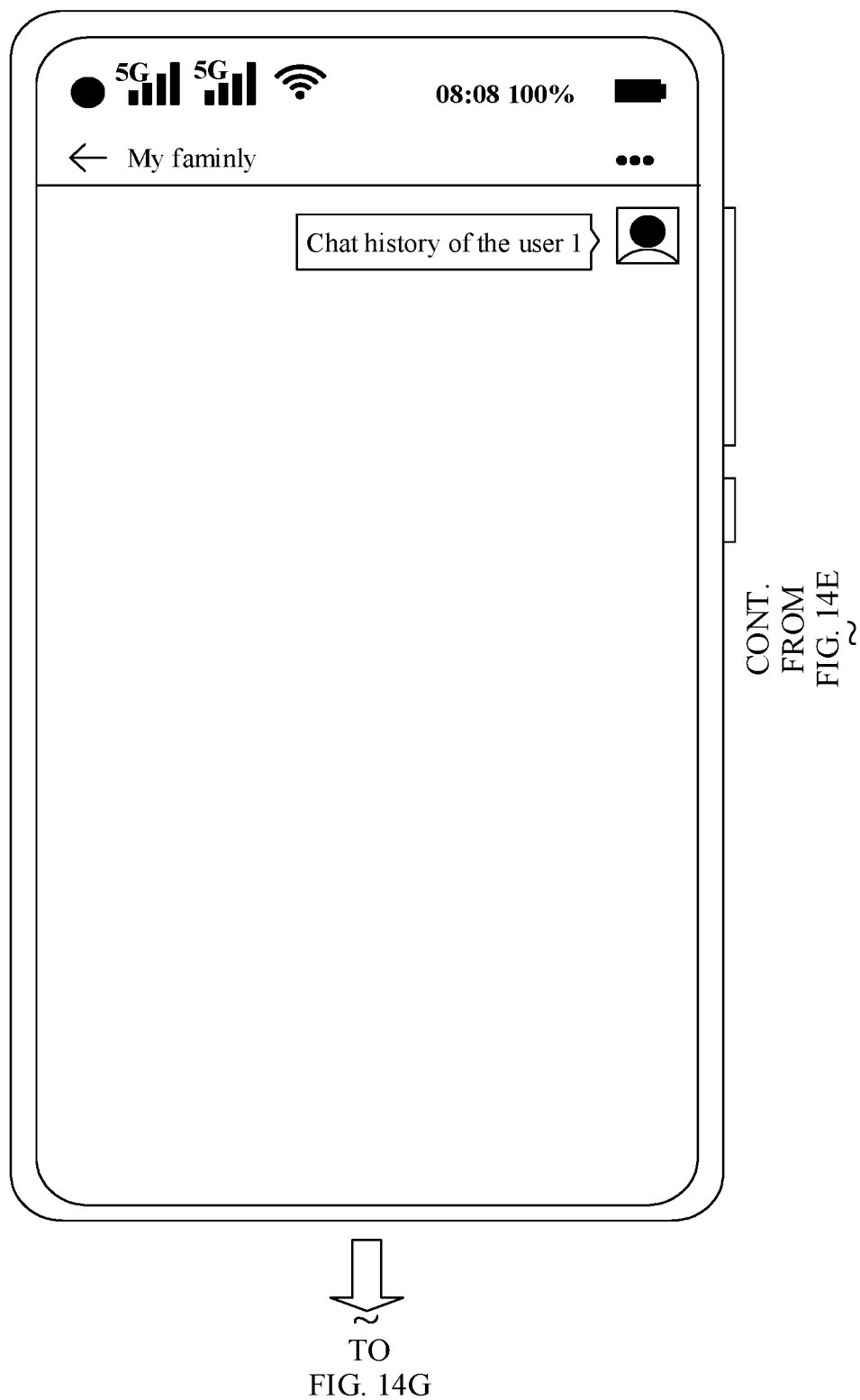
Figure 14G:
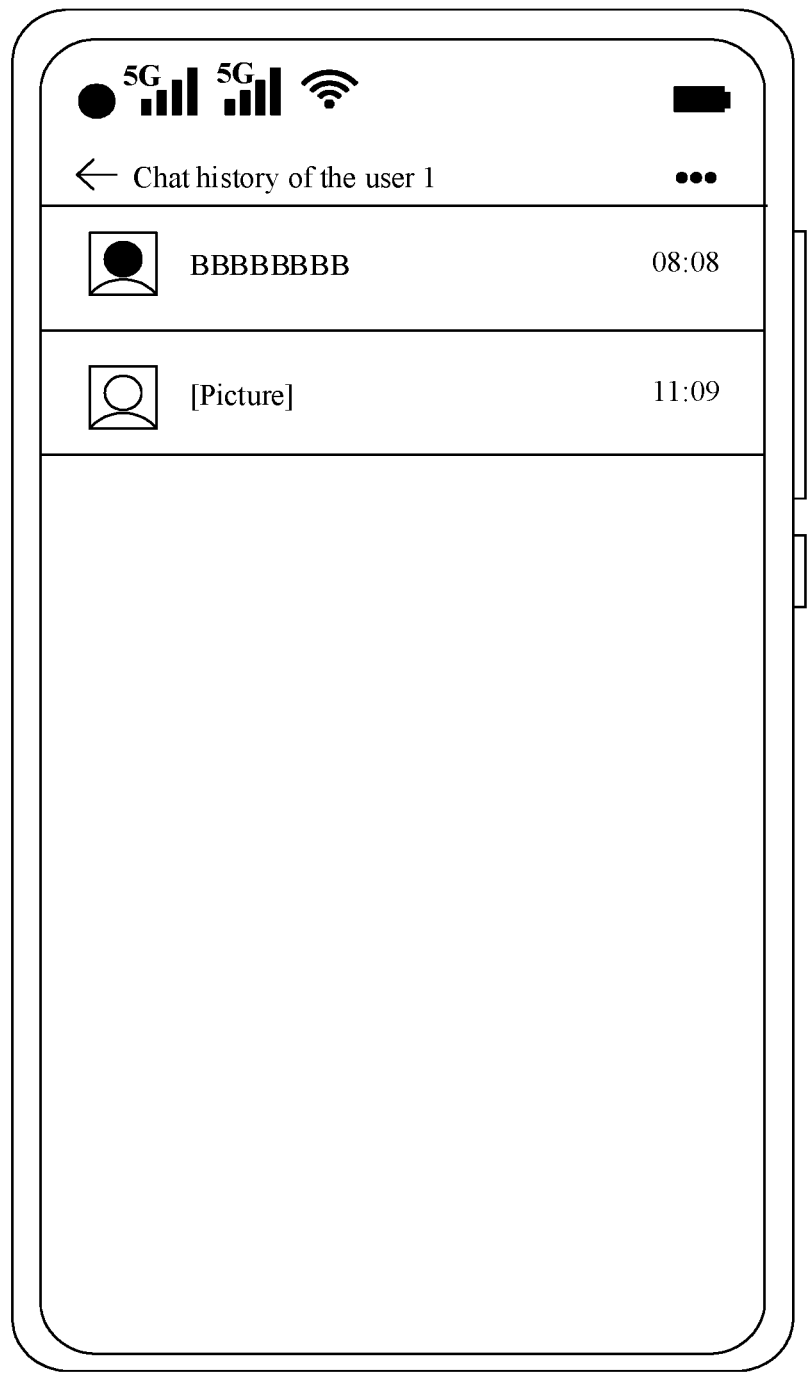

In addition, when the electronic device displays a user chat interface (e.g., a group chat interface including more than two users, or a chat interface including two users), the user may further forward chat histories one by one or combine and forward chat histories based on a requirement of the user. A chat interface including a user 1 and a user 2 is used as an example. For example, as shown in FIG. 14A, when the electronic device displays the chat interface including the user 1 and the user 2, the user touches and holds a message (e.g., a message 06), and the electronic device displays a message toolbar 1401. For example, the message toolbar 1401 includes one or more options of: Copy, Forward, Add to favorites, Delete, and Multiselect. It should be noted that options in the message toolbar 1401 displayed by the electronic device may be slightly different based on different messages touched and held by the user. For example, when a message touched and held by the user is a shared mini program or location (e.g., a message 07), the message toolbar 1401 may not include Copy. In some embodiments, when the user selects Multiselect in the message toolbar 1401, the electronic device presents a message selection control in the user chat interface, as shown in FIG. 14B. When the user selects a message 02 and a message 05, the user taps Forward, and the electronic device displays a forwarding option box 1402 in the user chat interface. For example, as shown in FIG. 14C, the forwarding option box 1402 includes a One-by-one forward option, a Combine and forward option, and a Cancel option. For example, the user selects the Combine and forward option. The electronic device displays a chat selection interface, as shown in FIG. 14D. The user may select, in the interface, a user (which may be a group or one user) to which the messages are to be sent. For example, if the user selects a user group named My family and a user named E, after the user taps OK, a combination and forwarding box 1403 is displayed, as shown in FIG. 14E. The combination and forwarding box 1403 may separately send a chat history of the user 1 to the user group or user whose name is selected. However, in the combination and forwarding box 1403, the user cannot view a quantity of messages to be forwarded by the user, and cannot modify a sending object and the message that needs to be forwarded, either. This results in poor flexibility. Forwarding to the user group named My family is used as an example. The electronic device displays the chat history of the user 1 in a chat interface whose user group name is My family, as shown in FIG. 14F. The user taps the chat history of the user 1, and messages that are in a chat interface of the user 1 and that are selected by the user are displayed in a list form, as shown in FIG. 14G. For example, if the message 06 is a picture, when displaying, in a list form, the messages that are in the chat interface of the user 1 and that are selected by the user, the electronic device cannot present the picture to the user.

Figure 15A:
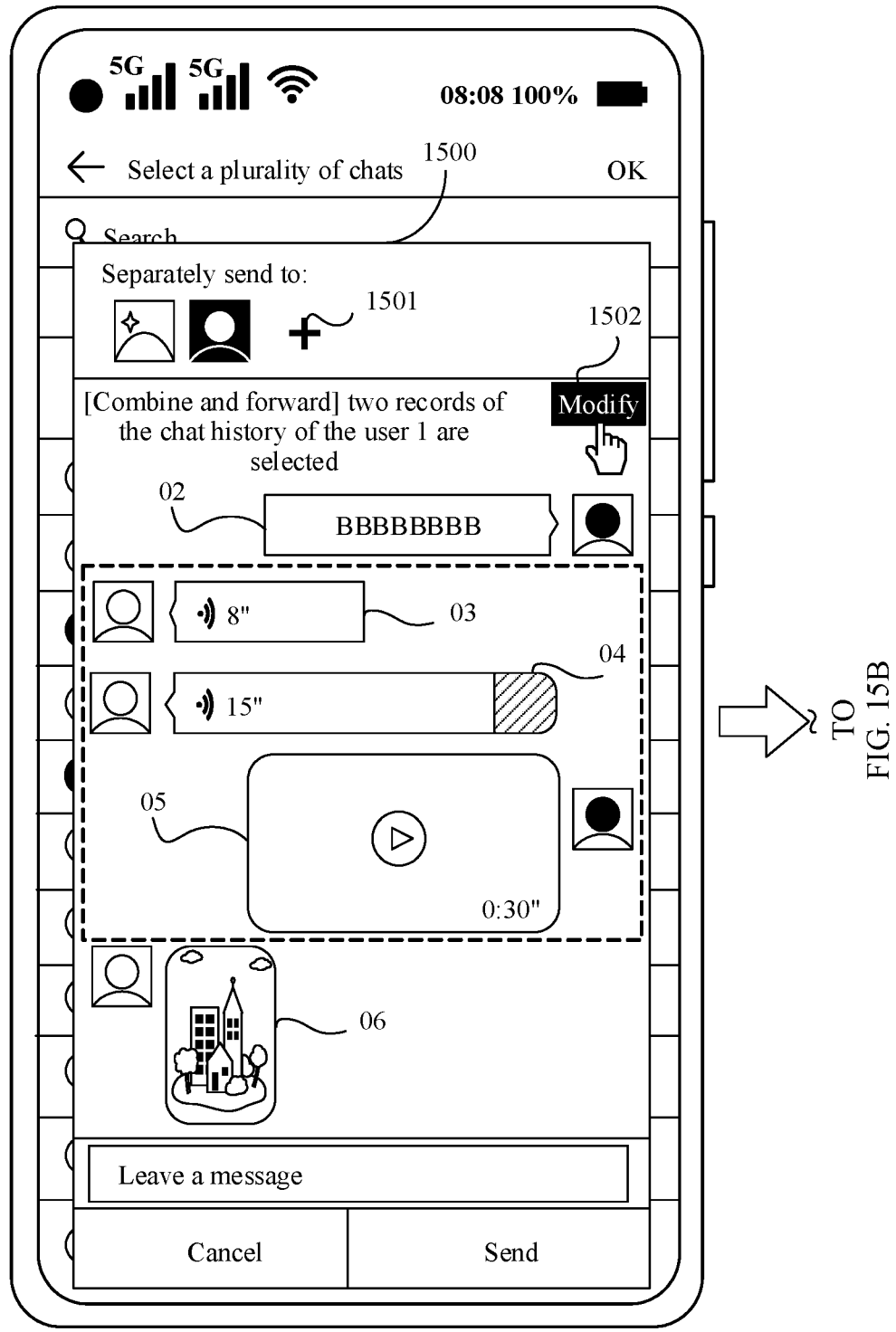
FIG. 15A and FIG. 15B are a schematic diagram of a combination and forwarding box according to an embodiment of this application.
Figure 15B:
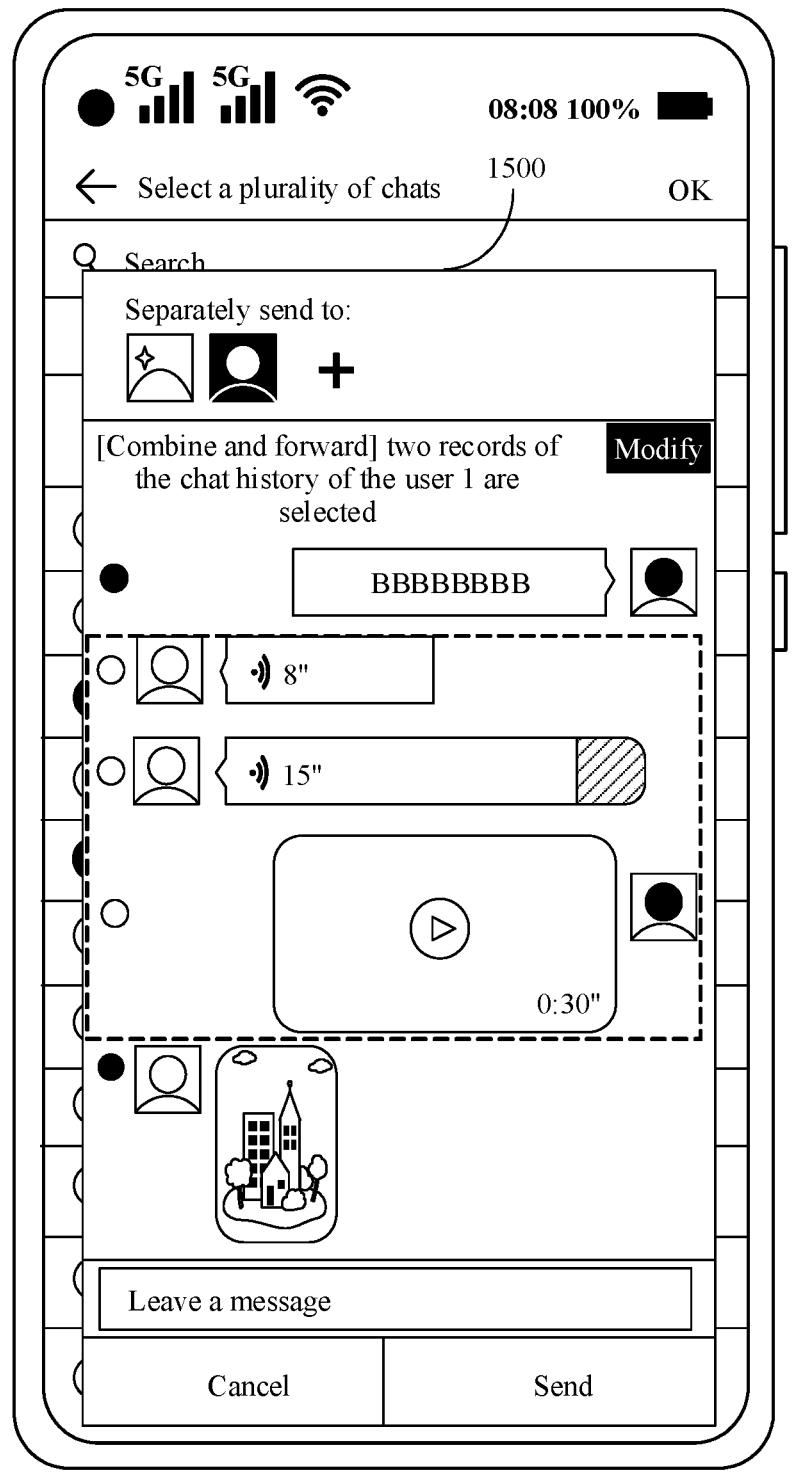

In some other embodiments of this application, when the user selects OK shown in FIG. 14D, the electronic device displays a combination and forwarding box 1500. The combination and forwarding box 1500 may be as shown in FIG. 15A, or may be as shown in FIG. 15B. The combination and forwarding box 1500 shown in FIG. 15A is used as an example. For example, when the user selects the message 02 and the message 06, the combination and forwarding box 1500 may further display messages located between the message 02 and the message 06, for example, a message 03, a message 04, and a message 05. Certainly, when the user selects the message 02 and the message 06, the messages located between the message 02 and the message 06, for example, the message 03, the message 04, and the message 05, may alternatively not be displayed in the combination and forwarding box 1500.

For example, the user may preview a corresponding message in the message combination and forwarding box 1500. For example, when the message is a text message or a picture, the user may view corresponding text or the corresponding picture in the message combination and forwarding box 1500. For another example, when the message is a voice message, the user may play a corresponding voice in the message combination and forwarding box 1500 by tapping the message. For another example, when the message is a video message, the user may play a corresponding video in the message combination and forwarding box 1500 by tapping the message. For another example, when the message is a document (e.g., a Word document, a Text document, an Excel document, a PPT document, or a PDF document) message, the user may open a corresponding document in the message combination and forwarding box 1500 for viewing. For another example, when the message is a location, a sticker, or a shared min program, the user may also preview the message in the message combination and forwarding box 1500. It should be noted that a format of a message that can be previewed in the message combination and forwarding box 1500 is not limited in embodiments of this application. Further, the message combination and forwarding box 1500 may present, to the user, a quantity of messages selected by the user.

Figure 16A:
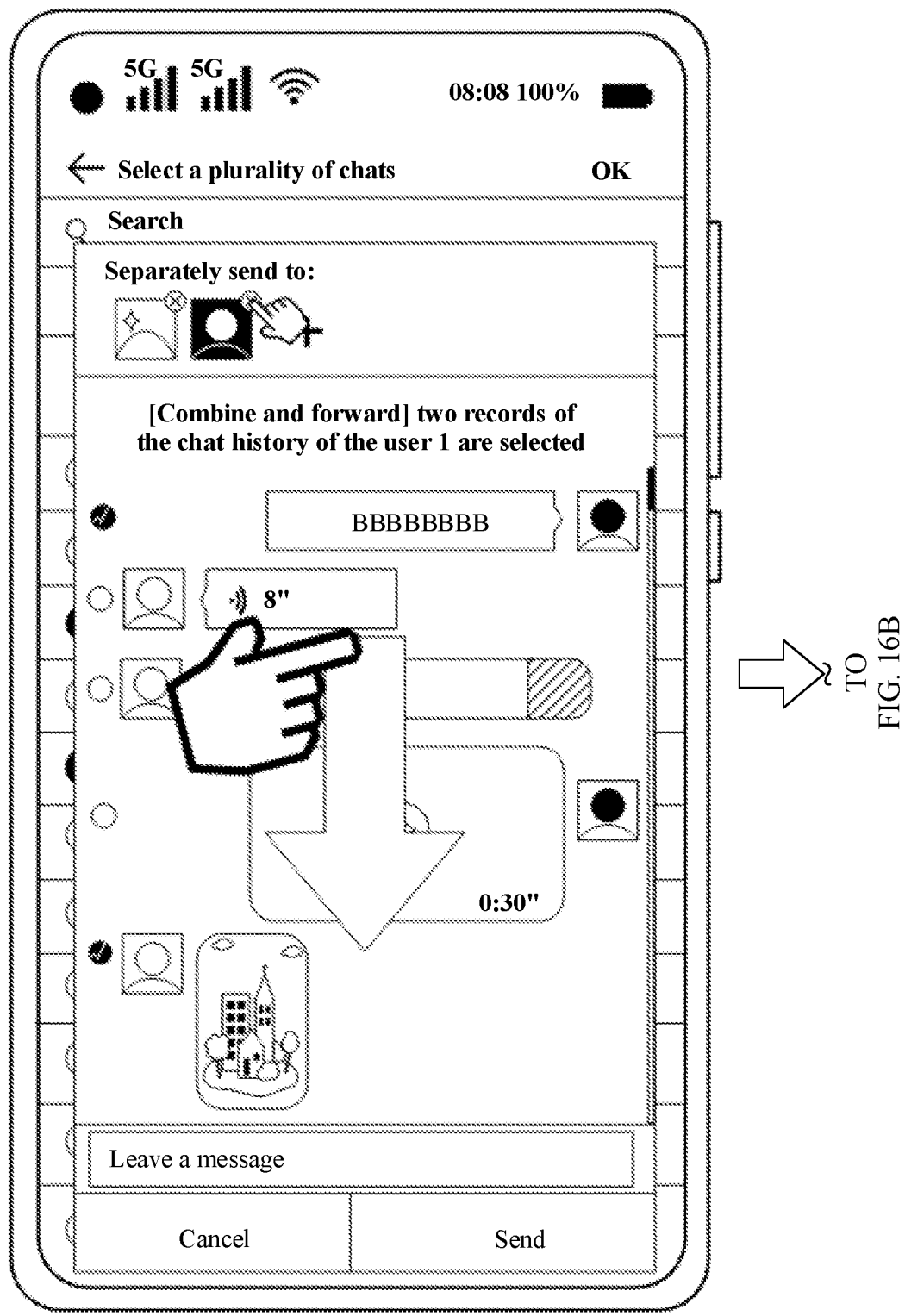
FIG. 16A and FIG. 16B are a schematic diagram of another combination and forwarding box according to an embodiment of this application.

For another example, the combination and forwarding box 1500 may include a control 1501. The user taps the control 1501, so that the electronic device may return to the interface shown in FIG. 14D, to reselect a user name or a user group name to which the chat history of the user 1 is to be forwarded. For another example, the combination and forwarding box 1500 may further include a control 1502. In response to tapping the control 1502 by the user, the electronic device may display the interface shown in FIG. 14B, or display the combination and forwarding box 1500 shown in FIG. 15B. The user may add or delete a selected message based on a requirement of the user. Further, in some embodiments, when a progress bar for previewing the message in the combination and forwarding box 1500 shown in FIG. 15B is located at the top, as shown in FIG. 16A, and the user slides downward, the electronic device may update, to the combination and forwarding box 1500, N messages that are in the chat interface including the user 1 and the user 2 and that are followed by the message 02, where N may be a positive integer greater than or equal to 1, and may be preconfigured by the user, or may be predefined on the electronic device. Each time when the user slides downward, the electronic device performs updating once, until a first message in the chat interface including the user 1 and the user 2 is updated. For example, if there is only one message, for example, a message 01, followed by the message 02, when the user slides downward, the electronic device may display the message 01 in the interface of the combination and forwarding box 1500. When the user slides downward again, the electronic device no longer performs updating.

It should be understood that, similarly, when the progress bar for previewing the message in the combination and forwarding box 1500 is located at the bottom, and the user continues to slide upward, the electronic device may alternatively update, to the combination and forwarding box 1500, M messages that are in the chat interface including the user 1 and the user 2 and that follow the message 06, where m may be equal to or unequal to N. Each time when the user slides upward, the electronic device performs updating once, until a last message in the chat interface including the user 1 and the user 2 is updated. In this way, when the combination and forwarding box is displayed, it is convenient for the user to reselect a message that needs to be forwarded.

Figure 16B:
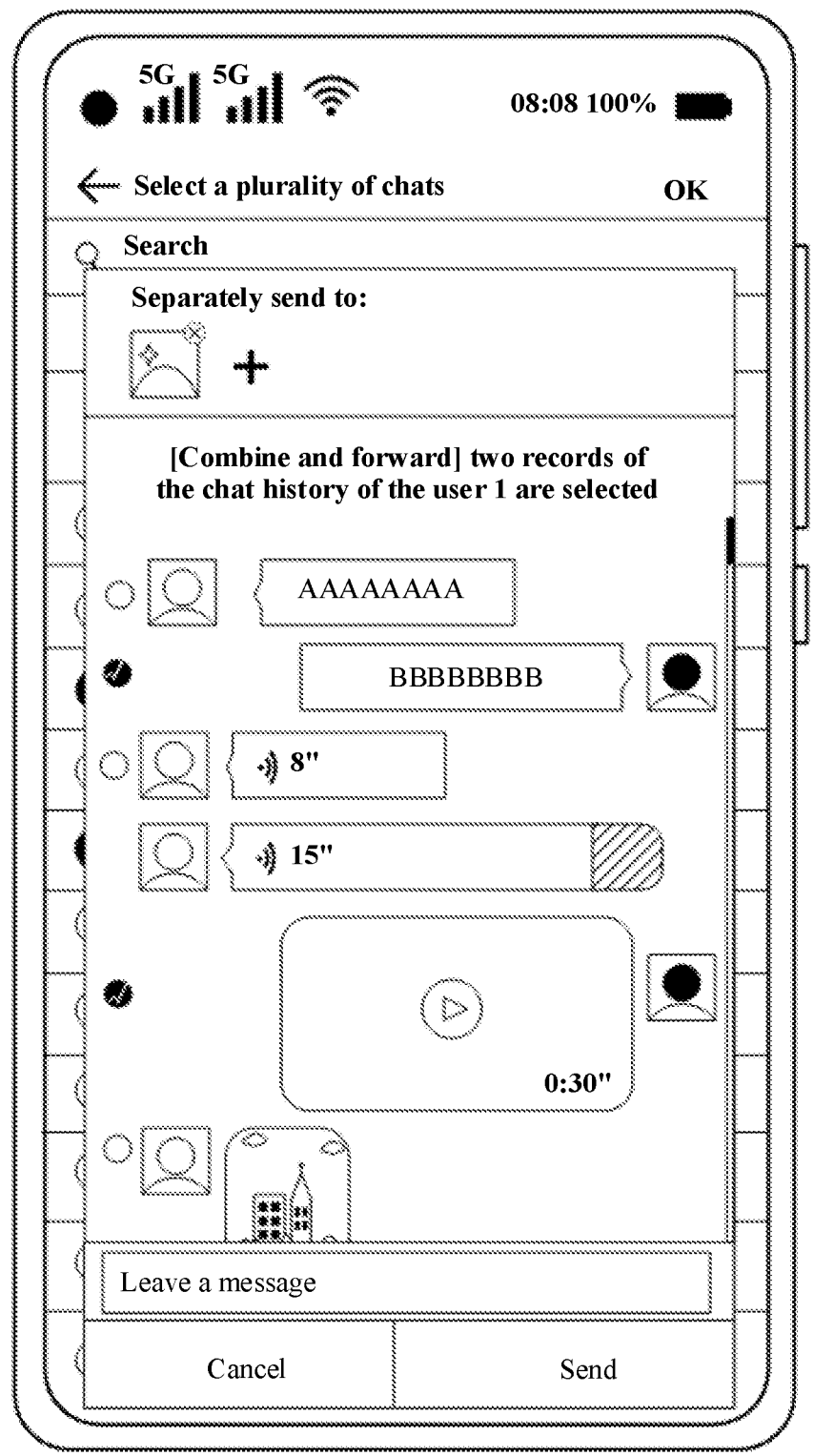

In addition, for another example, as shown in FIG. 15A and FIG. 15B, the combination and forwarding box 1500 further includes a profile photo of the user or the user group, so that the user identifies the user or the user group to which the chat history is to be sent. Further, in some embodiments, the profile photo of the user or the user group in the combination and forwarding box 1500 includes a delete icon. As shown in FIG. 16A and FIG. 16B, in response to tapping, by the user, a delete icon on a profile photo of the user named E, the electronic device may directly delete the user named E, that is, the electronic device does not need to send the chat history of the user 1 to the user named E. In this way, it is convenient for the user to delete a user to which the chat history is to be forwarded. Alternatively, the profile photo of the user or the user group in the combination and forwarding box 1500 may be replaced with another identifier that may be used for identifying the user or the user group, such as the name of the user or the user group. This is not limited in embodiments of this application.

FIG. 16A and FIG. 16B are used as an example. After the user taps the delete icon on the profile photo of the user named E, the combination and forwarding box 1500 includes only a profile photo of one user group. When the combination and forwarding box 1500 includes only one profile photo, the electronic device may hide a delete icon on the profile photo; or the electronic device may display a delete image on the profile photo, and in response to tapping a delete icon on the image by the user, the electronic device displays the chat selection interface, as shown in FIG. 14D.

Figure 17:
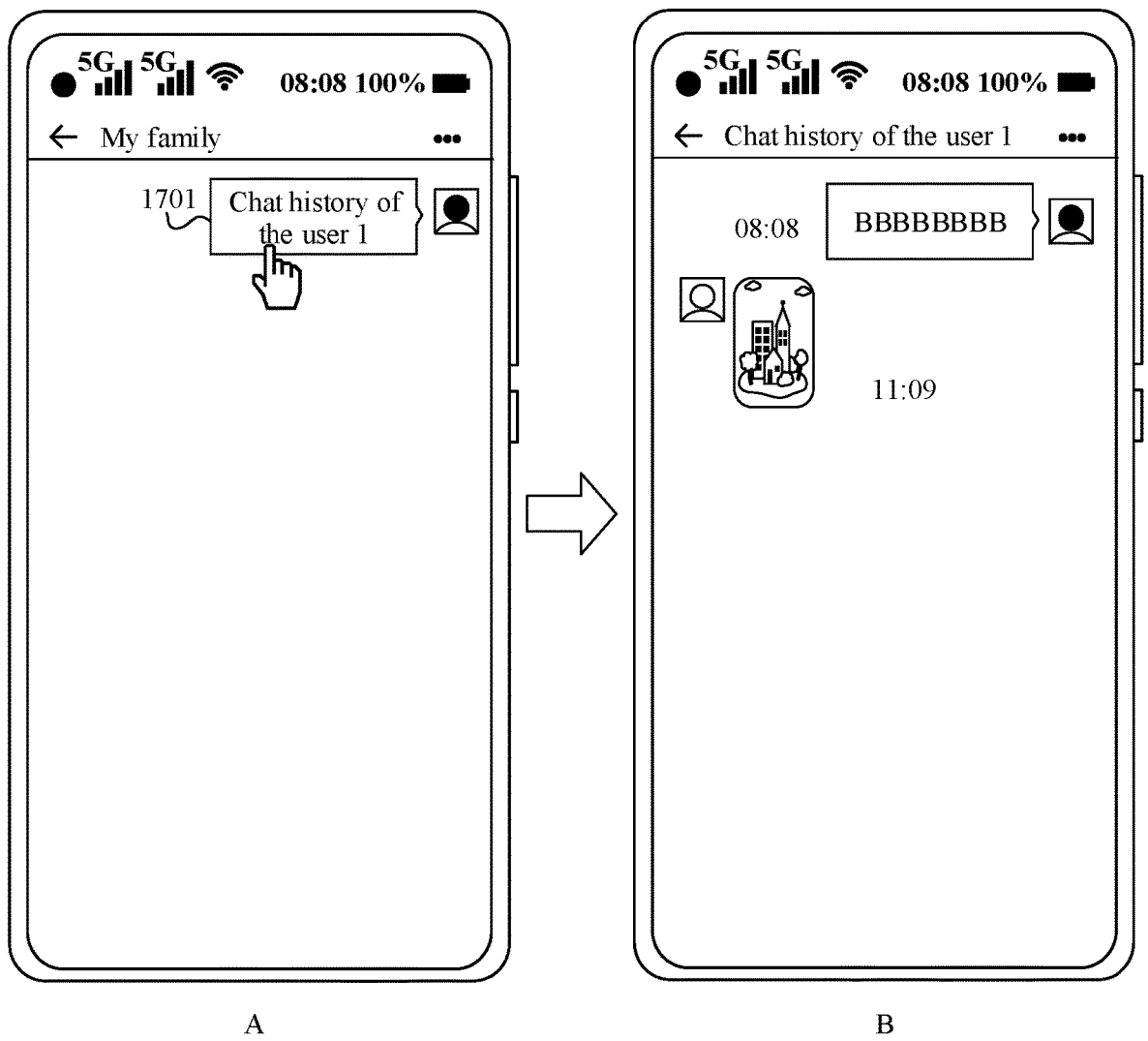
FIG. 17 is a schematic diagram of a user interface according to an embodiment of this application.

Forwarding to the user group named My family is used as an example. The user displays a chat history message 1701 in a group chat interface named My Family. The chat history message 1701 is associated with the chat history that is of the user 1 and that is forwarded by the user 2, as shown in A in FIG. 17. In response to tapping the chat history message 1701 by the user, the electronic device displays a detailed interface in which the user 2 forwards the chat history with the user 1, as shown in B in FIG. 17. For example, in the interface shown in B in FIG. 17, the chat history of the user 1 is presented to the user in a bubble form, so that the user can restore an original appearance of the chat history between the user 1 and the user 2. The user may further preview messages in different formats in the detailed interface of the chat history of the user 1, for example, a picture, text, a video, audio, a location, a sticker, a document, a shared link, or a shared min program.

Figure 18:
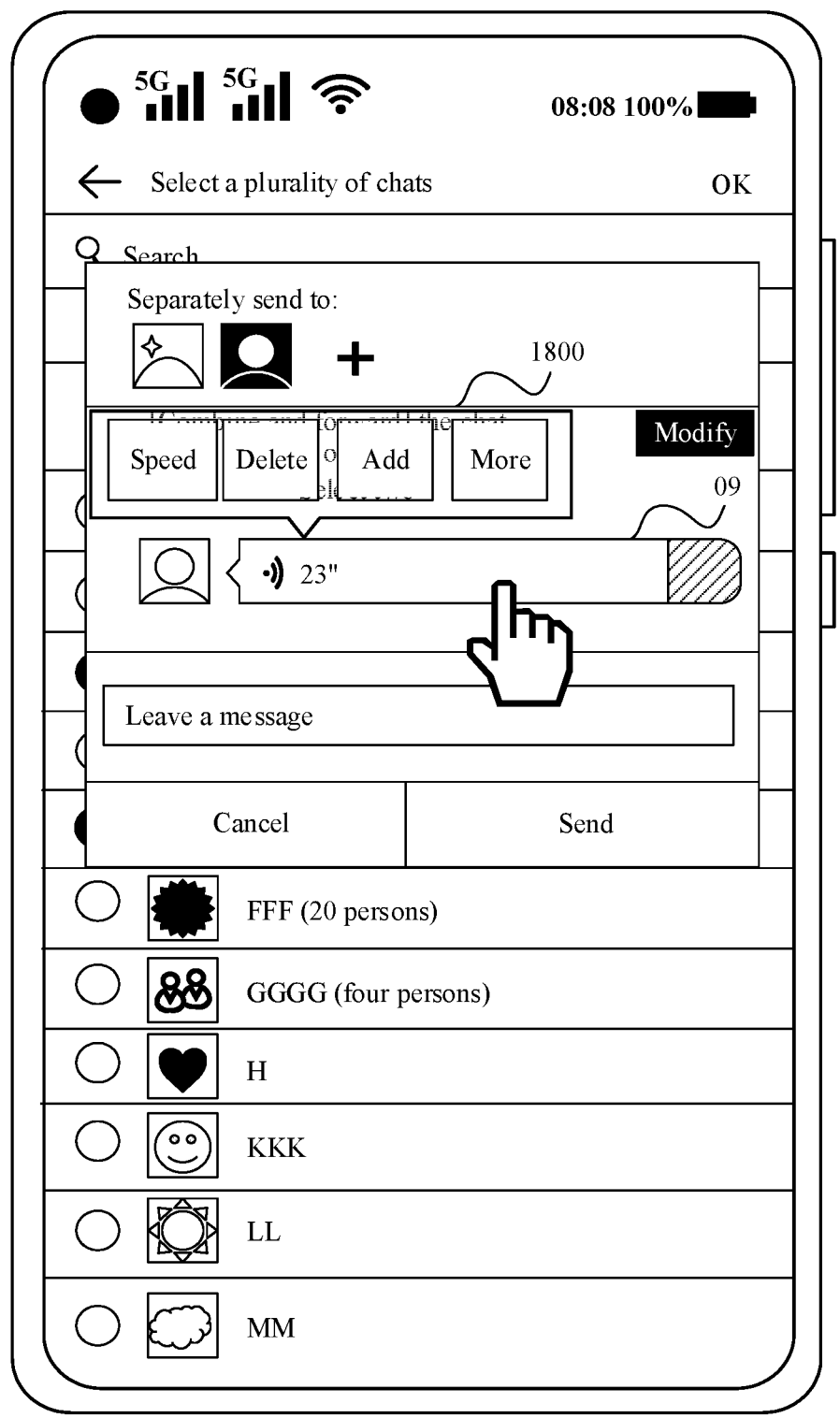
FIG. 18 is a schematic diagram of another combination and forwarding box according to an embodiment of this application.

Alternatively, in some embodiments, after the user selects the message 03 and the message 04 shown in FIG. 14A, the electronic device may further display a message 09 in the combination and forwarding box. The message 09 is a combined message of the message 03 and the message 04, for example, as shown in FIG. 18. The user can play the message 03 and the message 04 by tapping the message 09 once in the combination and forwarding box, so that the user does not need to perform a plurality of operations. Further, in some embodiments, when the user touches and holds the message 09, the electronic device displays a toolbar 1800. The toolbar 1800 may include a plurality of options, for example, Speed, Delete, Add, and More. For example, when the user taps Speed, the user may edit a playing speed of audio in the message 09. For another example, when the user taps Delete, the user may edit content of the audio in the message 09. For another example, when the user taps Add, the user may add content to the audio in the message 09. It should be noted that, for different messages, options in the toolbar 1800 displayed by the electronic device may be different. For example, for a picture, the toolbar 1800 may include Meitu and Beauty. For another example, for a text message, the toolbar 1800 may include a font and a size.

It should be noted that, in embodiments of this application, the electronic device may perform, with reference to time, combination processing on messages of a same type that are sent by one or more users. For example, for the electronic device, a video and audio of the first style may be messages of a same type.

For example, when the electronic device displays a combined message in the combination and forwarding box, and the user views a combined and forwarded chat history in the chat interface, the electronic device may present the combined and forwarded chat history to the user in a combined message form, or may separately present the combined and forwarded chat history to the user in a bubble form. This is not limited.

It should be noted that the foregoing message display manner is also applicable to a scenario of forwarding messages one by one, and details are not described herein again.

The foregoing embodiments may be used separately, or may be used in combination with each other, to achieve different technical effects. This is not limited.

Figure 19:
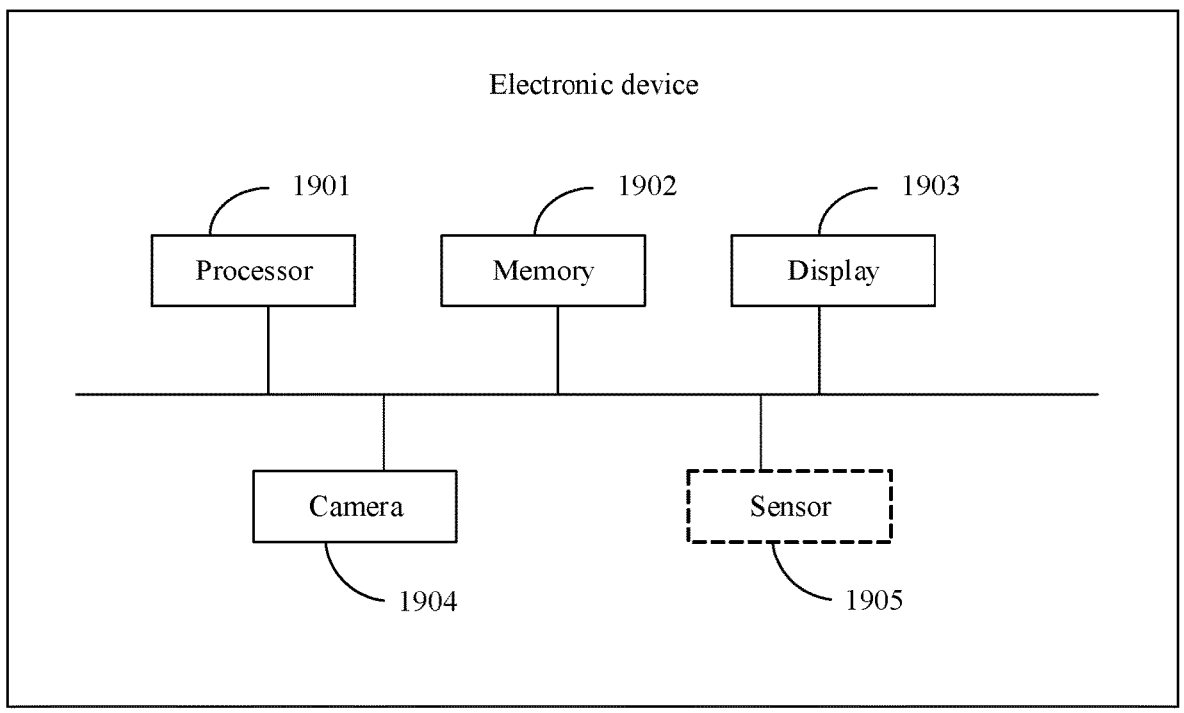
FIG. 19 is a schematic diagram of a structure of another electronic device according to an embodiment of this application.

Based on a same concept, an embodiment of this application further provides an electronic device. As shown in FIG. 19, the electronic device includes a processor 1901, a memory 1902, a display 1903, and a camera 1904. Further, in some embodiments, the electronic device further includes a sensor 1905, for example, a touch sensor.

For example, the foregoing components may be connected through one or more communication buses. One or more computer programs are stored in the memory 1902, and are configured to be executed by the processor 1901. The one or more computer programs include instructions, and the instructions may be used for enabling the electronic device to perform the steps of the methods in the foregoing embodiments.

For example, the processor 1901 may be specifically the processor 110 shown in FIG. 1, the memory 1902 may be specifically the internal memory 121 shown in FIG. 1 and/or an external memory connected to the electronic device, the display 1903 may be specifically the display 194 shown in FIG. 1, and the sensor 1905 may be specifically one or more sensors in the sensor module 180 shown in FIG. 1. This is not limited in embodiments of this application.

In addition, an embodiment of this application further provides a graphical user interface (GUI) on an electronic device. The graphical user interface specifically includes a graphical user interface displayed when the electronic device performs the foregoing method embodiments.

According to the context, the term "when" or "after" used in the foregoing embodiments may be interpreted as a meaning of "if" or "after" or "in response to determining" or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by the computer, or a data storage device, for example, a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state drive Solid State Drive (SSD)), or the like. When there is no conflict, the solutions in the foregoing embodiments may be combined for use.

It should be noted that a part of this patent application document includes content protected by the copyright. The copyright owner reserves the copyright except for making copies of the patent documents of the Patent Office or content of the patent documents recorded by the Patent Office.

What is claimed is:

1. A message display method, carried out by an electronic device, wherein an instant messaging application is installed on the electronic device, and wherein the method comprises:
   displaying a first user chat interface of the instant messaging application that comprises a first video message comprising a first region and a second region, wherein:
   the first video message is associated with a first video,
   the first video comprises first audio and at least one frame of first image,
   the first region corresponds to the first audio, and
   the second region corresponds to the at least one frame of first image;
   playing, in accordance with an operation performed by the user on the first region of the first video message, the first audio and playing the at least one frame of first image in a small window; and
   playing, in accordance with an operation performed by the user on the second region, the first audio and the at least one frame of first image in full screen mode.

2. The method according to claim 1, wherein that the second region corresponds to the at least one frame of image comprises:

the second region being used for displaying a thumbnail of a target image, and the target image is one of the at least one frame of first image.

3. The method according to claim 1, wherein the method further comprises:
playing the first video in full screen mode in accordance with tapping the small window by the user.

4. The method according to claim 1, wherein the first user chat interface further comprises a second video message, wherein the second video message is associated with a second video, wherein the second video message comprises a third region and a fourth region, wherein the second video comprises second audio and at least one frame of second image, wherein the third region corresponds to the second audio, wherein the fourth region corresponds to the at least one frame of second image, wherein both the first video message and the second video message are in an unread state, and wherein the second video message follows the first video message; and
wherein the method further comprises automatically playing, in accordance with the operation performed by the user on the first region, the second audio after the first audio is completely played.

5. The method according to claim 1, wherein the first user chat interface further comprises a first voice message, wherein the first voice message follows the first video message, and wherein both the first voice message and the first video message are in an unread state; and
wherein the method further comprises automatically playing, in accordance with the operation performed by the user on the first region after the first audio is completely played, a voice associated with the first voice message.

6. The method according to claim 1, wherein the first user chat interface further comprises a second voice message and a third video message, wherein the third video message is associated with a third video, wherein the third video comprises third audio and at least one frame of third image, wherein the third video message comprises a fifth region and a sixth region, wherein the fifth region corresponds to the third audio, wherein the sixth region corresponds to the at least one frame of third image, wherein the second voice message is followed by the third video message, and wherein both the second voice message and the third video message are in an unread state; and
wherein the method further comprises in accordance with an operation performed by the user on the second voice message:
playing a voice associated with the second voice message, and
automatically playing the third audio after the voice associated with the second voice message is completely played.

7. The method according to claim 1, wherein the method further comprises:
receiving a first operation in the first user chat interface; and
in accordance with the first operation:
performing photographing by using a camera, and
displaying a photographing interface,
wherein the photographing interface is used for displaying an image captured by the camera.

8. The method according to claim 7, wherein the method further comprises:
receiving a second operation in the first user chat interface; and
in accordance with the second operation, collecting a voice by using a microphone.

9. The method according to claim 8, wherein the first user chat interface further comprises a first control, a seventh region, and an eighth region;
wherein the first control is used for message input, and
wherein the seventh region and the eighth region do not overlap;
wherein the first operation is holding the first control and sliding to the seventh region by the user; and
wherein the second operation is holding the first control and sliding to the eighth region by the user.

10. The method according to claim 1, wherein the method further comprises:
displaying a combination and forwarding box, wherein the combination and forwarding box is used for forwarding N messages in a second user chat interface, wherein the combination and forwarding box comprises M profile photos, wherein the M profile photos are used for indicating a user group or a user to which the N messages are to be forwarded, and wherein each of the M profile photos comprises one delete icon; and
deleting, in accordance with tapping a delete icon on a first profile photo in the M profile photos by the user, the first profile photo in the combination and forwarding box, wherein M and N are positive integers.

11. The method according to claim 10, wherein the method further comprises:
displaying a third user chat interface, wherein the third user chat interface comprises a fourth message, the fourth message is associated with a combined and forwarded chat history, and the combined and forwarded chat history comprises the N messages; and
displaying, in accordance with an operation performed by the user on the fourth message, a detailed interface of the chat history that comprises the N messages, and the N messages are displayed in a bubble form.

12. The method according to claim 1, wherein the method further comprises:
displaying a combination and forwarding box, wherein the combination and forwarding box is used for forwarding N messages in a second user chat interface, and the combination and forwarding box comprises a second control and/or a third control;
displaying, in accordance with an operation on the second control, a chat selection interface, wherein the chat selection interface is used for selecting a user group or a user to which messages are to be combined and forwarded; and
displaying, in accordance with an operation on the third control, a user chat interface used for the user to select a message, wherein N is a positive integer.

13. The method according to claim 1, wherein the method further comprises:
displaying a combination and forwarding box, wherein the combination and forwarding box is used for forwarding N messages in a second user chat interface, wherein the combination and forwarding box comprises message quantity prompt information, wherein the message quantity prompt information is used for indicating a quantity of messages to be forwarded by the user, and wherein N is a positive integer.

14. The method according to claim 1, wherein the method further comprises:
displaying a combination and forwarding box that comprises K messages, wherein the K messages comprise N to-be-forwarded messages in a second user chat interface, wherein K is greater than or equal to N, and wherein K and N are positive integers; and opening, in accordance with an operation performed by the user on a second message in the N messages, a file associated with the second message that is one of the group consisting of: a voice, a video, an audio and video, a document, a picture, a location, and a link.

15. The method according to claim 14, wherein each of the N messages corresponds to one selection control, and the selection control corresponding to each of the N messages is in a selected state; and switching, in accordance with an operation performed by the user on a selection control corresponding to a third message in the N messages, the selection control corresponding to the third message from the selected state to an unselected state, wherein the electronic device skips forwarding the third message when the selection control corresponding to the third message is in the unselected state.

16. The method according to claim 1, wherein the method further comprises:

displaying a combination and forwarding box that comprises K messages, wherein the K messages comprise N to-be-forwarded messages in a second user chat interface, wherein K is greater than or equal to N, and wherein K and N are positive integers; and wherein the K messages each are displayed in a bubble form.

17. An electronic device, comprising:
at least one processor; and
at least one memory storing one or more computer programs comprising instructions that, when executed by the one or more processors, cause the electronic device to perform a method comprising:
displaying a first user chat interface of the instant messaging application that comprises a first video message comprising a first region and a second region, wherein:
the first video message is associated with a first video,
the first video comprises first audio and at least one frame of first image,
the first region corresponds to the first audio, and
the second region corresponds to the at least one frame of first image; and
playing, in accordance with an operation performed by the user on the first region of the first video message, the first audio and playing the at least one frame of first image in a small window; and
playing, in accordance with an operation performed by the user on the second region, the first audio and playing the at least one frame of first image in full screen mode.

18. The electronic device according to claim 17, wherein the first user chat interface further comprises a second video message, wherein the second video message is associated with a second video, wherein the second video message comprises a third region and a fourth region, wherein the second video comprises second audio and at least one frame of second image, wherein the third region corresponds to the second audio, wherein the fourth region corresponds to the at least one frame of second image, wherein both the first video message and the second video message are in an unread state, and wherein the second video message follows the first video message; and wherein the method further comprises automatically playing, in accordance with the operation performed by the user on the first region, the second audio after the first audio is completely played.

19. The electronic device according to claim 17, wherein the first user chat interface further comprises a first voice message, the first voice message follows the first video message, and wherein both the first voice message and the first video message are in an unread state; and wherein the method further comprises automatically playing, in accordance with the operation performed by the user on the first region after the first audio is completely played, a voice associated with the first voice message.

20. The electronic device according to claim 17, wherein the first user chat interface further comprises a second voice message and a third video message, wherein the third video message is associated with a third video, wherein the third video comprises third audio and at least one frame of third image, wherein the third video message comprises a fifth region and a sixth region, wherein the fifth region corresponds to the third audio, wherein the sixth region corresponds to the at least one frame of third image, wherein the second voice message is followed by the third video message, and wherein both the second voice message and the third video message are in an unread state; and wherein the method further comprises:
playing, in accordance with an operation performed by the user on the second voice message, a voice associated with the second voice message, and
automatically playing the third audio after the voice associated with the second voice message is completely played.

21. The electronic device according to claim 17, wherein the method further comprises:

receiving a sliding upward in the first user chat interface; and
performing, in accordance with the first operation, photographing by using a camera and displaying a photographing interface, wherein the photographing interface is used for displaying an image captured by the camera.

22. The electronic device according to claim 17, wherein the method comprises:

displaying a combination and forwarding box that comprises K messages, wherein the K messages comprise N to-be-forwarded messages in a second user chat interface, wherein K is greater than or equal to N, and wherein K and N are positive integers; and wherein the K messages each are displayed in a bubble form.

23. The electronic device according to claim 22, wherein the instructions are executed by the one or more processors, the electronic device is further enabled to perform:

displaying a third user chat interface, wherein the third user chat interface comprises a fourth message, the fourth message is associated with a combined and forwarded chat history, and the combined and forwarded chat history comprises the N messages; and
displaying, in accordance with an operation performed by the user on the fourth message, a detailed interface of the chat history that comprises the N messages, and the N messages are displayed in a bubble form.

24. An electronic device, comprising:
at least one processor; and
at least one memory storing one or more computer programs comprising instructions that, when executed by the one or more processors, cause the electronic device to perform a method comprising:
displaying a first user chat interface of an instant messaging application that comprises a first video message comprising a first region and a second region, wherein:
the first video message is associated with a first video,
the first video comprises first audio and at least one frame of first image,
the first region corresponds to the first audio, and the second region corresponds to the at least one frame of first image; and playing the first audio but skipping playing the at least one frame of first image in accordance with the operation performed by the user on the first region; and playing the at least one frame of first image and playing the first audio in accordance with the operation performed by the user on the second region.

25. An electronic device, comprising:

at least one processor; and at least one memory storing one or more computer programs comprising instructions that, when executed by the one or more processors, cause the electronic device to perform a method comprising:

displaying a first user chat interface of an instant messaging application that comprises a first video message comprising a first region and a second region, wherein:
the first video message is associated with a first video,
the first video comprises first audio and at least one frame of first image,
the first region corresponds to the first audio, and
the second region corresponds to the at least one frame of first image; and playing the first audio but skipping playing the at least one frame of first image in accordance with the operation performed by the user on the first region; and playing the at least one frame of first image but skipping playing the first audio in accordance with the operation performed by the user on the second region.

26. The electronic device according to claim 25, wherein the playing the at least one frame of first image but skipping playing the first audio in accordance with the operation performed by the user on the second region comprises:

playing, in accordance with the operation performed by the user on the second region, the at least one frame of first image, and converting the first audio into text for display in accordance with the at least one frame of first image being displayed.

\* \* \* \* \*